US008400907B2

(12) United States Patent
Ko et al.

(10) Patent No.: US 8,400,907 B2
(45) **Date of Patent: *Mar. 19, 2013**

(54) METHOD FOR ALLOCATING REFERENCE SIGNALS IN MIMO SYSTEM

(75) Inventors: Hyun Soo Ko, Seoul (KR); Bin Chul Ihm, Anyang-si (KR); Jin Young Chun, Seoul (KR); Wook Bong Lee, Seongnam-si (KR); Jae Hoon Chung, Yongin-si (KR); Jae Won Chang, Goyang-si (KR); Jin Hyuk Jung, Ansan-si (KR); Moon Il Lee, Yongin-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/439,828

(22) Filed: Apr. 4, 2012

(65) Prior Publication Data

US 2012/0189041 A1 Jul. 26, 2012

Related U.S. Application Data

(63) Continuation of application No. 11/734,710, filed on Apr. 12, 2007, now Pat. No. 8,174,957.

(60) Provisional application No. 60/791,833, filed on Apr. 12, 2006, provisional application No. 60/828,950, (Continued)

(51) Int. Cl.
*H04J 11/00* (2006.01)

(52) U.S. Cl. ........................................................ 370/208

(58) Field of Classification Search .................. 370/208
See application file for complete search history.

(56) References Cited

U.S. PATENT DOCUMENTS

| | | | | |
|---|---|---|---|---|
| 7,095,709 | B2 | 8/2006 | Walton et al. | |
| 8,174,957 | B2 * | 5/2012 | Ko et al. | 370/208 |
| 2005/0025039 | A1 | 2/2005 | Hwang et al. | |

(Continued)

FOREIGN PATENT DOCUMENTS

| | | |
|---|---|---|
| EP | 1494381 | 1/2005 |
| KR | 10-2006-35941 | 4/2006 |

(Continued)

OTHER PUBLICATIONS

Nortel, "Pilot pattern design consideration for E-UTRA DL," R1-050642, 3GPP TSG-RAN1 Meeting #42, Jun. 2005.

(Continued)

*Primary Examiner* — Mark Rinehart
*Assistant Examiner* — Gbemileke Onamuti
(74) *Attorney, Agent, or Firm* — Lee, Hong, Degerman, Kang & Waimey

(57) ABSTRACT

A user equipment (UE) receiving a plurality of reference signals in a wireless multiple-input multiple-output (MIMO) communication system includes a transceiver configured for receiving the plurality of reference signals for multiple antennas in a sub-frame, the sub-frame including a plurality of Orthogonal Frequency Division Multiplexing (OFDM) symbols in a time domain over a plurality of sub-carriers in a frequency domain. A first array is repeated in the frequency domain on a first OFDM symbol of the sub-frame, a second array is repeated in the frequency domain on a second OFDM symbol of the sub-frame and a third array is repeated in the frequency domain on a third OFDM symbol of the sub-frame, and each of the first, second and third arrays consists of six contiguous symbols in the frequency domain.

13 Claims, 91 Drawing Sheets

Related U.S. Application Data filed on Oct. 10, 2006, provisional application No. 60/829,273, filed on Oct. 12, 2006, provisional application No. 60/863,775, filed on Oct. 31, 2006, provisional application No. 60/910,183, filed on Apr. 4, 2007.

(56) References Cited

U.S. PATENT DOCUMENTS

| | | | |
|---|---|---|---|
| 2006/0285484 | A1 | 12/2006 | Papasakellariou et al. |
| 2007/0177631 | A1 | 8/2007 | Popovic et al. |
| 2007/0211667 | A1 | 9/2007 | Agrawal et al. |
| 2007/0248113 | A1 | 10/2007 | Ko et al. |
| 2008/0032630 | A1 | 2/2008 | Kim et al. |
| 2008/0253279 | A1 | 10/2008 | Ma et al. |
| 2009/0016461 | A1 | 1/2009 | Jitsukawa et al. |
| 2009/0232243 | A1 | 9/2009 | Tsuboi et al. |

FOREIGN PATENT DOCUMENTS

| | | |
|---|---|---|
| KR | 10-2006-40180 | 5/2006 |
| WO | 2005/088882 | 9/2005 |
| WO | 2006/000091 | 1/2006 |
| WO | 2007/117127 | 10/2007 |

OTHER PUBLICATIONS

Texas Instruments, "Performance and Implementation Aspects for Scattered and TDM Pilot Formats in EUTRA OFDMA Downlink," 3GPP TSG RAN WG1, R1-051060, pp. 1-18, Oct. 2005.

Motorola, "Four Transmit Antenna Downlink RS Formats for EUTRA," 3GPP TSG RAN WG1 #47bis, R1-070147, pp. 1-6, Jan. 2007.

NTT DoCoMo et al., "Pilot Channel Structure in Evolved UTRA Downlink," 3GPP TSG RAN WG1 #42 on LTE, R1-050705, pp. 1-15, Aug. 2005.

Intel Corporation, "Reference Signal Design for Downlink MIMO," 3GPP TSG RAN WG1 #44-bis, R1-060871, pp. 1-10, Mar. 2006.

NTT DoCoMo et al., "Orthogonal Reference Signal Design in E-UTRA Downlink," 3GPP TSG RAN WG1 Meeting #46, R1-062100, pp. 1-6, Aug. 2006.

Intel Corporation et al., "Reference Signal Design in Downlink MIMO," 3GPP TSG RAN WG1 Meeting #45, R1-062020, pp. 1-6, Aug. 2006.

Qinqhua Li, Xintian Eddie Lin, Shilpa Talwar(Intel Corporation), "Pilot allocations for 5,6,7, and 8 BS antennas", IEEE 802.16 Broadband Wireless Access Working Group, Contribution paper, IEEE C802.16e-04/523r3, Nov. 2004.

Koo-Hyun Um, Inkyu-Paek, Pyung-Su Park (Hanaro Telecom), "Transmission schemes for 2 or more antenna MSS in UL", IEEE 802.16 Broadband Wireless Access Working Group, Contribution paper, IEEE C802.16e-04/248, Aug. 2004, see the abstract, figue xxx(p. 1), figures aaa-1 and aaa-2(p. 2), figures aaa-3 and aaa-4(p. 3), "8.4.8.2.4 Uplink using STC" part.

Alvarion Ltd., Samsung Electronics Co. Ltd., Nortel Networks, "Corrections to definitions on Uplink MIMO in OFDMA PHY", IEEE 802.16 Broadband Wireless Access Working Group, Contribution paper, IEEE C802.16maint-04/68r3, Jan. 2005.

Hongwei Yang; "A road to future broadband wireless access: MIMO-OFDM-Based air interface", IEEE Communications Magazine, vol. 43, Issue 1, Jan. 2005, pp. 53-60.

K.H. Um et al., "Transmission schemes for 2 or more antenna MSS in UL", IEEE 802.16 Broadband Wireless Access Working Group, IEEE C802.16e-04/248, Aug. 2004.

IEEE Computer Society and the IEEE Microwave Theory and Techniques Society, "Part 16: Air Interface for Fixed and Mobile Broadband Wireless Access Systems; Amendment 2: Physical and Medium Access Control Layers for Combined Fixed and Mobile Operation in Licensed Bands and Corrigendum 1", IEEE Std 802.16e-2005 and IEEE Std 802.16/2004/Cor1-2005, Feb. 2006, XP-002670974.

* cited by examiner

METHOD FOR ALLOCATING REFERENCE SIGNALS IN MIMO SYSTEM

CROSS-REFERENCE TO RELATED APPLICATIONS

This application is a continuation of U.S. patent application Ser. No. 11/734,710, filed on Apr. 12, 2007, now U.S. Pat. No. 8,174,957, which claims the benefit of U.S. Provisional Application Ser. Nos. 60/791,833, filed on Apr. 12, 2006, 60/828,950, filed on Oct. 10, 2006, 60/829,273, filed on Oct. 12, 2006, 60/863,775, filed on Oct. 31, 2006, and 60/910,183, filed on Apr. 4, 2007, the contents of which are all hereby incorporated by reference herein in their entirety.

BACKGROUND

1. Technical Field

The present invention relates to wireless communication, and more particularly, to a method for allocating reference signals in a multiple-input multiple-output (MIMO) antenna system.

2. Related Art

A multiple-input multiple-output (MIMO) system is defined as a system that improves data communication efficiency by the use of multiple transmit antennas and multiple receive antennas. The MIMO system may be realized using a MIMO scheme such as a spatial multiplexing and a spatial diversity. According to the spatial multiplexing, different streams are concurrently transmitted through the multiple transmit antennas, and thus fast transmission is achieved without having to increase a system bandwidth. According to the spatial diversity, same streams are transmitted through the multiple transmit antennas to obtain diversity.

In order to reproduce a signal transmitted from a transmitter, channel estimation has to be carried out by a receiver. Channel estimation is defined as a process in which a distorted signal is restored by compensating for signal distortion due to fading. In general, for the channel estimation, reference signals are required which are known by both the transmitter and the receiver.

The reference signals may be allocated using either a first scheme in which the reference signals are allocated over the entire frequency band or a second scheme in which the reference signals are allocated over a part of the frequency band. The reference signals are further densely allocated in the first scheme rather than the second scheme. The channel estimation can be further accurately performed when the first scheme is used. On the other hand, a higher data rate can be achieved in the second scheme rather than the first scheme. In the second scheme, the reference signals are scarcely allocated, and thus the channel estimation may degrade.

In the MIMO system, multiple channels are independently provided for multiple antennas. The reference signals need to be allocated in consideration of the multiple channels. In addition, the MIMO system may operate in either a single-codeword mode or a multiple-codeword mode according to a rank. The number of reference signals may increase along with the increase in the number of transmit antennas. But, this may adversely affect the data rate.

Therefore, there is a need for a technique in which the reference signals can be effectively allocated in consideration of the multiple antennas.

SUMMARY

The present invention provides a method of allocating reference signals for a multiple-input multiple-output antenna (MIMO) antenna system over wireless communication.

According to an aspect of the invention, there is provided a method for allocating reference signals for a sub-frame in a wireless multiple-input multiple-output (MIMO) communication system. The sub-frame includes a plurality of Orthogonal Frequency Division Multiplexing (OFDM) symbols in a time domain and a plurality of sub-carriers in a frequency domain. The method includes allocating a plurality of first reference signals for a first antenna on a first OFDM symbol over a sub-frame for the first antenna at regular intervals in the frequency domain, allocating a plurality of second reference signals for a second antenna on the first OFDM symbol over a sub-frame for the second antenna at regular intervals in the frequency domain such that the plurality of second reference signals does not overlap with the plurality of first reference signals, allocating a plurality of third reference signals for a third antenna on a second OFDM symbol over a sub-frame for the third antenna at regular intervals in the frequency domain, wherein the second OFDM symbol is contiguous with the first OFDM symbol and allocating a plurality of fourth reference signals for a fourth antenna on the second OFDM symbol over a sub-frame for the fourth antenna such that the plurality of fourth reference signals does not overlap with the plurality of third reference signals.

According to another aspect of the invention, there is provided a method for placing reference signals in a wireless communication system. The method includes preparing a plurality of sub-frames for a plurality of antennas, one sub-frame comprising a plurality of OFDM symbols in a time domain and a plurality of sub-carriers in a frequency domain, placing a reference signal for one sub-frame and placing a reference signal for another sub-frame not to overlap with the reference signal for one sub-frame, wherein the reference signal for one sub-frame and the reference signal for another sub-frame are successively placed on contiguous OFDM symbols or on the contiguous sub-carriers.

According to still another aspect of the invention, there is provided a method for placing reference signals in a wireless communication system. The method comprising placing a plurality of reference signals for dedicated signal and placing a plurality of reference signals for multi-user signal such that intervals in the frequency domain of the plurality of reference signals for multi-user signal are shorter than that of the plurality of reference signals for dedicated signal.

According to still another aspect of the invention, there is provided an apparatus for an OFDM based wireless MIMO communication system. The apparatus includes a plurality of transmit antennas, a multiplexer for allocating a plurality of reference signals for the plurality of transmit antennas not to overlap with each other, wherein at least two reference signals among the plurality of reference signals are successively placed on contiguous OFDM symbols or on the contiguous sub-carriers and an OFDM modulator for modulating the plurality of reference signals.

According to still another aspect of the invention, there is provided an apparatus for an OFDM based wireless communication system. The apparatus includes at least one receive antennas and a channel estimator for estimating a channel using a plurality of reference signals for the plurality of transmit antennas, wherein the plurality of reference signals does not overlap with each other and at least two reference signals among the plurality of reference signals are successively placed on contiguous OFDM symbols or on the contiguous sub-carriers.

According to still another aspect of the invention, there is provided a reference signal structure to provide information for channel estimation in an OFDM based wireless MIMO system. The reference signal structure includes a plurality of reference signals for a plurality of antennas not to overlap with each other, wherein at least two reference signals among the plurality of reference signals are successively placed on contiguous OFDM symbols or on the contiguous sub-carriers.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DESCRIPTION OF EXEMPLARY EMBODIMENTS

Figure 1:
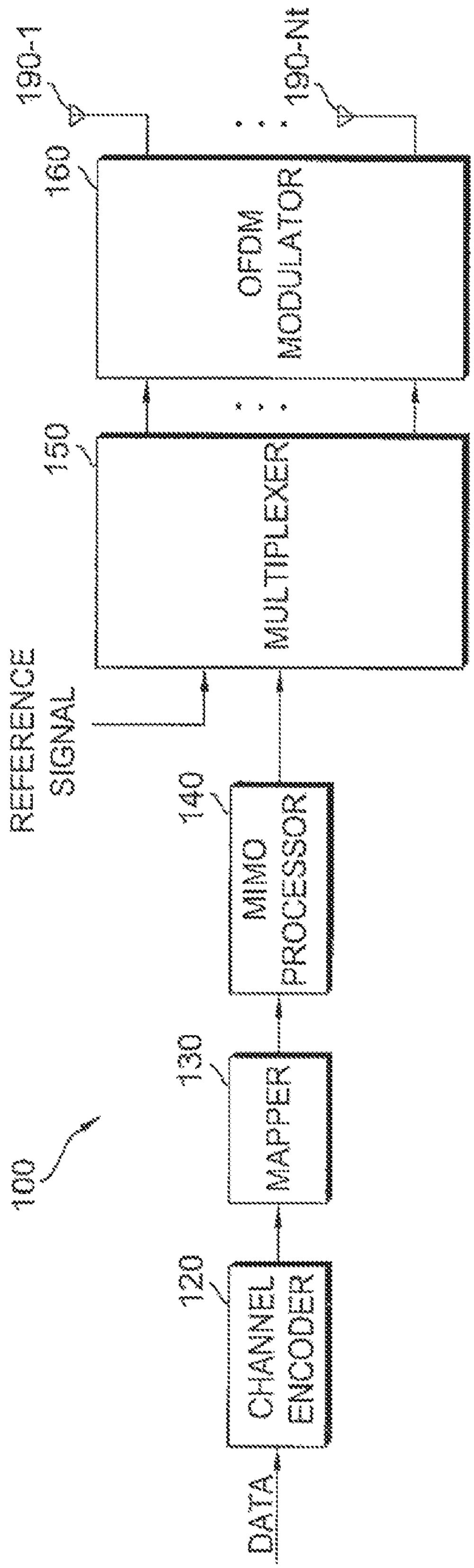
FIG. 1 is a block diagram of a transmitter having multiple antennas.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

The technique to be described below may be used in various communication systems. The communication systems are widely distributed so as to provide various communication services (e.g. voice, packet data, etc). The technique may be used for downlink or uplink. In general, downlink means communication from a base station (BS) to user equipment (UE), and uplink means communication from the UE to the BS. The BS is generally referred to a fixed station that communicates with the UE and may also be referred to as another terminology such as a node-B, a base transceiver system (BTS) and an access point. The UE may be fixedly located or may have mobility. The UE may also be referred to as another terminology such as a mobile station (MS), a user terminal (UT), a subscriber station (SS) and a wireless device.

A communication system may be either a multiple-input multiple-output (MIMO) system or a multiple-input single-output (MISO) system. The MIMO system includes a plurality of transmit antennas and a plurality of receive antennas. The MISO system includes a plurality of transmit antennas and a single receive antenna.

There is no limit in a multiple access modulation scheme. The multiple access modulation scheme may be a well-known single carrier modulation scheme (e.g. time division multiple access (TDMA), frequency division multiple access (FDMA), code division multiple access (CDMA), single carrier-frequency division multiple access (SC-FDMA)) or a multiple carrier modulation method (e.g. orthogonal frequency division multiplexing (OFDM)).

The channel estimation can be effectively performed by a receiver when reference signals are allocated under the following conditions.

First, the reference signals have to be allocated so that the receiver can distinguish the reference signals transmitted from multiple transmit antennas. This is because the reference signals are used by the receiver for the channel estimation. The reference signals can be allocated not to overlap one another in a time and/or frequency domain for the respective transmit antennas, so that the receiver can distinguish the reference signals. Alternatively, when the reference signals are orthogonal to each other in a code domain, the reference signals can overlap one another in the time and/or frequency domain. To achieve orthogonality in the code domain, the reference signals may use an orthogonal code having excellent auto-correlation or cross-correlation. Examples of the orthogonal code include a constant amplitude zero auto-correlation (CAZAC) sequence and a Walsh code.

Second, a channel variance has to be negligibly small in a region where the reference signals are placed. A channel in this region is used to decode data allocated adjacent to the reference signals. If the channel significantly changes in this region, a channel estimation error may become significant.

In exemplary embodiments, reference signals may be shifted by a specific interval on the time axis or by a specific interval on the frequency axis. That is, for each sub-frame for respective transmit antennas, the reference signals may be generally shifted by a specific time interval and/or by a specific frequency interval while the interval between reference signals is maintained.

A reference signal may be a reference signal for a user or a reference signal for a multi-user signal. The multi-user signal may be a broadcast signal and/or a multicast signal. The broadcast signal is sent to all users within a specific area (e.g. cell and/or sector). The multicast signal is sent to a specific group of users. A unicast signal is sent to a specific user. One example of the multi-user signal may be a mobile broadcast/multicast service (MBMS) signal. When transmitting the MBMS signal, the same signal is transmitted from all cells (or base stations).

Hereinafter, various examples of a reference signal allocation for an MIMO system having four transmit antennas will be described. The reference signals will be allocated according to the following principles. First, the number of reference signals for first and second antennas in a sub-frame is larger than that of reference signals for third and fourth antennas in the sub-frame. Second, the percentage occupied by the entire reference signals in the sub-frame is below a predetermined value. Third, Reference signals for each transmit antenna do not overlap one another.

A sub-frame includes a plurality of OFDM symbols in a time domain and a plurality of sub-carrier in a frequency domain. The sub-frame is a resource grid which is defined for each transmit antenna. A transmission time interval (TTI) can be defined as a time required for transmitting a single sub-frame. A frame may include a plurality of sub-frames. For example, one frame may include ten sub-frames.

The sub-frame can be divided by two regions, a control channel and a data channel. The control channel is the region carrying control data. The data channel is the region carrying user data. For example, a first OFDM symbol, a second OFDM symbol and a third OFDM symbol may be allocated for the control channel and the other OFDM symbols mat be allocated for the data channel. Although the number of OFDM symbols for the control channel is smaller than that of OFDM symbols for the control channel, the reliability for the control channel has to be higher than that of the data channel. Only a part of multiple antennas can be assigned for transmitting the control channel. A first antenna and a second antenna can be used for the control channel. In this case, reference signals for a third antenna and reference signals for a fourth antenna may not be assigned for the OFDM symbols for the control channel because the third antenna and the fourth antenna are not used for the control channel.

FIG. 1 is a block diagram of a transmitter having multiple antennas.

Referring to FIG. 1, a transmitter 100 includes a channel encoder 120, a mapper 130, an MIMO processor 140, a multiplexer 150 and an OFDM modulator 160. The channel encoder 120 encodes an input stream according to a predetermined coding scheme and then generates a coded word. The mapper 130 maps the coded word to a symbol that represents a position on signal constellation. Since there is no limit in a modulation scheme of the mapper 130, the modulation scheme may be m-phase shift keying (m-PSK) or m-quadrature amplitude modulation (m-QAM). Examples of the m-PSK include BPSK, QPSK, and 8-PSK. Examples of the m-QAM include 16-QAM, 64-QAM, and 256-QAM. The MIMO processor 140 processes an mapped symbol by using an MIMO scheme according to transmit antennas 190-1, . . . , 190-Nt (Nt>1). For example, the MIMO processor 140 may handle codebook-based pre-coding.

The multiplexer 150 allocates an input symbol and reference signals to a sub-carrier. The reference signals are allocated for the respective transmit antennas 190-1, . . . , 190-Nt. The reference signals, also referred to as pilots, are used for channel estimation or data demodulation and are known by both the transmitter 100 and a receiver 200 of FIG. 2. The OFDM modulator 160 modulates a multiplexed symbol and thus outputs an OFDM symbol. The OFDM modulator 160 may perform inverse fast Fourier transform (IFFT) on the multiplexed symbol, and may further insert a cyclic prefix (CP) therein after IFFT is performed. The OFDM symbol is transmitted through the respective transmit antennas 190-1, . . . , 190-Nt.

Figure 2:
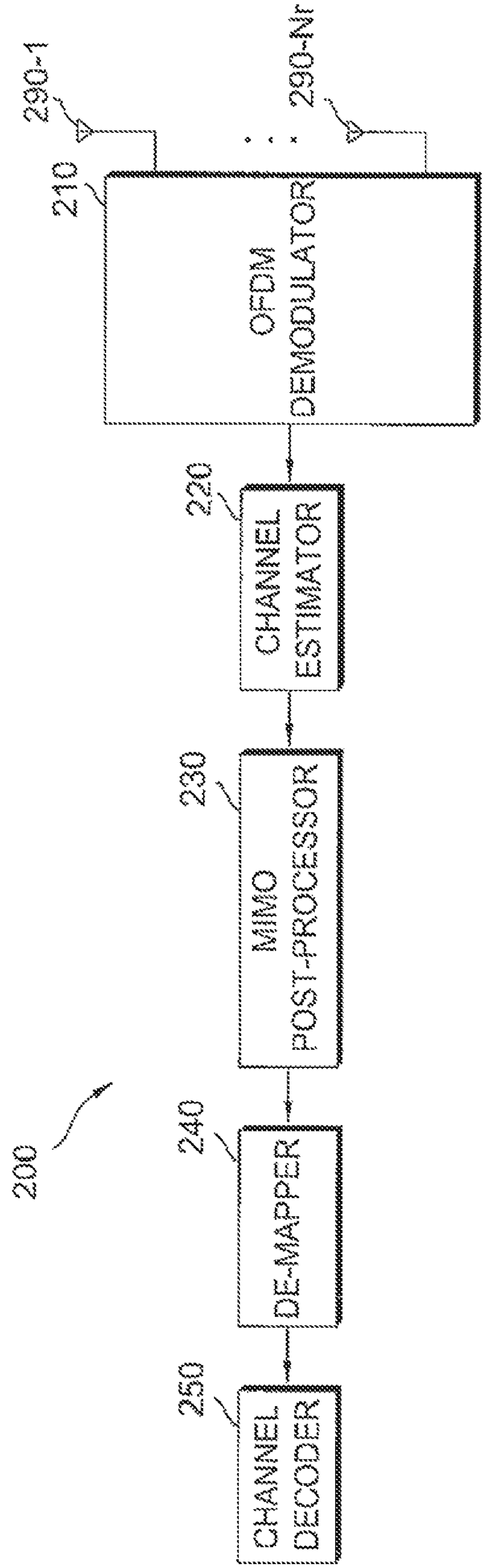
FIG. 2 is a block diagram of a receiver having multiple antennas.

FIG. 2 is a block diagram of a receiver having multiple antennas.

Referring to FIG. 2, a receiver 200 includes an OFDM demodulator 210, a channel estimator 220, an MIMO post-processor 230, a de-mapper 240, and a channel decoder 250. Signals received from receive antennas 290-1, . . . , 290-Nr are subject to fast Fourier transform (FFT) by the OFDM demodulator 210. The channel estimator 220 obtains an estimated channel by using reference signals. The MIMO post-processor 230 performs post-processing equivalent to the MIMO processor 140. The de-mapper 240 de-maps the input symbol to a coded word. The channel decoder 250 decodes the coded word so as to be restored to original data.

Now, allocation of reference signals will be described.

Figure 3:
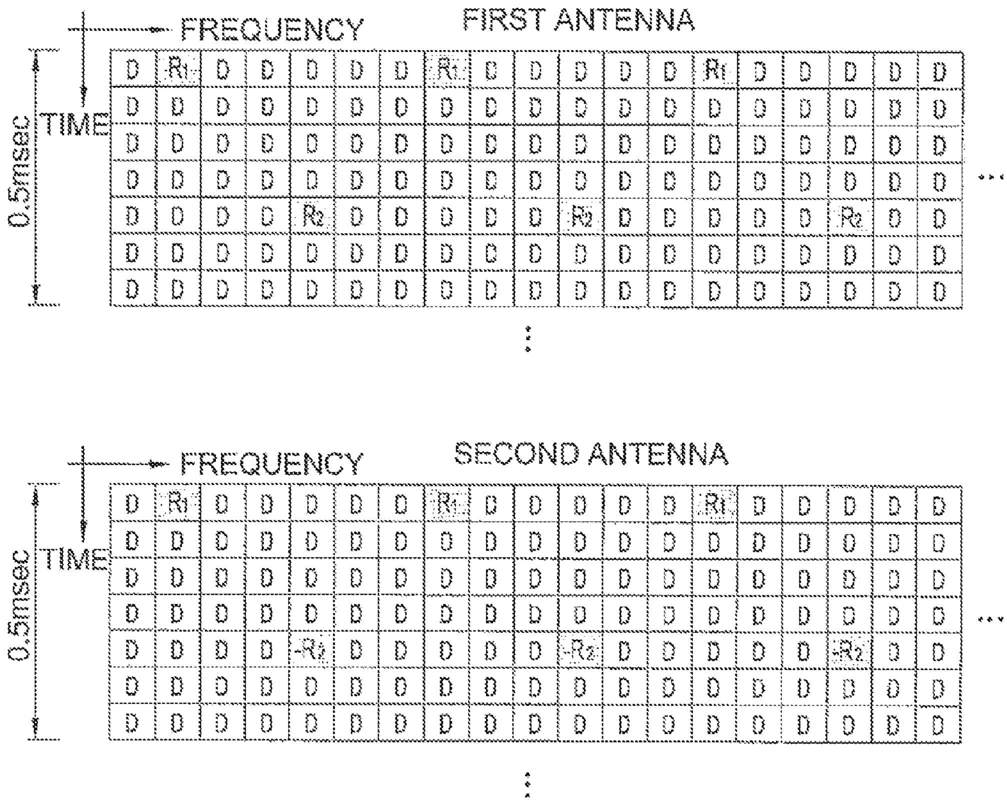
FIG. 3 illustrates an example of a reference signal allocation when two transmit antennas are used.

FIG. 3 illustrates an example of a reference signal allocation when two transmit antennas are used. In general, data transmission can be achieved in the unit of a sub-frame for respective transmit antennas according to an OFDM modulation scheme. For example, the sub-frame shown in FIG. 3 includes seven OFDM symbols where a TTI is 0.5 millisecond (msec.). However, the present inventive concept is not limited thereto, and thus the sub-frame and the TTI may be configured in various forms.

Referring to FIG. 3, reference signals are respectively allocated for a sub-frame of a first antenna and a sub-frame of a second antenna. D denotes a data symbol for carrying data, $R_1$ denotes a first reference signal for the first antenna and $R_2$ denotes a second reference signal for the second antenna. The first reference signal $R_1$ may be equal to or different from the second reference signal $R_2$.

Each of elements over a resource grid constituting a sub-frame is referred to as a resource element. For example, a resource element q(k,l) is placed at a k-th OFDM symbol and an l-th sub-carrier. The data symbol D, the first reference signal $R_1$, and the second reference signal $R_2$ are carried in one resource element.

Regarding the sub-frame of the first antenna, the reference signals are allocated over seven OFDM symbols. For clarity of description, hereinafter, the seven OFDM symbols will be respectively referred to as a first OFDM symbol, a second OFDM symbol, . . . , and a seventh OFDM symbol from the beginning of a TTI.

In the first OFDM symbol, the first reference signals $R_1$ may be allocated at the interval of six sub-carriers. Likewise, in the fifth OFDM symbol, the second reference signals $R_2$ may be allocated at the interval of six sub-carriers. In the fifth OFDM symbol, the second reference signals $R_2$ are each shifted by the size of three sub-carriers from positions where the first reference signals $R_1$ in the first OFDM symbol are placed. In the sub-frame, an array of ($R_1$, D, D, D, D, D) is repeated in the first OFDM symbol and an array of (D, D, D, $R_2$, D, D) is repeated in the fifth OFDM symbol.

Regarding the second antenna, reference signals are allocated in the same pattern as in the first antenna. In the first OFDM symbol, the first reference signals $R_1$ are allocated at the interval of six sub-carriers. In the fifth OFDM symbol, negative second reference signals $-R_2$ are allocated at the interval of six sub-carriers. The negative second reference signals $-R_2$ are obtained by negating the second reference signals $R_2$. In the fifth OFDM symbol, the negative second reference signals $-R_2$ are each shifted by the size of three sub-carriers from positions where the first reference signals $R_1$ in the first OFDM are placed. That is, an array of ($R_1$, D, D, D, D, D) is repeated in the first OFDM symbol and an array of (D, D, D, $-R_2$, D, D) is repeated in the fifth OFDM symbol.

Since the reference signals are allocated in the same pattern in both the first and second antennas, an orthogonal code can be used so that the receiver can distinguish the reference signals for the respective transmit antennas. The orthogonal code may be a CAZAC sequence or a Walsh sequence having excellent auto-correlation or cross-correlation.

Figure 4:
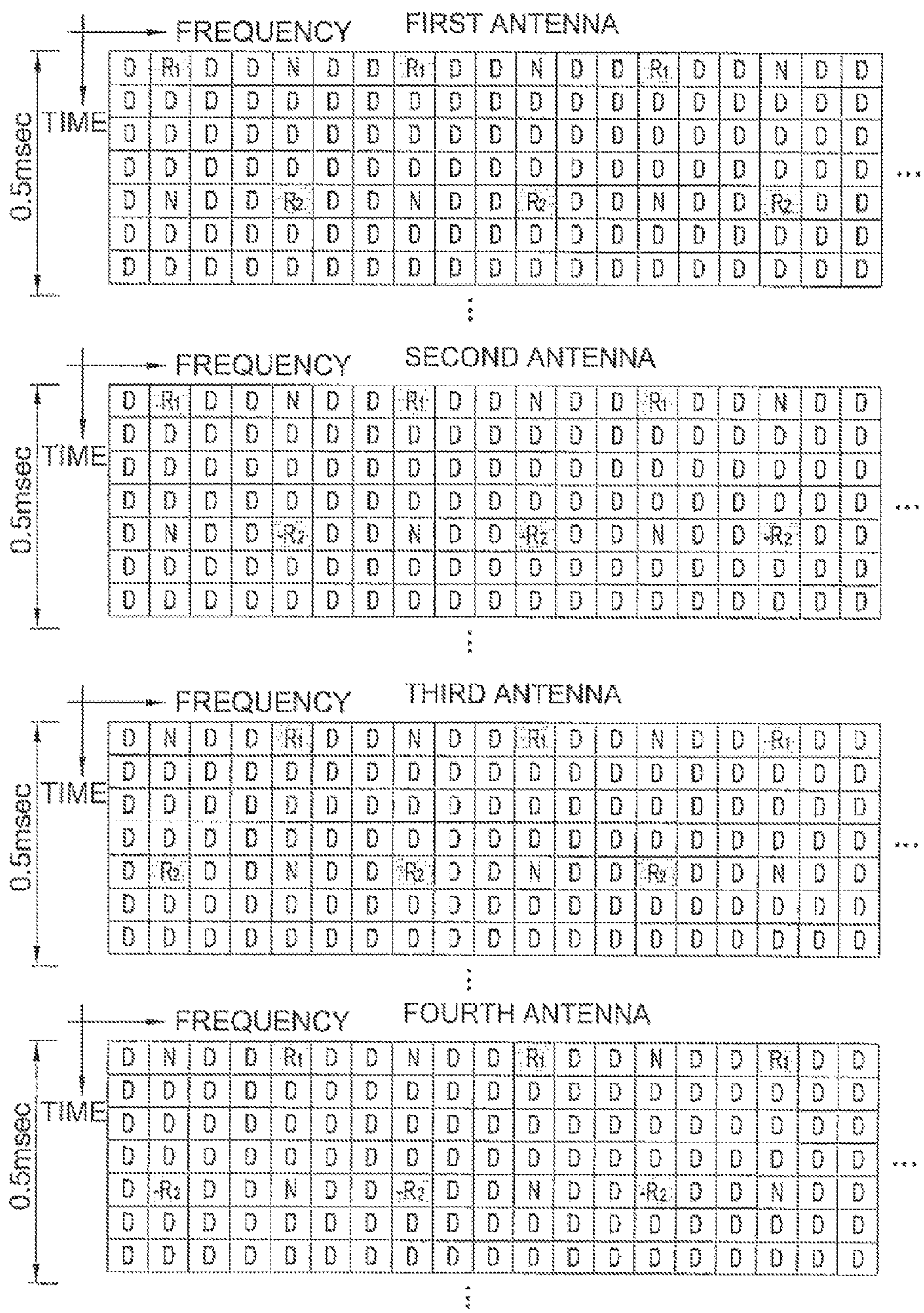
FIG. 4 illustrates an example of a reference signal allocation when four transmit antennas are used.

FIG. 4 illustrates an example of a reference signal allocation when four transmit antennas are used. The reference signals are allocated for each sub-frame for the respective transmit antennas. Here, N denotes a null symbol, $R_1$ denotes a first reference signal, $R_2$ denotes a second reference signal and D denotes a data symbol. The null symbol can be defined as a symbol that does not carry data. The null symbol may be generated when no data is allocated to a sub-carrier or when the sub-carrier allocated with data is punctured later.

Regarding the first antenna, reference signals are allocated at the interval of six sub-carriers. In other words, the reference signals are placed with five sub-carriers therebetween. The five sub-carriers may include four data symbols D and one null symbol. Therefore, the first OFDM symbol is repeated with an array of ($R_1$, D, D, N, D, D). The null symbol is allocated to a resource element where reference signals for the third and fourth antennas to be described below are placed. Reference signals are not allocated in the second, third, and fourth OFDM symbols. Instead, data symbols D are allocated therein. Reference signals may be allocated at the interval of six sub-carriers in the fifth OFDM symbol. The reference signals in the fifth OFDM symbol are each shifted by the size of three sub-carriers from positions where the reference signals in the first OFDM symbol are placed. The sixth and seventh OFDM symbols are allocated with data symbols instead of reference signals.

Regarding the second antenna, reference signals are allocated in the same pattern as those of the first antenna. The reference signals for the first and second antennas are allocated to overlap each other in the same OFDM symbols and sub-carriers. The receiver may use an orthogonal code having an excellent auto-correlation or cross-correlation in order to distinguish the reference signals for the first antenna from the reference signals for the second antenna. By using orthogonality of the reference signals $R_1$ and $R_2$ transmitted through the first antenna and the reference signals $R_1$ and $-R_2$ transmitted through the second antenna, the receiver may separate these reference signals from one another.

Regarding the third antenna, reference signals are allocated as follows. The reference signals $R_1$ are allocated at the interval of six sub-carriers in the first OFDM symbol. Likewise, the reference signals $R_2$ are allocated at the interval of six sub-carriers in the fifth OFDM symbol. The reference signals $R_2$ in the fifth OFDM symbol are each shifted by the size of three sub-carriers from positions where the reference signals $R_1$ in the first OFDM symbol are placed. Therefore, an array of (N, D, D, $R_1$, D, D) is repeated in the first OFDM symbol, and an array of ($R_2$, D, D, N, D, D) is repeated in the fifth OFDM symbol. Regarding the fourth antenna, reference signals are allocated in the same pattern as those of the third antenna. Reference signals are allocated at the interval of six sub-carriers in the first and fifth OFDM symbols. The receiver may use an orthogonal code in order to distinguish the reference signals for the third antenna from the reference signals for the fourth antenna.

Although the aforementioned reference signal allocation is exemplified, the present inventive concept is not limited thereto, and thus reference signals may be shifted by a specific interval on the time axis or by a specific interval on the frequency axis. That is, for each sub-frame for respective transmit antennas, the reference signals may be generally shifted by a specific time interval and/or by a specific frequency interval while the interval between reference signals is maintained. Since the reference signals can be generally shifted as described above without having to reallocate the reference signals, channel estimation can be achieved for multiple cells, multiple sectors and multiple users.

In the meantime, reference signals for a specific antenna may be partially or entirely used (or not used) according to time-varying channel variation in a multiple of the number of sub-frames.

In the aforementioned descriptions, the reference signals overlap one another when at least two transmit antennas are used. The overlapping reference signals maintain their orthogonality in the code domain by using an orthogonal code.

Figure 5:
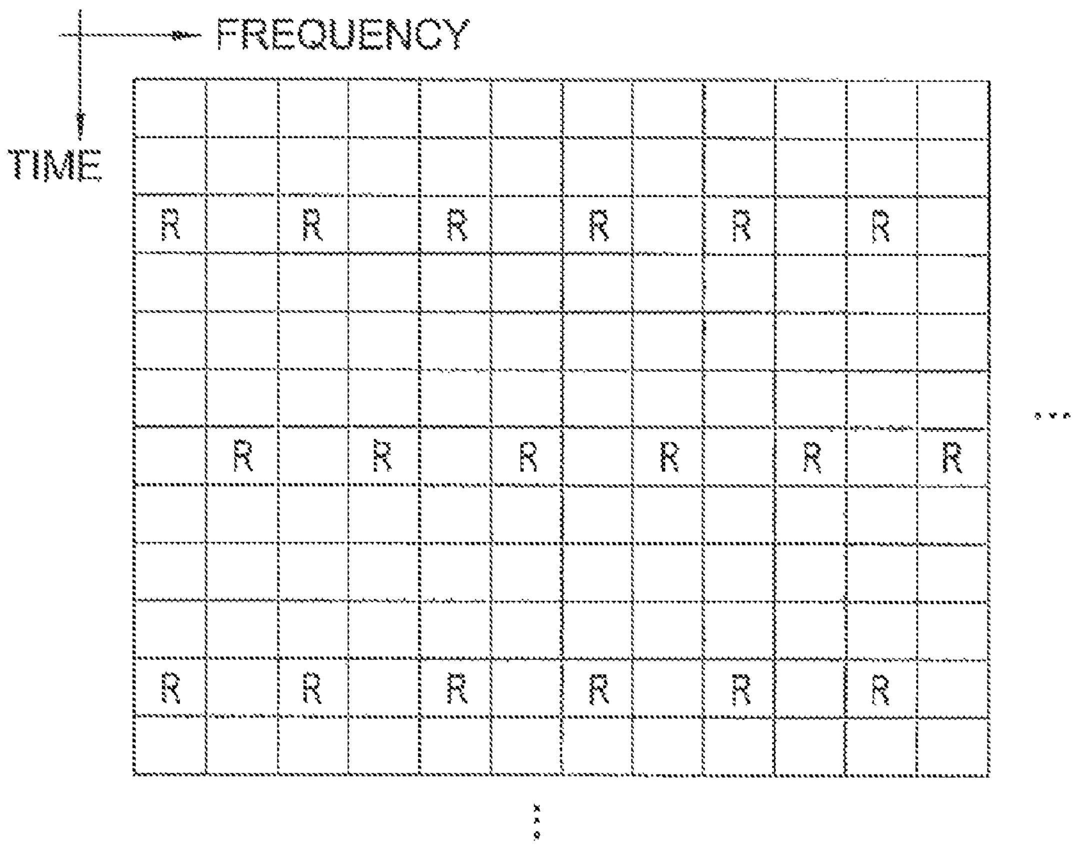
FIG. 5 illustrates an example of a reference signal allocation.

FIG. 5 illustrates an example of a reference signal allocation. R denotes a reference signal and a blank of a resource element denotes a data symbol or a null symbol.

Referring to FIG. 5, a plurality of reference signals R is allocated at the interval of two sub-carriers in the third OFDM symbol. A plurality of reference signals R is also allocated at the interval of two sub-carriers in the seventh OFDM symbol which is spaced apart by the size of four OFDM symbols from the third OFDM symbol. The reference signals R in the third and seventh OFDM symbols are staggered from each other. A plurality of reference signals R is allocated at the interval of two sub-carriers in the eleventh OFDM symbol which is spaced apart by the size of four OFDM symbols from the seventh OFDM symbol.

Each reference signal R may be a reference signal for a multi-user signal. Here, the multi-user signal may be a broadcast signal and/or a multicast signal. The broadcast signal is sent to all users within a specific area (e.g. cell and/or sector). The multicast signal is sent to a specific group of users. A unicast signal is sent to a specific user. One example of the multi-user signal may be a mobile broadcast/multicast service (MBMS) signal. When transmitting the MBMS signal, the same signal is transmitted from all cells (or base stations). Therefore, all base stations use the same reference signal.

When using the MBMS signal, the reference signals R can be placed with a narrow interval therebetween so as to minimize frequency selectivity due to delay spread. In addition, the reference signals are densely arranged on the time axis so as to minimize time selectivity.

According to some MIMO technique such as cyclic delay diversity (CDD) and beam-forming, an UE seems to receive reference signals through single transmit antenna. Therefore a BS does not need to transmit the reference signals after classifying the reference signals for each transmit antennas.

Figure 6:
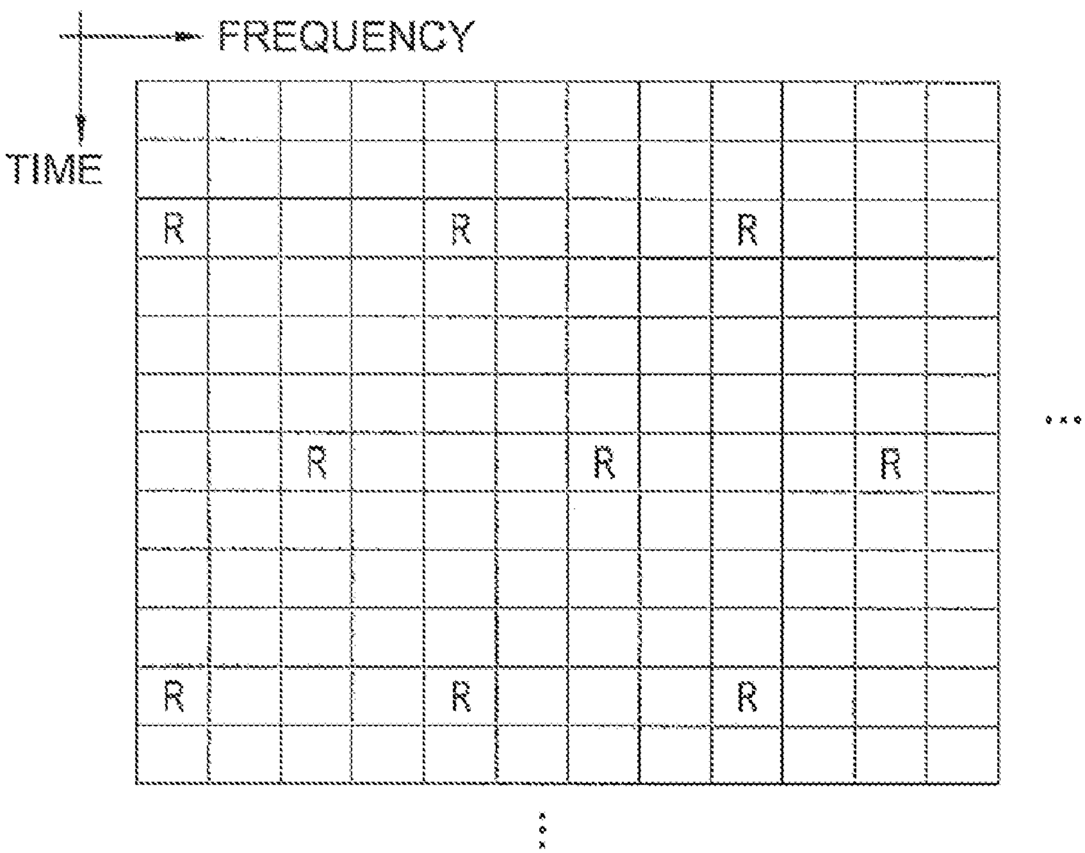
FIG. 6 illustrates another example of a reference signal allocation.

FIG. 6 illustrates another example of a reference signal allocation.

Referring to FIG. 6, reference signals R are placed with a relatively wider interval of the frequency domain therebetween than that of FIG. 5. By dosing so, it is advantageous when frequency selectivity is relatively low or when bandwidth of sub-carrier is relatively small. The bandwidth of sub-carrier may be half that of sub-carrier shown in FIG. 5.

Figure 7:
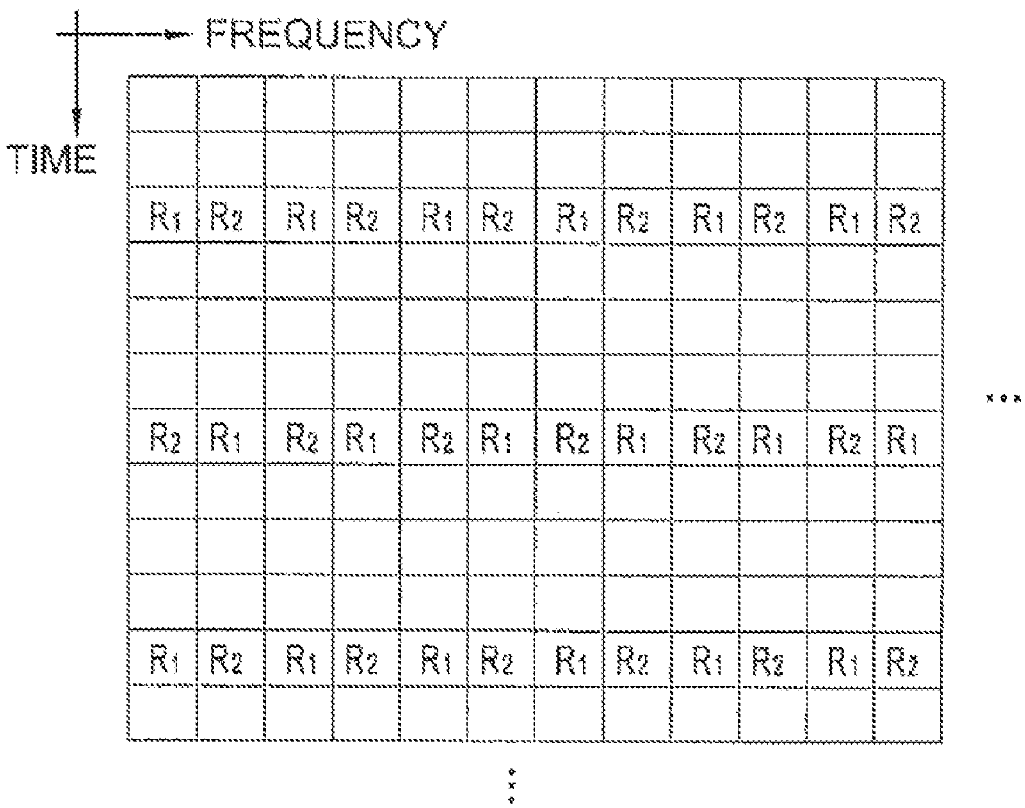
FIGS. 7 through 19 illustrate examples of a reference signal allocation for a multi-user signal.

FIG. 7 illustrates an example of a reference signal allocation for a multi-user signal. Herein, $R_1$ is a reference signal for the first antenna. $R_2$ is a reference signal for the second antenna.

Referring to FIG. 7, the reference signals $R_1$ are allocated at the interval of two sub-carriers in the third OFDM symbol. That is, the reference signals $R_1$ are placed with one sub-carrier therebetween. Therefore, an array of ($R_1$, N) is repeated in the third OFDM symbol, where N denotes a null symbol. The reference signals $R_1$ are allocated at the interval of two sub-carriers in the seventh OFDM symbol which is spaced apart by the size of four OFDM symbols from the third OFDM symbol. The reference signals $R_1$ in the third and seventh OFDM symbols are staggered from each other.

The reference signals $R_2$ are alternately allocated in the same OFDM symbol with respect to the reference signal $R_1$. That is, one reference signal $R_2$ is placed between two reference signals $R_1$ with the same interval in the frequency domain.

Figure 8:
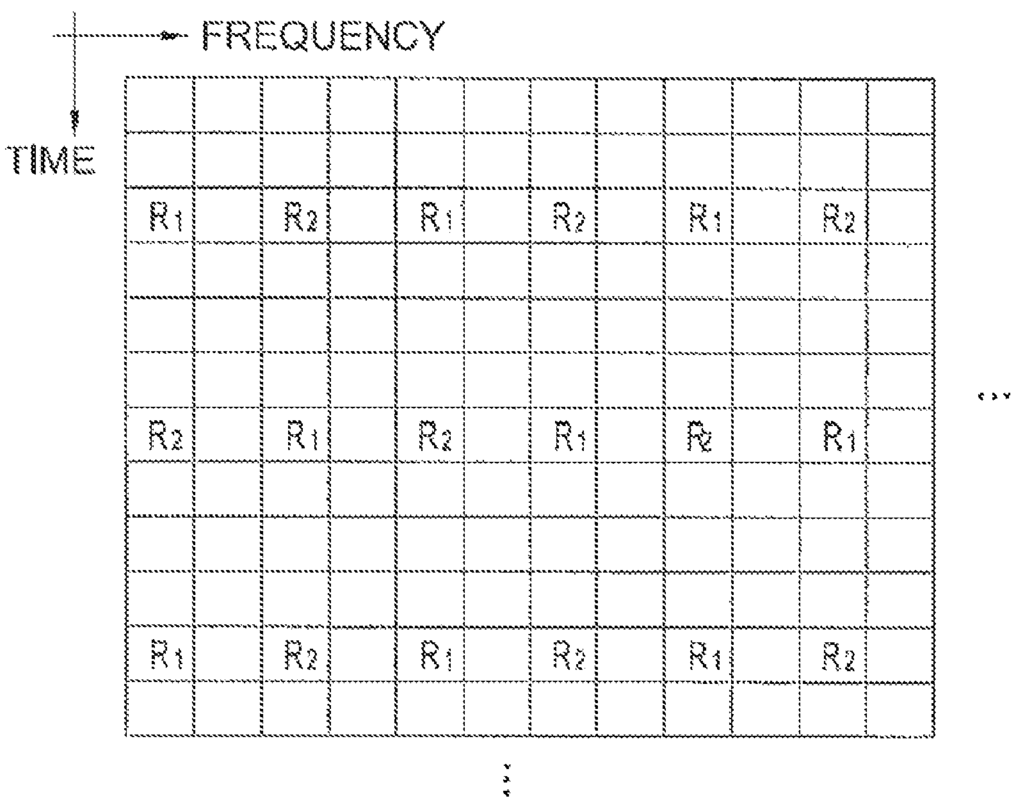

FIG. 8 illustrates another example of a reference signal allocation for a multi-user signal when multiple antennas are used.

Referring to FIG. 8, the reference signals $R_1$ for the first antenna are allocated at the interval of four sub-carriers in the third OFDM symbol. That is, the reference signals $R_1$ are placed with three sub-carriers therebetween. Therefore, an array of ($R_1$, D, N, D) is repeated in the third OFDM symbol where a blank of a resource element denotes D and N. The reference signals $R_1$ are allocated at the interval of four sub-carriers in the seventh OFDM symbol which is spaced apart by the size of four OFDM symbols from the third OFDM symbol. The reference signals $R_1$ in the third and seventh OFDM symbols are staggered from each other.

The reference signals $R_2$ for the second antenna are alternately arranged with respect to the reference signal $R_1$ in the same OFDM symbols at the same interval as the reference signals $R_1$. That is, one reference signal $R_2$ is placed between two reference signals $R_1$ with the same interval in the frequency domain.

Figure 9:
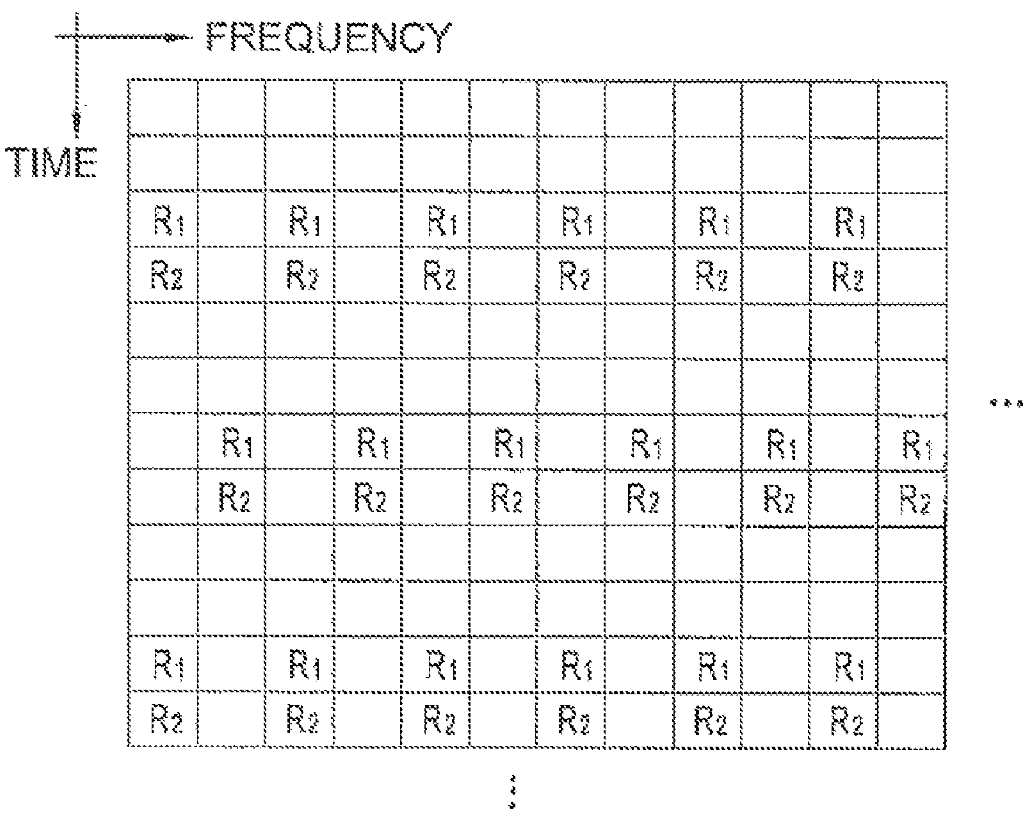

FIG. 9 illustrates another example of a reference signal allocation for a multi-user signal when multiple antennas are used.

Referring to FIG. 9, the reference signals $R_1$ for the first antenna are allocated at the interval of two sub-carriers in the third OFDM symbol. That is, the reference signals $R_1$ are placed with one sub-carrier therebetween. Therefore, an array of ($R_1$, N) is repeated in the third OFDM symbol. The reference signals $R_1$ are allocated at the interval of two sub-carriers in the seventh OFDM symbol which is spaced apart by the size of four OFDM symbols from the third OFDM symbol. The reference signals $R_1$ in the third and seventh OFDM symbols are staggered from each other in the frequency domain.

The reference signals $R_2$ for the second antenna are allocated in the same frequency domain as in the case of the reference signals $R_1$ in OFDM symbols (e.g. fourth OFDM symbol, eighth OFDM symbol, etc) which are adjacent to the OFDM symbols where the reference signals $R_1$ are allocated. That is, the frequency signals $R_2$ are allocated at the same interval as the frequency signals $R_2$.

Figure 10:
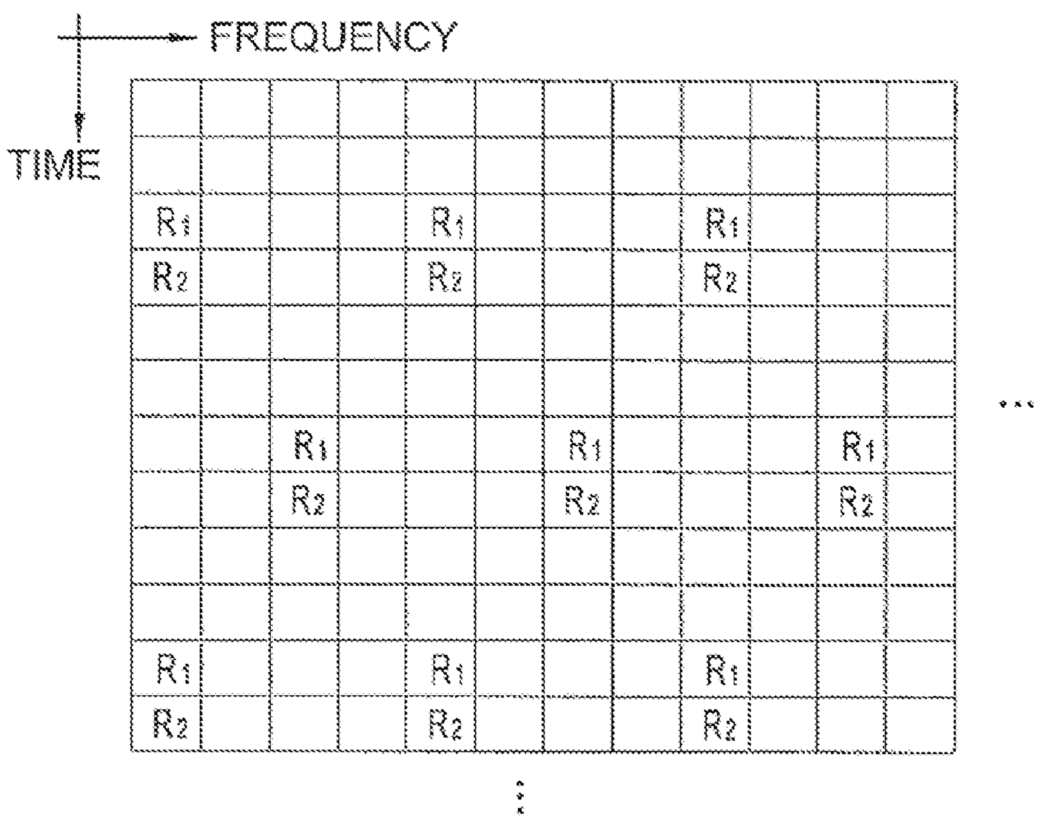

FIG. 10 illustrates another example of a reference signal allocation for a multi-user signal when multiple antennas are used.

Referring to FIG. 10, the reference signals $R_1$ for the first antenna are allocated at the interval of four sub-carriers in the third OFDM symbol. That is, the reference signals $R_1$ are placed with three sub-carriers therebetween. Therefore, an array of ($R_1$, D, N, D) is repeated in the third OFDM symbol. The reference signals $R_1$ are allocated at the interval of four sub-carriers in the seventh OFDM symbol which is spaced apart by the size of four OFDM symbols from the third OFDM symbol. The reference signals $R_1$ in the third and seventh OFDM symbols are staggered from each other.

The reference signals $R_2$ for the second antenna are allocated in the same frequency domain as in the case of the reference signals $R_1$ in OFDM symbols (e.g. fourth OFDM symbol, eighth OFDM symbol, etc) which are adjacent to the OFDM symbols where the reference signals $R_1$ are allocated. That is, the frequency signals $R_2$ are allocated at the same interval as the frequency signals $R_2$ in the frequency domain.

Figure 11:
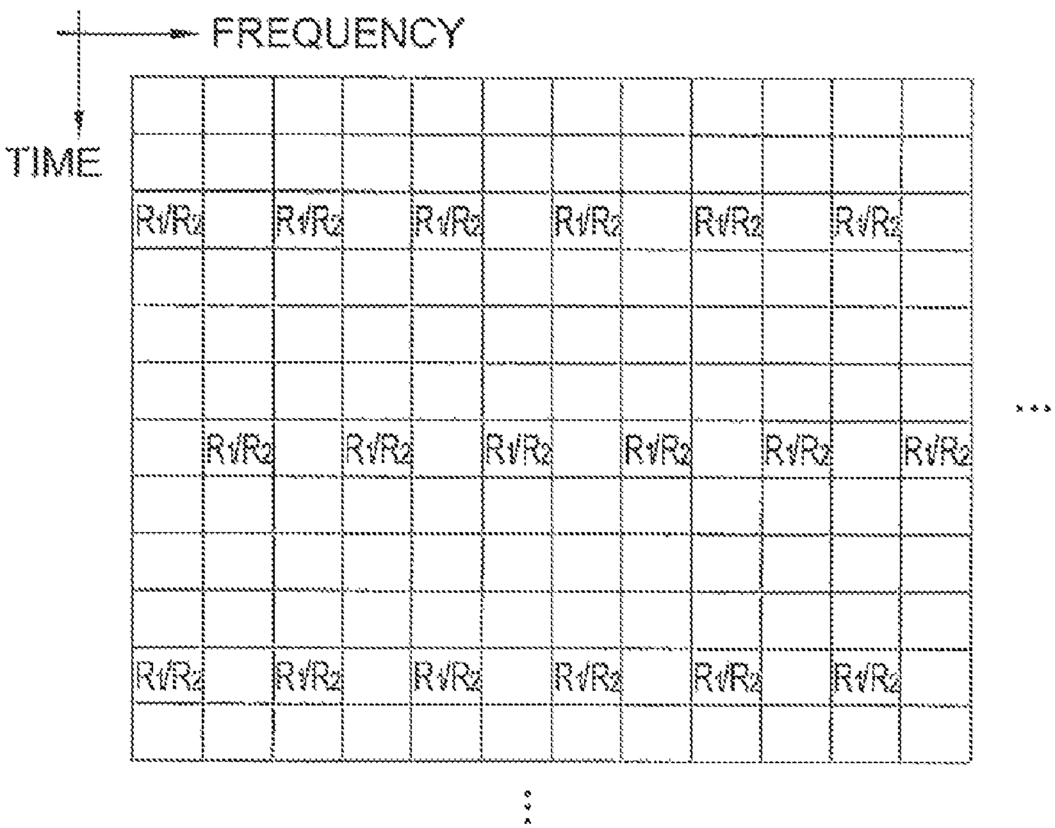

FIG. 11 illustrates another example of a reference signal allocation for a multi-user signal when multiple antennas are used.

Referring to FIG. 11, the reference signals $R_1$ for the first antenna are allocated at the interval of two sub-carriers in the third OFDM symbol. That is, the reference signals $R_1$ are placed with one sub-carrier therebetween. Therefore, an array of ($R_1$, N) is repeated in the third OFDM symbol. The reference signals $R_1$ are allocated at the interval of two sub-carriers in the seventh OFDM symbol which is spaced apart by the size of four OFDM symbols from the third OFDM symbol. The reference signals $R_1$ in the third and seventh OFDM symbols are staggered from each other.

The reference signals $R_2$ for the second antenna overlap the reference signals $R_1$ in the same OFDM symbols in the same frequency domain. The reference signals $R_1$ and $R_2$ can maintain orthogonality in the code domain by using the orthogonal code.

Figure 12:
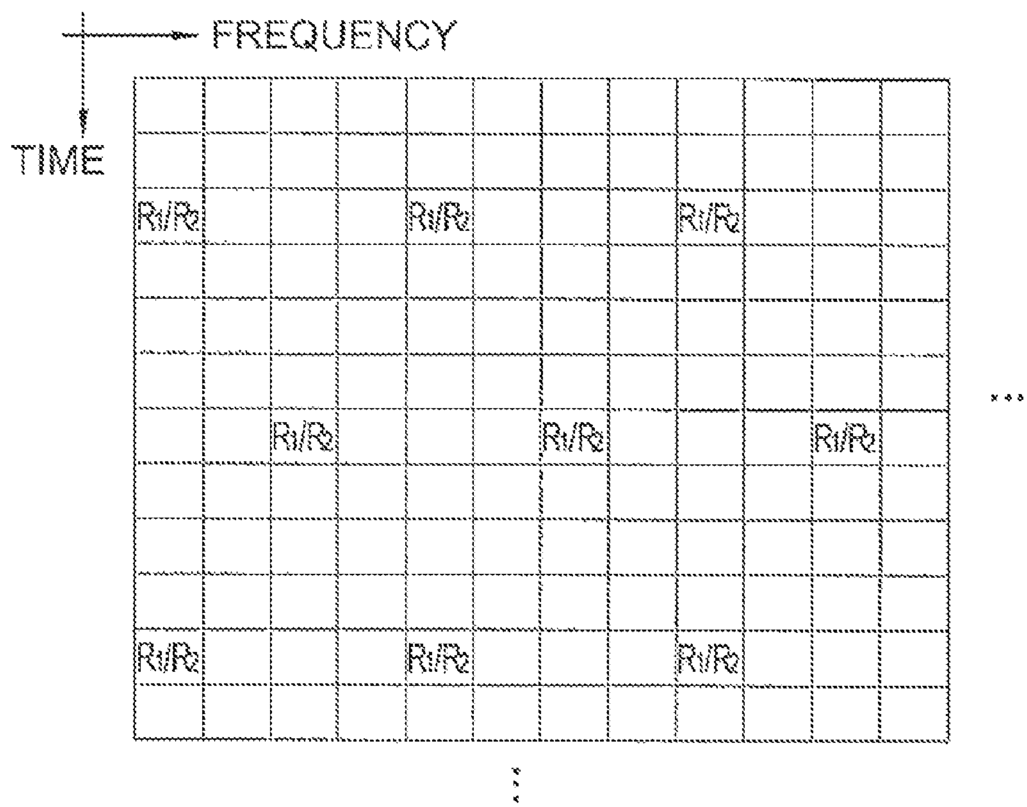

FIG. 12 illustrates another example of a reference signal allocation for a multi-user signal when multiple antennas are used.

Referring to FIG. 12, the reference signals $R_1$ for the first antenna are allocated at the interval of four sub-carriers in the third OFDM symbol. That is, the reference signals $R_1$ are placed with three sub-carriers therebetween. Therefore, an array of ($R_1$, D, N, D) is repeated in the third OFDM symbol. The reference signals $R_1$ are allocated at the interval of four sub-carriers in the seventh OFDM symbol which is spaced apart by the size of four OFDM symbols from the third OFDM symbol. The reference signals $R_1$ in the third and seventh OFDM symbols are staggered from each other.

The reference signals $R_2$ for the second antenna overlap the reference signals $R_1$ in the same OFDM symbols in the same frequency domain. The reference signals $R_1$ and $R_2$ can maintain orthogonality in the code domain by using the orthogonal code.

Figure 13:
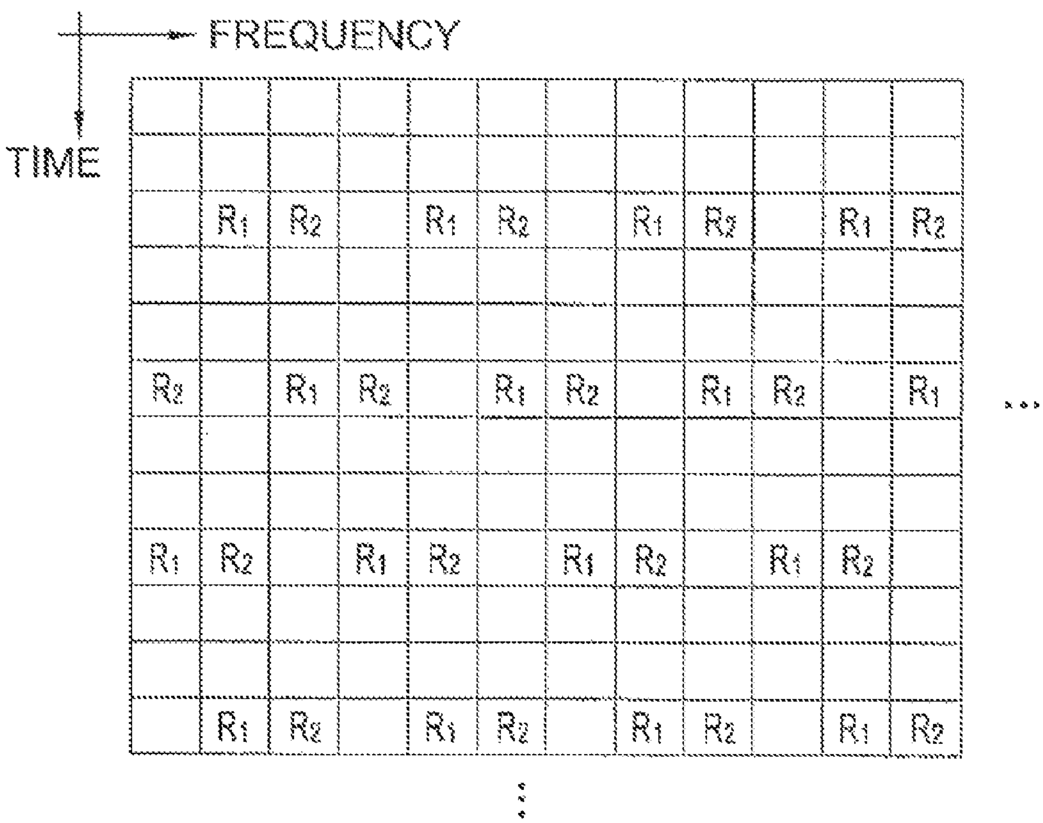

FIG. 13 illustrates another example of a reference signal allocation for a multi-user signal when multiple antennas are used.

Referring to FIG. 13, the reference signals $R_1$ for the first antenna are allocated at the interval of three sub-carriers in the third OFDM symbol. The reference signals $R_2$ for the second antenna are adjacent to the reference signals $R_1$ and are allocated at the same interval as the reference signals $R_1$. Therefore, an array of ($R_1$, $R_2$, D) is repeated in the third OFDM symbol.

Both of the reference signals $R_1$ and $R_2$ are allocated in OFDM symbols which are spaced apart by the size of three OFDM symbols starting from the third OFDM symbol.

Figure 14:
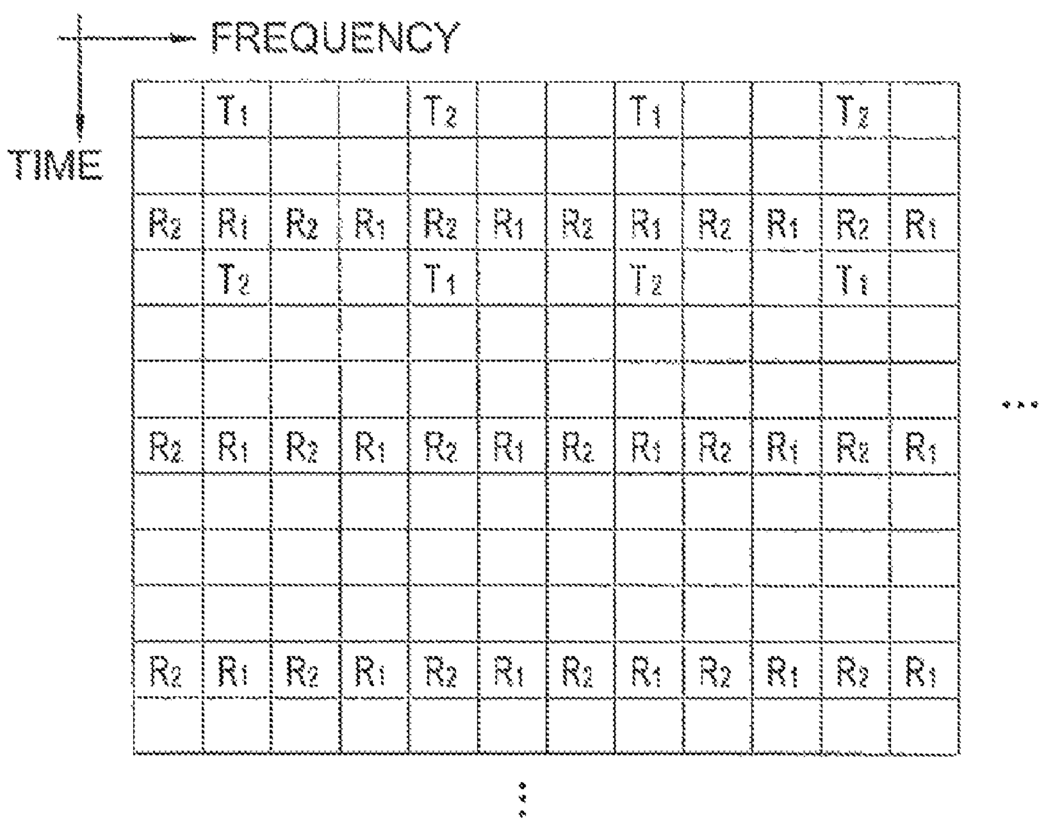

FIG. 14 illustrates another example of a reference signal allocation for a multi-user signal when multiple antennas are used. Throughout FIGS. 14 to 19, R denotes a reference signal for a multi-user signal, and T denotes a reference signal for a dedicated user signal. That is, hereinafter, two heterogeneous reference signals will be exemplified.

Referring to FIG. 14, the reference signals $T_1$ for the first antenna and the reference signals $T_2$ for the second antenna are allocated in the first OFDM symbol. In addition, the reference signals $T_1$ and $T_2$ are also allocated in the fourth OFDM symbol. The reference signals $R_1$ for the first antenna and the reference signals $R_2$ for the second antenna are allocated in OFDM symbols which are spaced apart by the size of four OFDM symbols from the third OFDM symbol.

Figure 15:
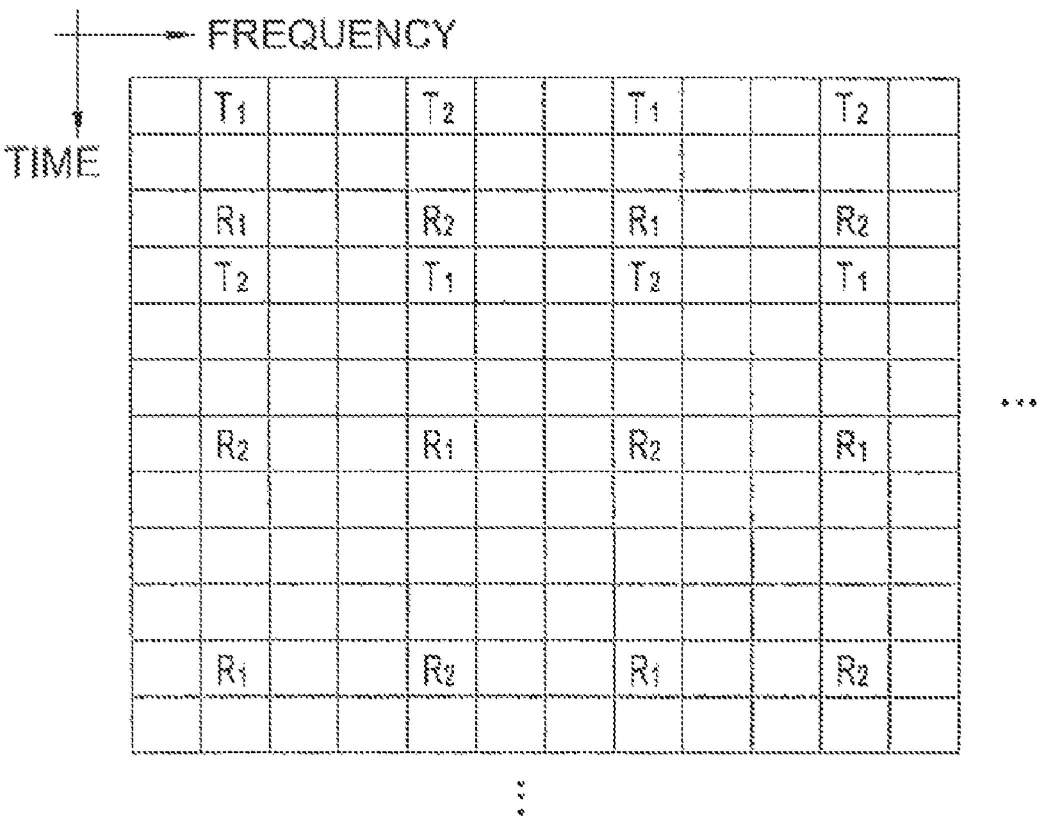

FIG. 15 illustrates another example of a reference signal allocation for a multi-user signal when multiple antennas are used.

Referring to FIG. 15, the reference signals $R_1$ for the first antenna and the reference signals $R_2$ for the second antenna are allocated at a wider interval than those in the example of FIG. 14.

Figure 16:
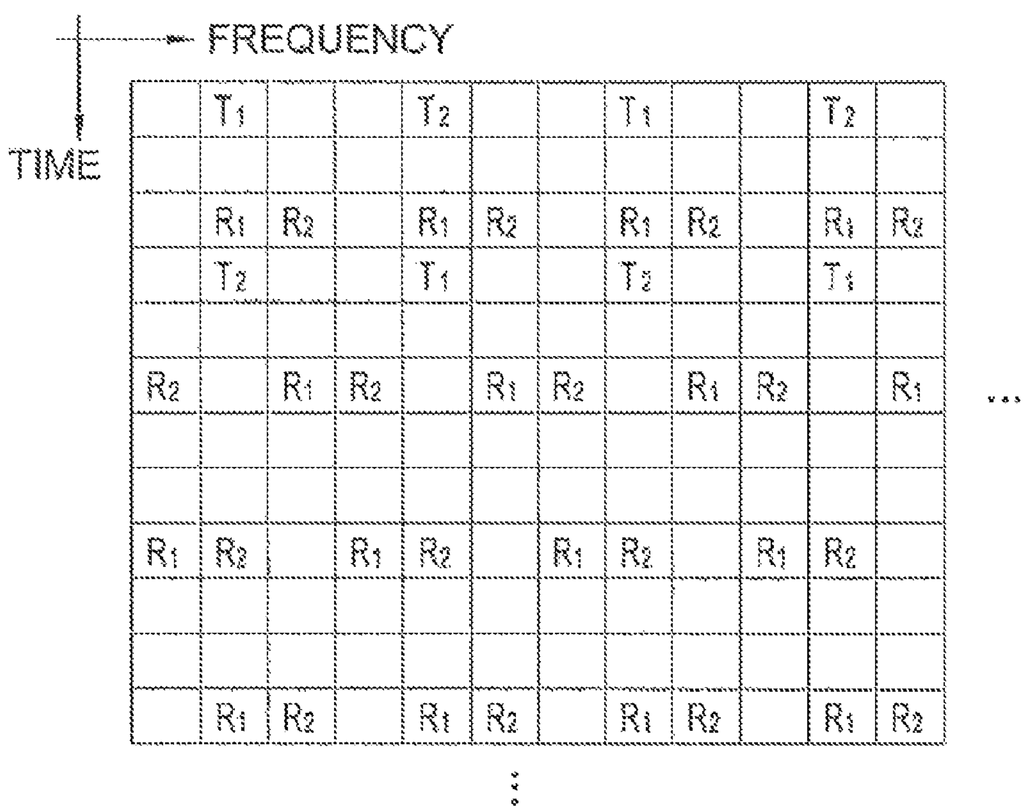

FIG. 16 illustrates another example of a reference signal allocation for a multi-user signal when multiple antennas are used.

In comparison with the example of FIG. 4, referring to FIG. 16, the reference signals $R_1$ for the first antenna and the reference signals $R_2$ for the second antenna are respectively allocated at the interval of three sub-carriers in the third OFDM symbol. The reference signals $R_2$ are adjacent to the reference signals $R_1$ and are allocated at the same interval as the reference signals $R_1$.

Figure 17:
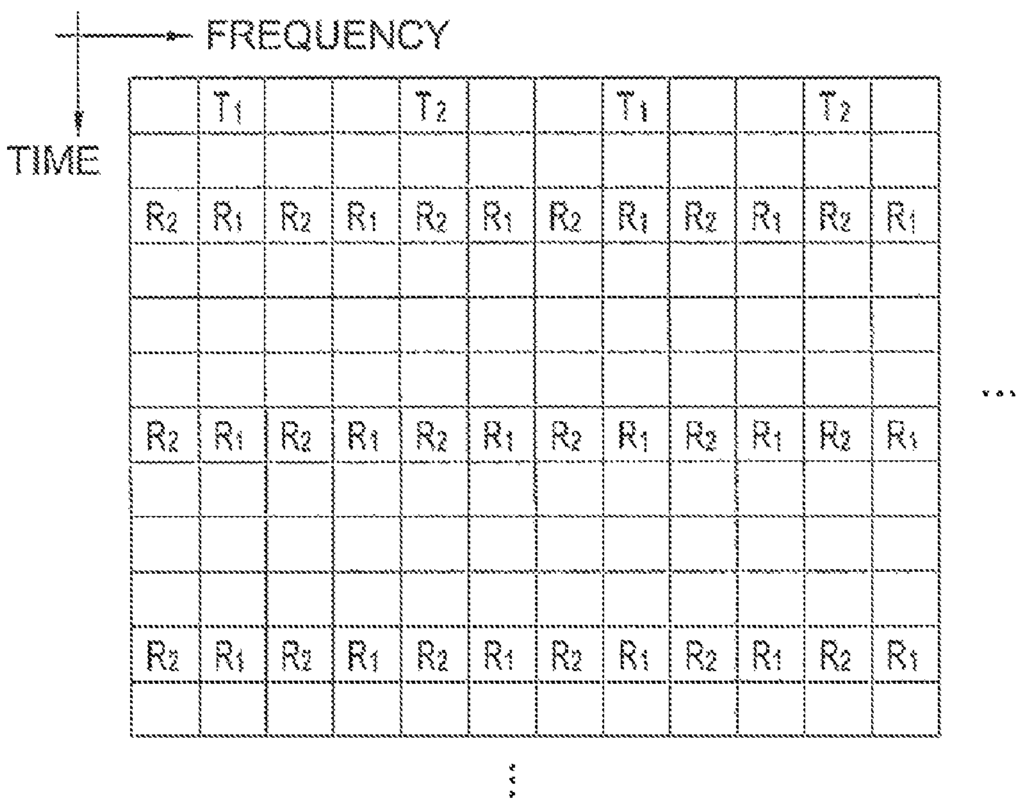

FIG. 17 illustrates another example of a reference signal allocation for a multi-user signal when multiple antennas are used.

In comparison with the example of FIG. 14, referring to FIG. 17, the reference signals $T_1$ for the first antenna and the reference signals $T_2$ for the second antenna are allocated only in the first OFDM.

Figure 18:
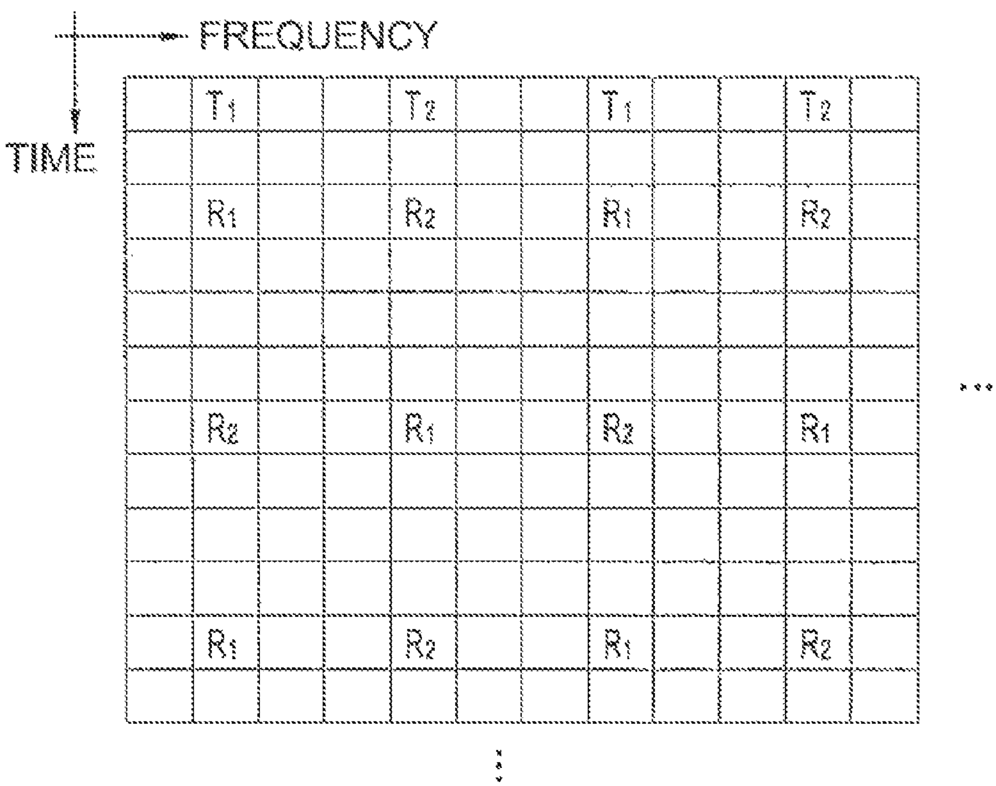

FIG. 18 illustrates another example of a reference signal allocation for a multi-user signal when multiple antennas are used.

Referring to FIG. 18, the reference signals $R_1$ for the first antenna and the reference signals $R_2$ for the second antenna are allocated at a wider interval than those in the example of FIG. 17.

Figure 19:
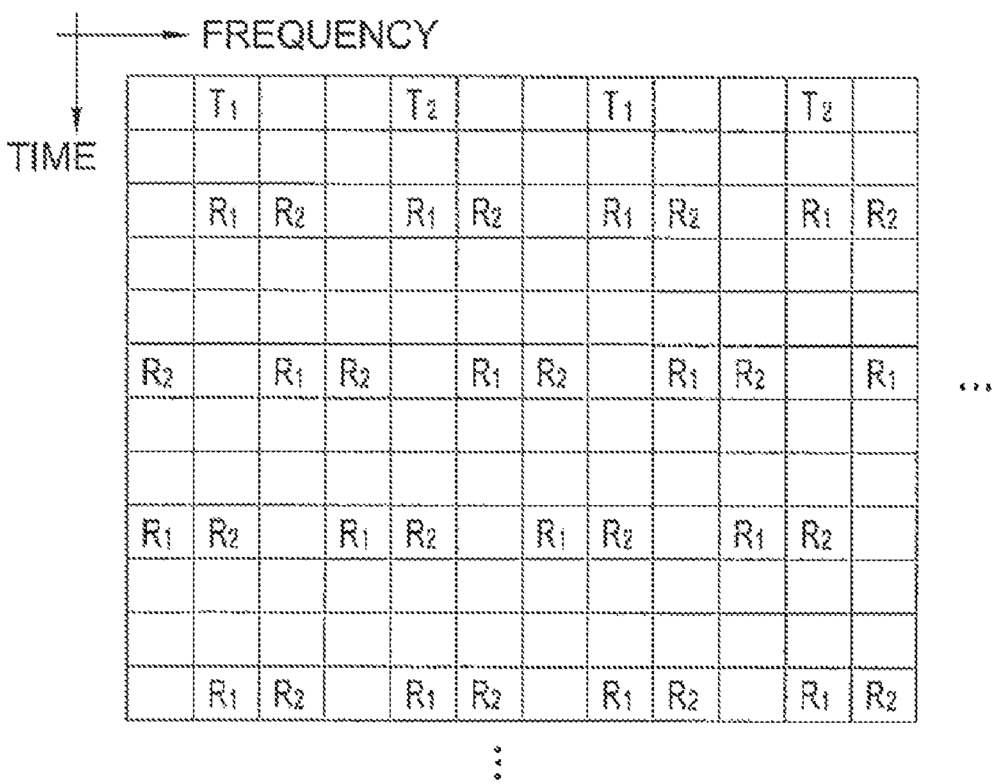

FIG. 19 illustrates another example of a reference signal allocation for a multi-user signal when multiple antennas are used.

In comparison with the example of FIG. 16, referring to FIG. 19, the reference signals $T_1$ for the first antenna and the reference signals $T_2$ for the second antenna are allocated only in the first OFDM.

In embodiments of FIGS. 14 to 19, reference signals for multi-users can be transmitted through single transmit antenna. Since an UE seems to receive reference signals through single transmit antenna in CDD or beam-forming, a BS does not need to transmit the reference signals after classifying the reference signals for each transmit antennas.

Hereinafter, various examples of a reference signal allocation for an MIMO system having four transmit antennas will be described. The reference signals will be allocated according to the following principles.

(1) The reference signals $R_1$ for the first antenna described in the example of FIG. 3 remain their positions also in the MIMO system having four transmit antennas.

(2) Among the whole signals used, the percentage occupied by the entire reference signals is below a predetermined value. When the percentage of the entire reference signals increases, the receiver can relatively perform accurate channel estimation by receiving a plurality of reference signals. However, the higher the percentage, the lower the data rate is. It will be assumed that the percentage is below about 15 percent or 20 percent. In this case, if the reference signals are effectively allocated, performance degradation of the channel estimation can be minimized.

(3) Reference signals for each transmit antenna do not overlap one another. That is, the reference signals for each transmit antenna do not overlap one another in both the time domain and the frequency domain.

Figure 20:
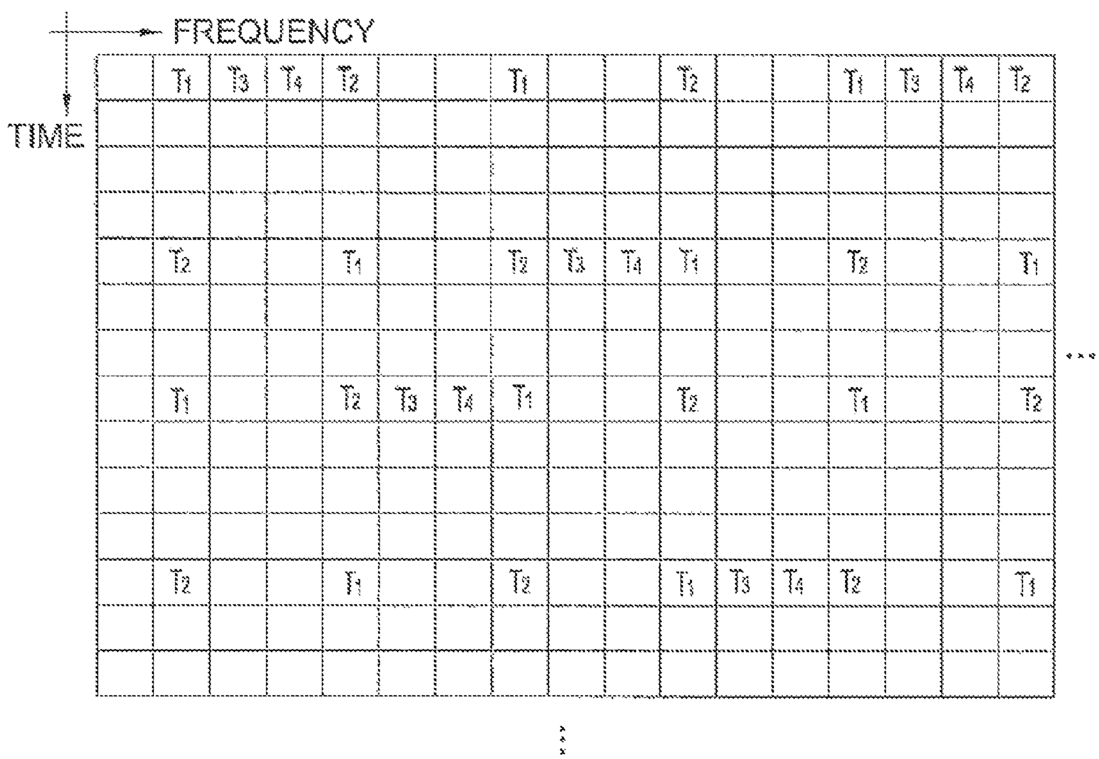
FIGS. 20 to 82 illustrate examples of a reference signal allocation according to an embodiment of the present invention.

FIG. 20 illustrates an example of a reference signal allocation according to an embodiment of the present invention. $T_1$ is a reference signal for the first antenna, $T_2$ is a reference signal for the second antenna, $T_3$ is a reference signal for the third antenna, and $T_4$ is a reference signal for the fourth antenna. A blank resource element may be a data symbol or a null symbol.

Referring to FIG. 20, one sub-frame comprises fourteen OFDM symbols. However, this is only an example, and thus the number of OFDM symbols constituting one sub-frame may vary. Although one sub-frame is illustrated for convenience, reference signals for each antenna are allocated for each sub-frame for respective antennas. That is, the reference signals $T_1$ are allocated in the sub-frame for the first antenna. The reference signals $T_2$ are allocated in the sub-frame for the second antenna. The reference signals $T_3$ are allocated in the sub-frame for the third antenna. The reference signals $T_4$ are allocated in the sub-frame for the fourth antenna. For clarity of description, it will be assumed that fourteen OFDM symbols are defined as a first OFDM symbol, a second OFDM symbol, . . . , and a fourteenth OFDM symbol from a beginning of a TTI.

The reference signals $T_1$ are allocated at the interval of six sub-carriers in the first and eighth OFDM symbols. In addition, the reference signals $T_1$ are also allocated at the interval of six sub-carriers in the fifth and twelfth OFDM symbols. The reference signals $T_1$ allocated in the fifth and twelfth OFDM symbols are each shifted by the size of three sub-carries from those allocated in the first and eighth OFDM symbols.

The reference signals $T_2$ are allocated at the interval of six sub-carriers in the first, fifth, eighth, and twelfth OFDM symbols. The reference signals $T_2$ in the first and fifth OFDM symbols are each shifted by the size of three sub-carriers from positions where the reference signals $T_1$ are placed. The reference signals $T_2$ in the fifth and twelfth OFDM symbols are each placed in the same positions as the reference signals $T_1$.

The reference signals $T_3$ are allocated at the interval of 12 sub-carriers in the first, fifth, eighth, and twelfth OFDM symbols. The reference signals $T_3$ in the first OFDM symbol are each shifted by the size of one sub-carrier from positions where the reference signals $T_1$ are placed. The reference signals $T_3$ in the fifth, eighth and twelfth OFDM symbols are allocated at the interval of twelve sub-carriers and are shifted by the size of one sub-carrier where reference signals of other antennas are placed.

The reference signals $T_4$ are allocated at the interval of twelve sub-carriers in the first, fifth, eighth, and twelfth OFDM symbols. The reference signals $T_4$ are each shifted by one sub-carrier from positions where the reference signals $T_3$ are placed.

The reference signals $T_1$ and $T_2$ are more densely allocated than the reference signals $T_3$ and $T_4$ so that the first and second antennas which are more frequently used than other antennas can have better channel estimation performance.

In general, more control signals are carried in OFDM symbols located prior to the third OFDM symbol. The reference signals $T_1$ to $T_4$ are allocated such that an array of ($T_1$, $T_3$, $T_4$, $T_2$, D, D, $T_1$, D, D, $T_2$, D, D) is repeated in the first OFDM symbol, and an array of ($T_2$, D, D, $T_1$, D, D, $T_2$, $T_3$, $T_4$, $T_1$, D, D) is repeated in the fifth OFDM symbol. An array of ($T_1$, D, D, $T_2$, $T_3$, $T_4$, $T_1$, D, D, $T_2$, D, D) is repeated in the eighth OFDM symbol, and an array of ($T_2$, D, D, $T_1$, D, D, $T_2$, D, D, $T_1$, $T_3$, $T_4$, $T_2$) is repeated in the twelfth OFDM symbol. Data symbols D may be allocated where these reference signals are not placed. In this case, the percentage occupied by the data symbols D is about 86 percent.

The percentage occupied by the data symbols in a sub-frame may be different according to characteristics of the system. Hereinafter, we exemplarily illustrate 14 OFDM symbols per a TTI but it's not limited. One TTI may include 12 or more OFDM symbols.

The depicted reference signal allocation pattern is shown in relatively positions, and thus this does not indicate absolute positions. The reference signal pattern may be shifted in the time domain and/or the frequency domain while the reference signals maintained each interval.

In a sub-frame, a null symbol may be allocated to a resource element where reference signals of other antennas are placed. For example, in the sub-frame for the first antenna, the null symbol may be allocated to a resource element where reference signals for the second to fourth antennas are placed.

At least one of the reference signals for respective antennas may be a reference signal for a multi-user signal. In a sub-frame, the reference signal for a multi-user signal may not be allocated in OFDM symbols including a dedicated control signal but be allocated in the rest of OFDM symbols. For example, if the first and second OFDM symbols include the dedicated control signals, the reference signals for the multi-user signal may be allocated starting from the third OFDM symbol.

Figure 21:
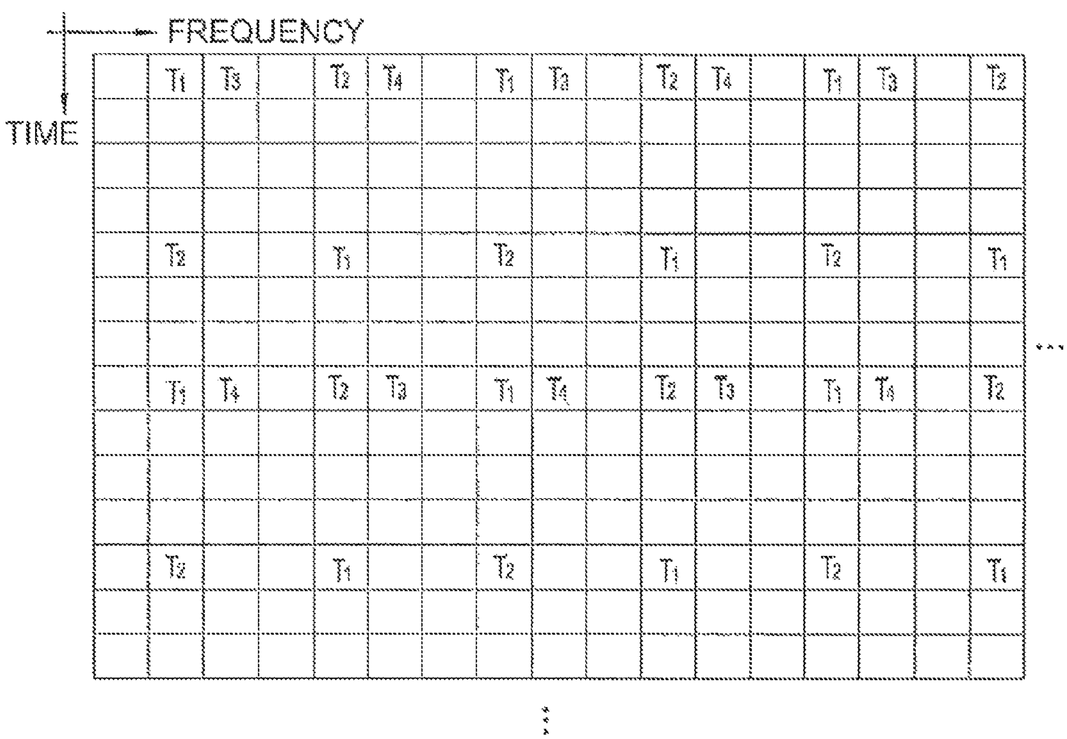

FIG. 21 illustrates an example of a reference signal allocation according to an embodiment of the present invention.

Referring to FIG. 21, the reference signals $T_1$ and $T_3$ are sequentially allocated in the first OFDM symbol together with one data symbol. A blank resource element may be a data symbol or a null symbol. The reference signals $T_2$ and $T_4$ are sequentially allocated, following the data symbol D. Accordingly, an array of ($T_1$, $T_3$, D, $T_2$, $T_4$, D) may be repeated.

In the fifth OFDM symbol, the reference signal $T_2$ is placed followed by two data symbols D and the reference signal $T_1$. Two data symbols D are placed again, followed by the reference signal $T_2$. Accordingly, an array of ($T_2$, D, D, $T_1$, D, D) may be repeated.

The eighth OFDM symbol may have the similar pattern to the first OFDM symbol, and thus an array of ($T_1$, $T_4$, D, $T_2$, $T_3$, D) may be repeated. The twelfth OFDM symbol may have the same pattern to the fifth OFDM symbol.

The percentage occupied by the data symbols D is about 86%. Therefore, the percentage occupied by the reference signals is about 14%. Accordingly, the reference signals do not overlap one another for respective transmit antennas, and thus the receiver can estimate respective channels.

Figure 22:
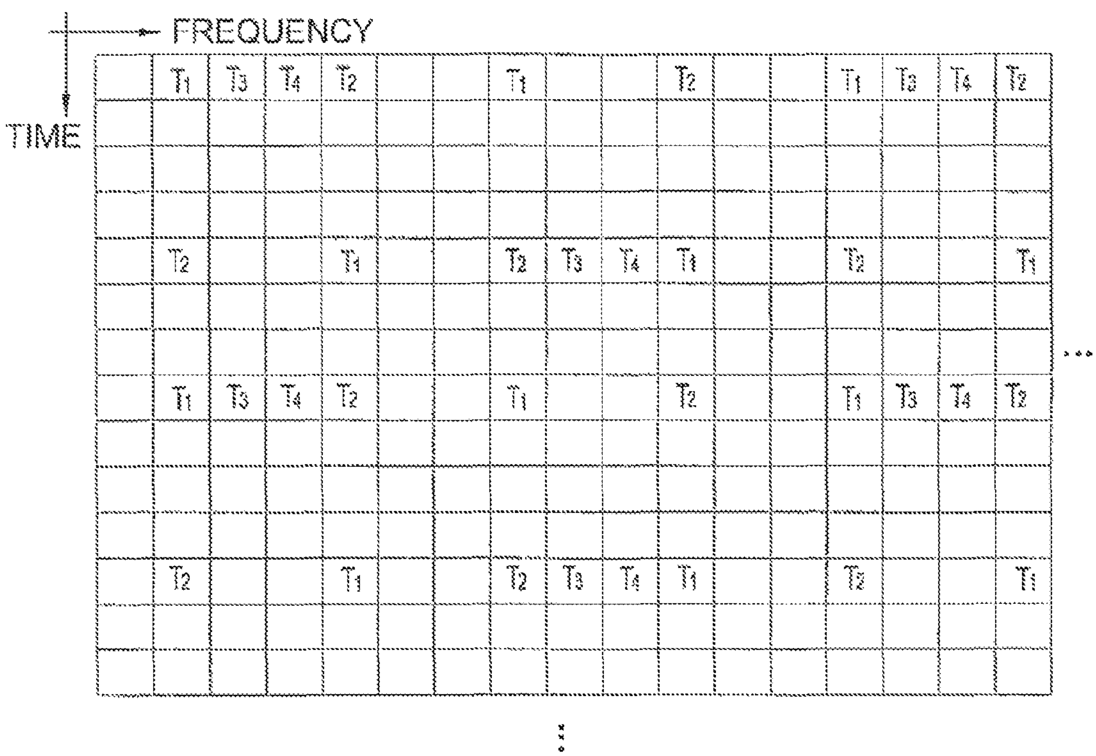

FIG. 22 illustrates an example of a reference signal allocation according to an embodiment of the present invention.

Referring to FIG. 22, in the first OFDM symbol, the first, third, and fourth reference signals $T_1$, $T_3$, $T_4$, and $T_2$ are each allocated. A blank resource element may be a data symbol or a null symbol. Then, two data symbols D are placed, followed by another reference signal $T_1$. Two data symbols are placed again, followed by another reference signal $T_2$. Then, two data symbols are placed, followed by the reference signals $T_1$, $T_3$, $T_4$, and $T_2$, in that order. Accordingly, an array of ($T_1$, $T_3$, $T_4$, $T_2$, D, D, $T_1$, D, D, $T_2$, D, D) may be repeated in the first OFDM symbol.

In the fifth OFDM symbol, the reference signal $T_2$ is placed, followed by two data symbols and the reference signal $T_1$. Then, two data symbol are placed, followed by the reference signals $T_2$, $T_3$, $T_4$, and $T_1$, in that order. Then, two data symbols are placed again, and this arrangement may be repeated. Accordingly, an array of ($T_2$, D, D, $T_1$, D, D, $T_2$, $T_3$, $T_4$, $T_1$, D, D) may be repeated in the fifth OFDM symbol.

The eight OFDM symbol has the same reference signal allocation as the first OFDM symbol. The twelfth OFDM symbol has the same reference signal allocation as the fifth OFDM symbol.

Data symbols occupy about 85% of the entire area. Thus, reference signals occupy about 15%. Accordingly, the receiver can estimate channels by using the reference signals transmitted from the respective transmit antennas.

Figure 23:
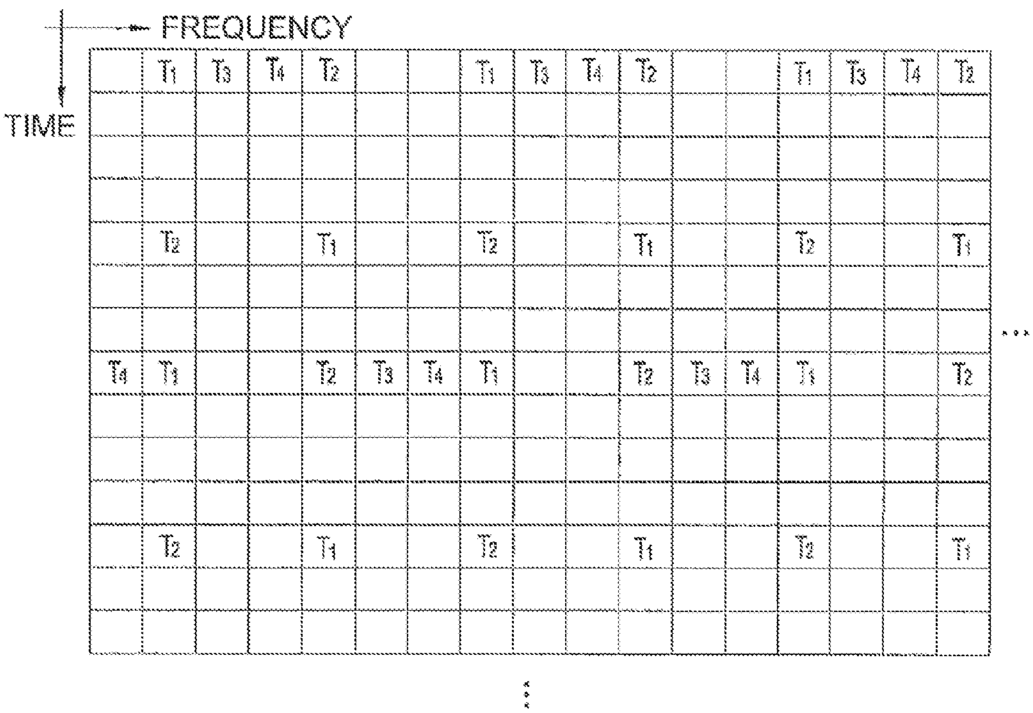

FIG. 23 illustrates an example of a reference signal allocation according to an embodiment of the present invention.

An array of (D, $T_1$, $T_3$, $T_4$, $T_2$, D) is repeated in the first OFDM symbol. An array of ($T_4$, $T_1$, D, D, $T_2$, $T_3$) is repeated in the eighth OFDM symbol. An array of (D, $T_2$, D, D, $T_1$, D) is repeated in the fifth and twelfth OFDM symbols.

Figure 24:
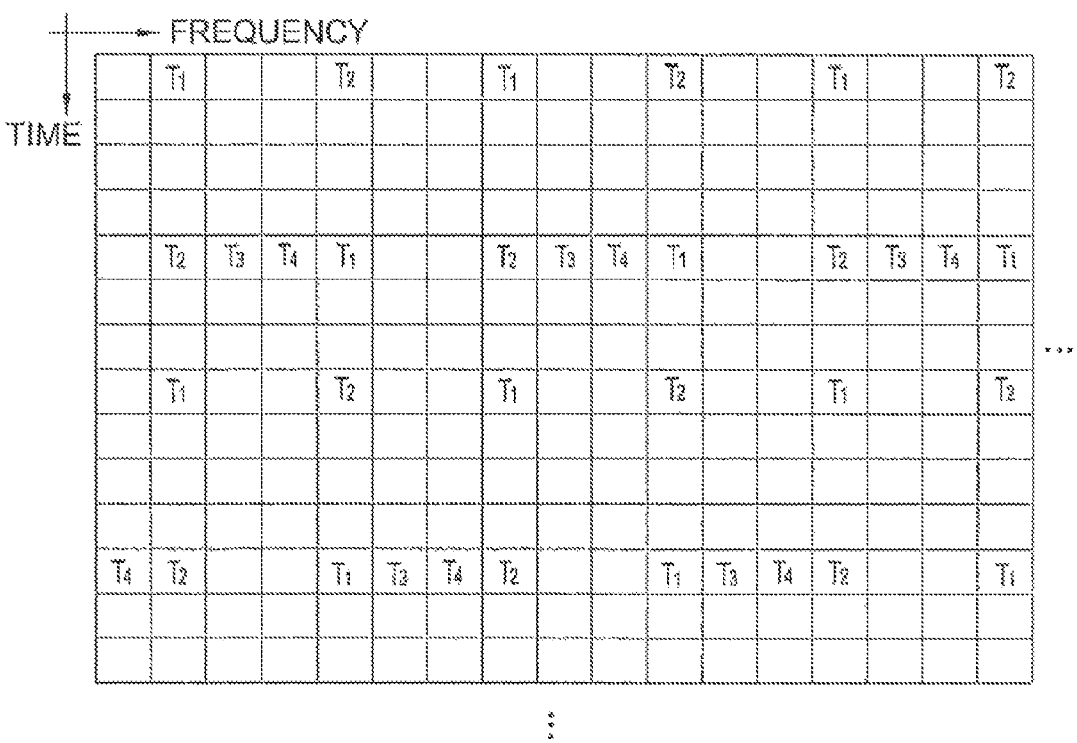

FIG. 24 illustrates an example of a reference signal allocation according to an embodiment of the present invention.

An array of (D, $T_1$, D, D, $T_2$, D) is repeated in the first and eighth OFDM symbols. An array of (D, $T_2$, $T_3$, $T_4$, $T_1$, D) is repeated in the fifth OFDM symbol. An array of ($T_4$, $T_2$, D, D, $T_1$, $T_3$) is repeated in the twelfth OFDM symbol.

Figure 25:
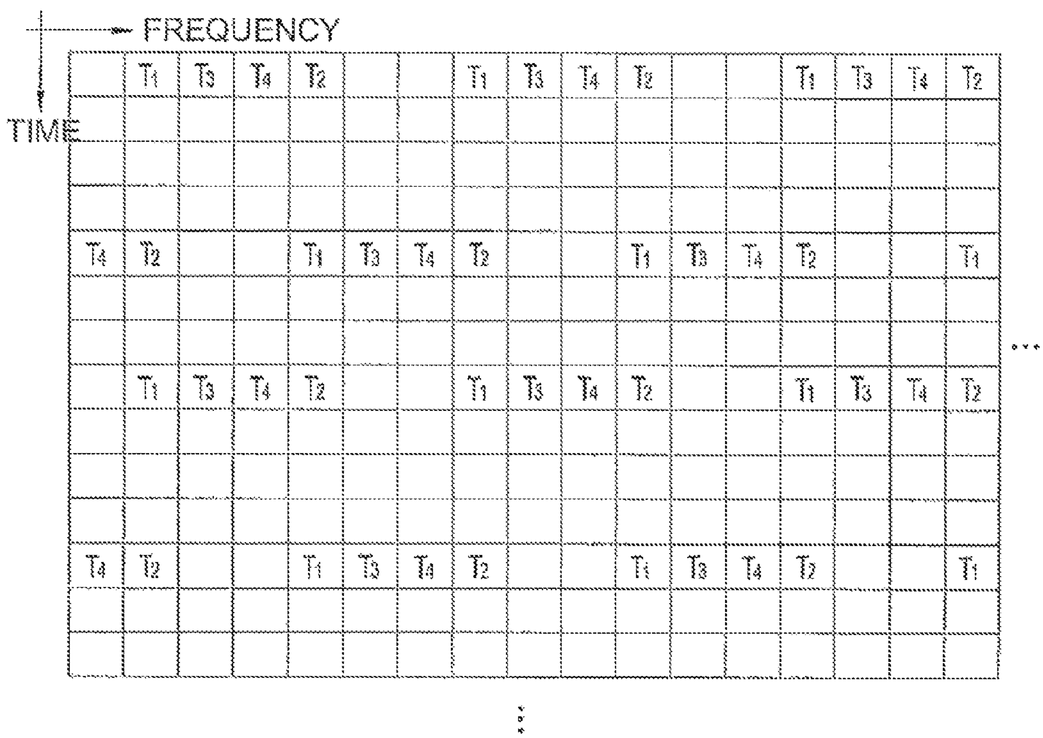

FIG. 25 illustrates an example of a reference signal allocation according to an embodiment of the present invention.

An array of (D, $T_1$, $T_3$, $T_4$, $T_2$, D) is repeated in the first and eighth OFDM symbols. An array of ($T_4$, $T_2$, D, D, $T_1$, $T_3$) is repeated in the fifth and twelfth OFDM symbols.

Figure 26:
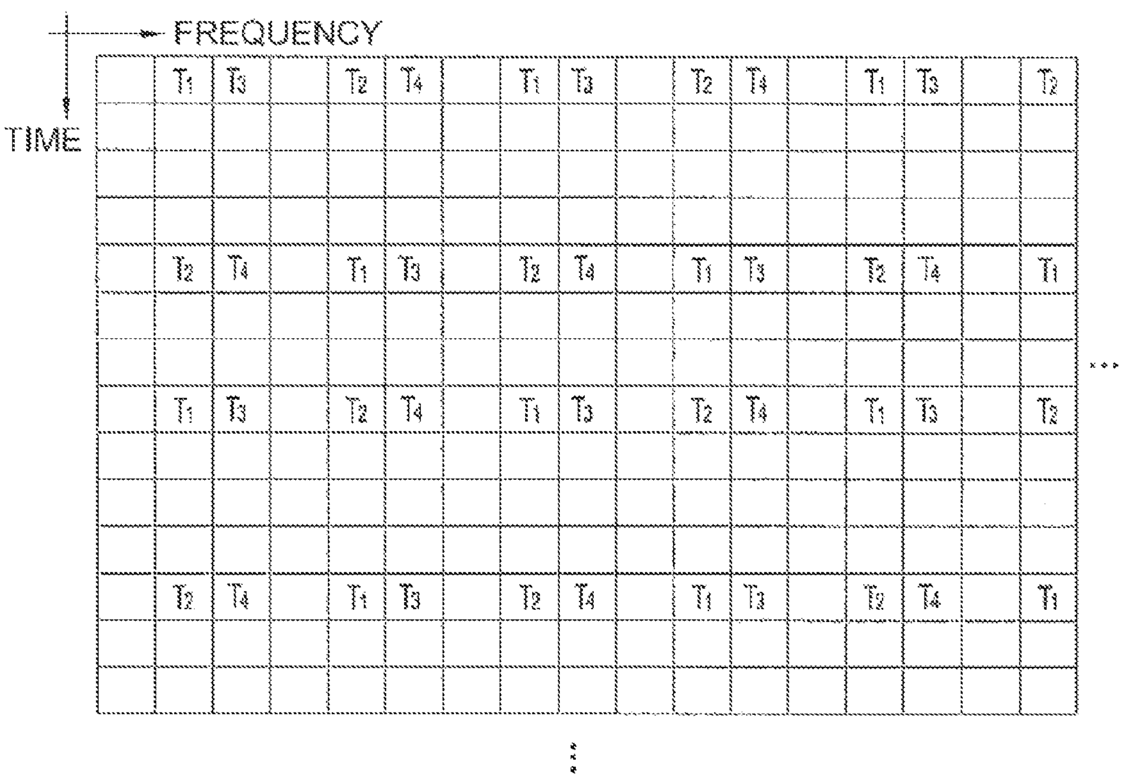

FIG. 26 illustrates an example of a reference signal allocation according to an embodiment of the present invention.

An array of ($T_1$, $T_3$, D, $T_2$, $T_4$, D) is repeated in the first and eighth OFDM symbols. An array of ($T_2$, $T_4$, D, $T_1$, $T_3$, D) is repeated in the fifth and twelfth OFDM symbols.

Figure 27:
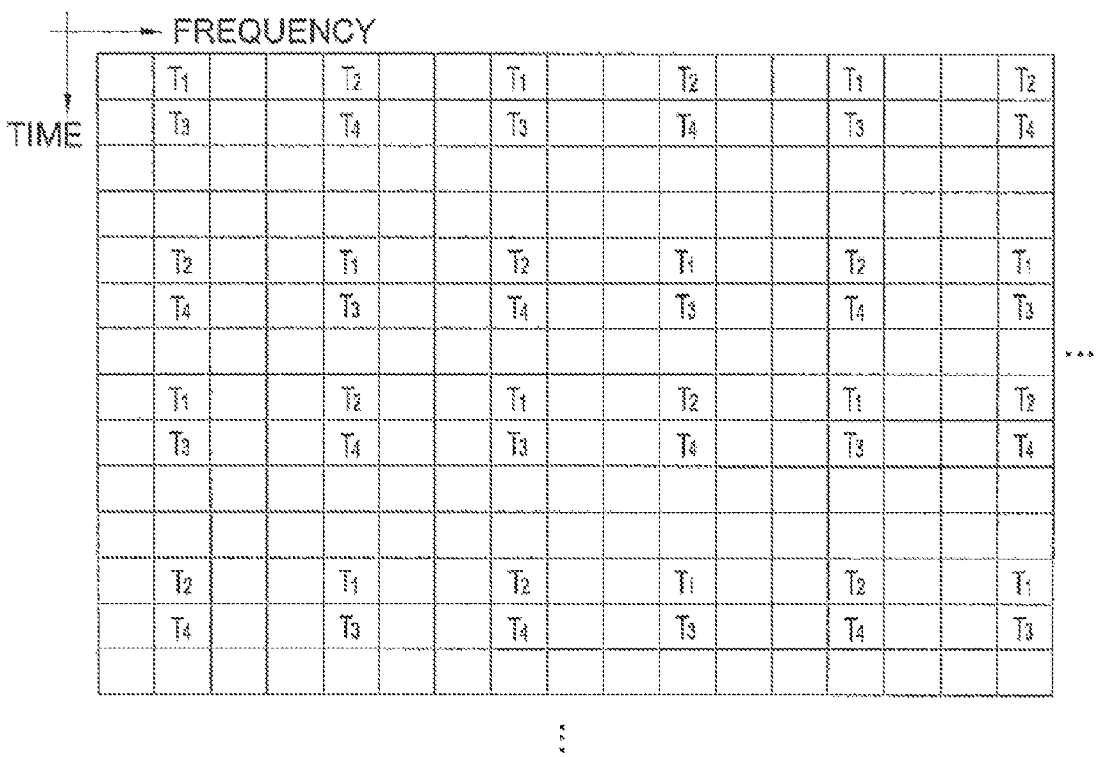

FIG. 27 illustrates an example of a reference signal allocation according to an embodiment of the present invention.

An array of ($T_1$, D, D, $T_2$, D, D) is repeated in the first and eighth OFDM symbols. An array of ($T_3$, D, D, $T_4$, D, D) is repeated in the second and ninth OFDM symbols. An array of ($T_2$, D, D, $T_1$, D, D) is repeated in the fifth and twelfth OFDM symbols. An array of ($T_4$, D, D, $T_3$, D, D) is repeated in the sixth and thirteenth OFDM symbols.

Figure 28:
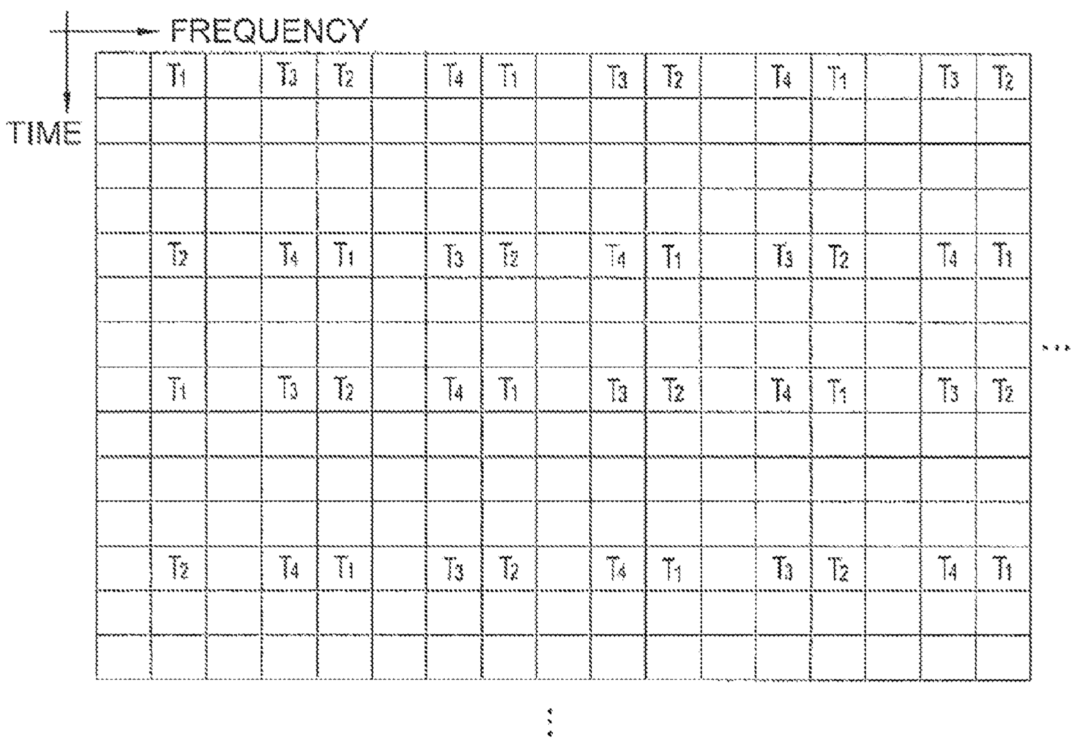

FIG. 28 illustrates an example of a reference signal allocation according to an embodiment of the present invention.

An array of ($T_1$, D, $T_3$, $T_2$, D, $T_4$) is repeated in the first and eighth OFDM symbols. An array of ($T_2$, D, $T_4$, $T_1$, D, $T_3$) is repeated in the fifth and twelfth OFDM symbols.

Figure 29:
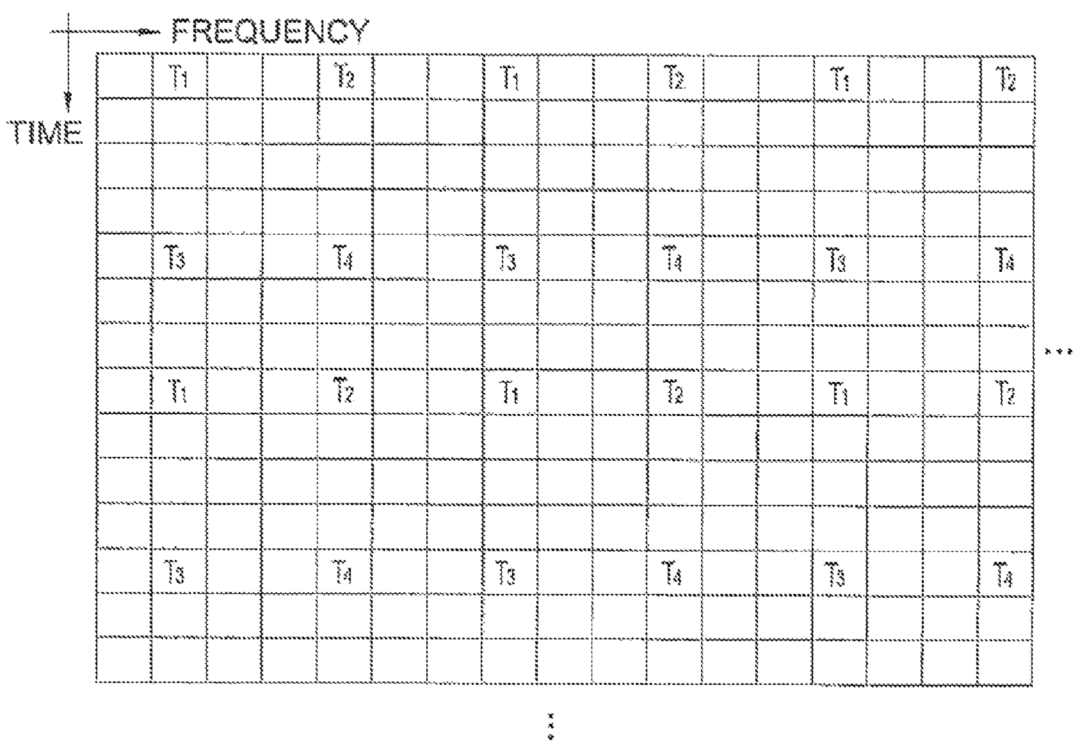

FIG. 29 illustrates an example of a reference signal allocation according to an embodiment of the present invention.

An array of ($T_1$, D, D, $T_2$, D, D) is repeated in the first and eighth OFDM symbols. An array of ($T_3$, D, D, $T_4$, D, D) is repeated in the fifth and twelfth OFDM symbols.

Figure 30:
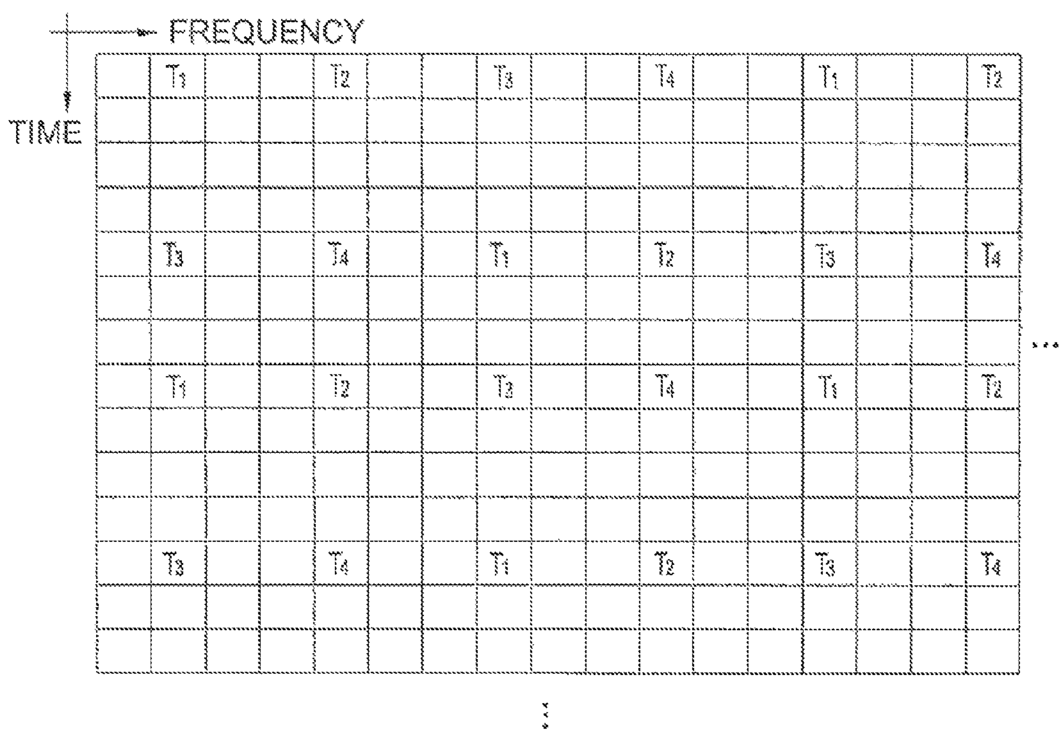

FIG. 30 illustrates an example of a reference signal allocation according to an embodiment of the present invention.

An array of ($T_1$, D, D, $T_2$, D, D, $T_3$, D, D, $T_4$, D, D) is repeated in the first and eighth OFDM symbols. An array of ($T_3$, D, D, $T_4$, D, D, $T_1$, D, D, $T_2$, D, D) is repeated in the fifth and twelfth OFDM symbols.

Figure 31:
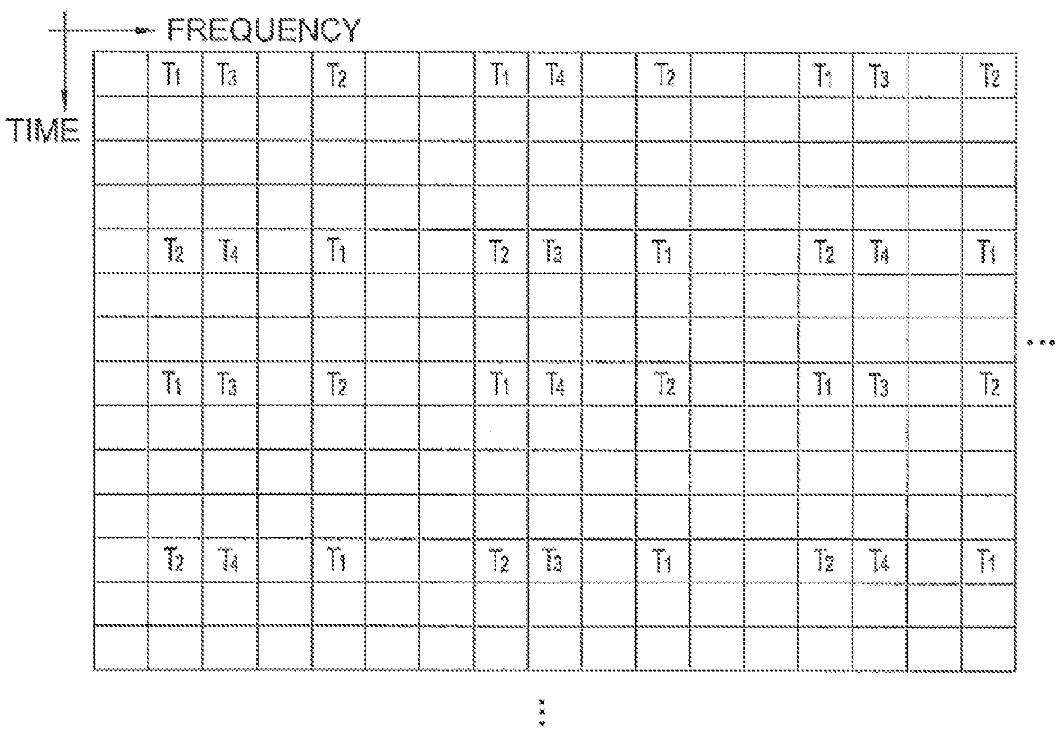

FIG. 31 illustrates an example of a reference signal allocation according to an embodiment of the present invention.

An array of ($T_1$, $T_3$, D, $T_2$, D, D, $T_1$, $T_4$, D, $T_2$, D, D) is repeated in the first and eighth OFDM symbols. An array of ($T_2$, $T_4$, D, $T_1$, D, D, $T_2$, $T_3$, D, $T_1$, D, D) is repeated in the fifth and twelfth OFDM symbols.

Figure 32:
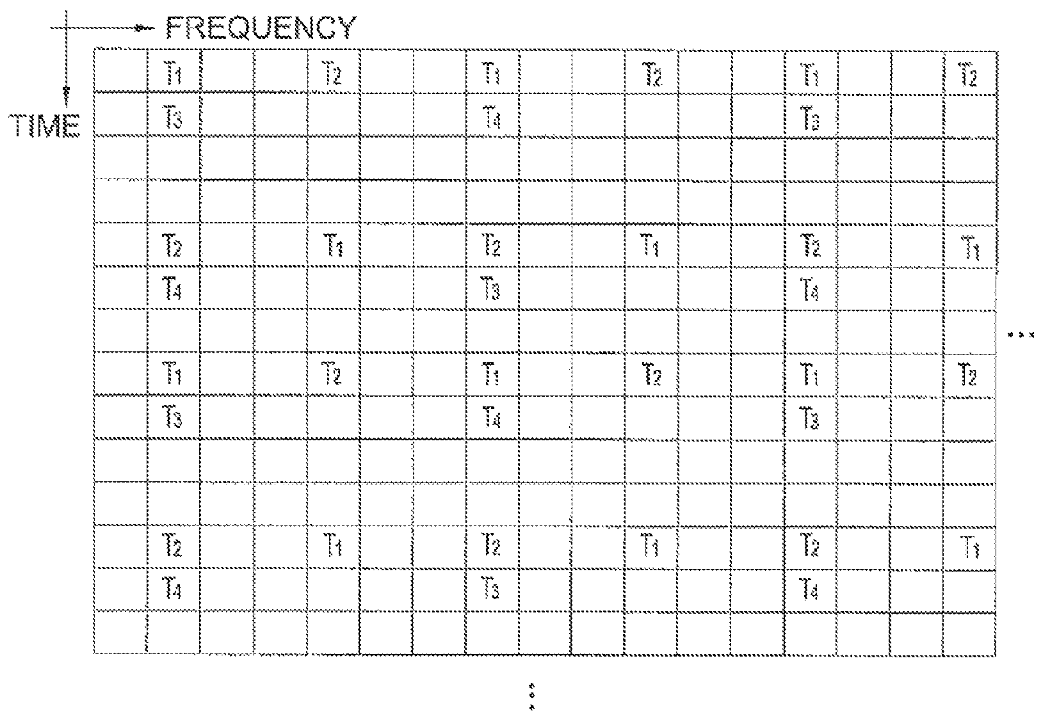

FIG. 32 illustrates an example of a reference signal allocation according to an embodiment of the present invention.

An array of ($T_1$, D, D, $T_2$, D, D) is repeated in the first and eighth OFDM symbols. An array of ($T_3$, D, D, D, D, D, $T_4$, D, D, D, D, D) is repeated in the second and ninth OFDM symbols.

An array of ($T_2$, D, D, $T_1$, D, D) is repeated in the fifth and twelfth OFDM symbols. An array of ($T_4$, D, D, D, D, D, $T_3$, D, D, D, D, D) is repeated in the sixth and thirteenth OFDM symbols.

Figure 33:
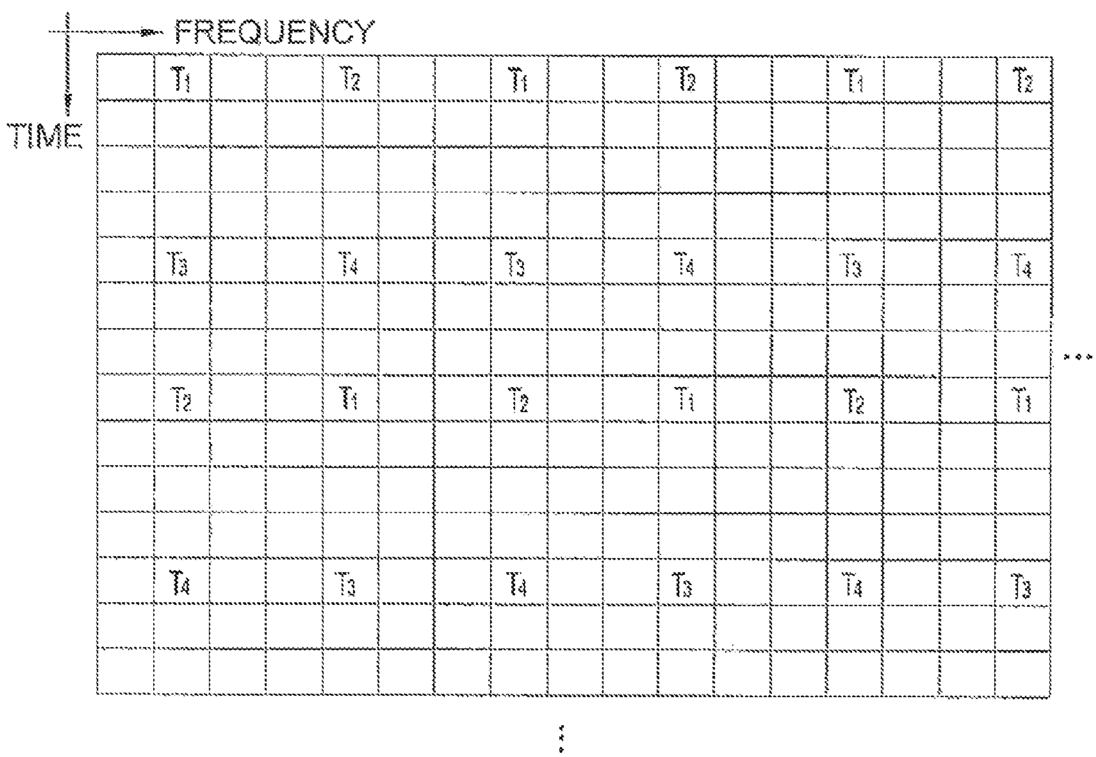

FIG. 33 illustrates an example of a reference signal allocation according to an embodiment of the present invention.

An array of ($T_1$, D, D, $T_2$, D, D) is repeated in the first OFDM symbol. An array of ($T_2$, D, D, $T_1$, D, D) is repeated in the eighth OFDM symbol. An array of ($T_3$, D, D, $T_4$, D, D) is repeated in the fifth OFDM symbol. An array of ($T_4$, D, D, $T_3$, D, D) is repeated in the twelfth OFDM symbol.

Figure 34:
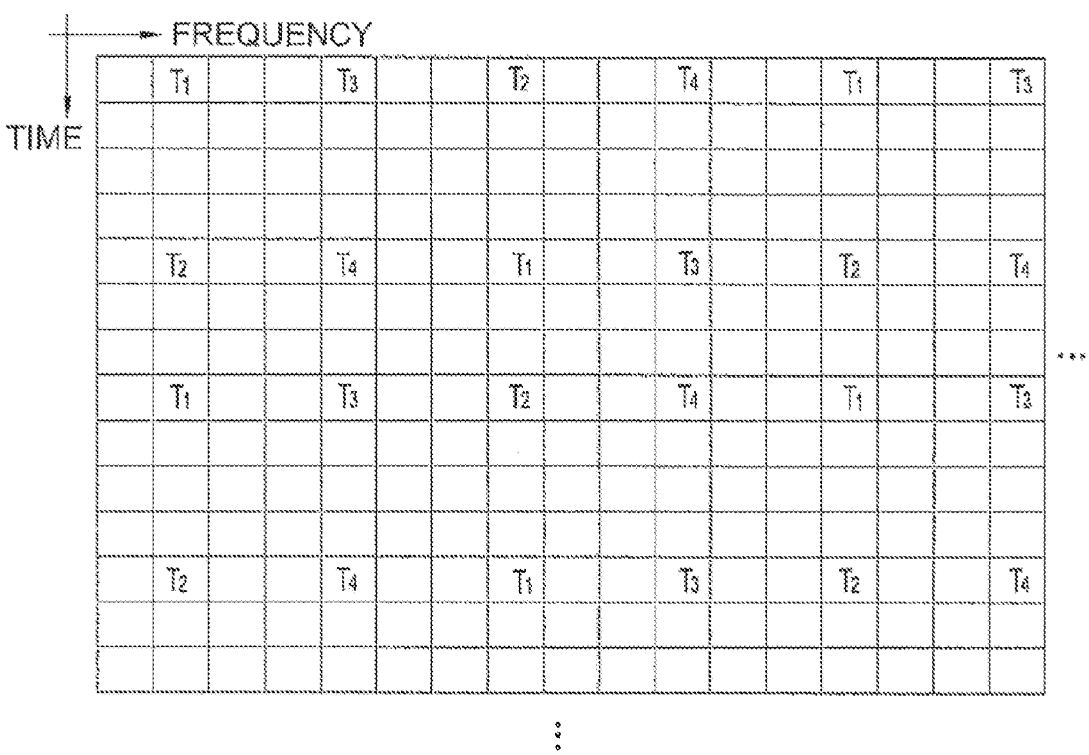

FIG. 34 illustrates an example of a reference signal allocation according to an embodiment of the present invention.

An array of ($T_1$, D, D, $T_3$, D, D, $T_2$, D, D, $T_4$, D, D) is repeated in the first and eighth OFDM symbols. An array of ($T_2$, D, D, $T_4$, D, D, $T_1$, D, D, $T_3$, D, D) is repeated in the fifth and twelfth OFDM symbols.

Figure 35:
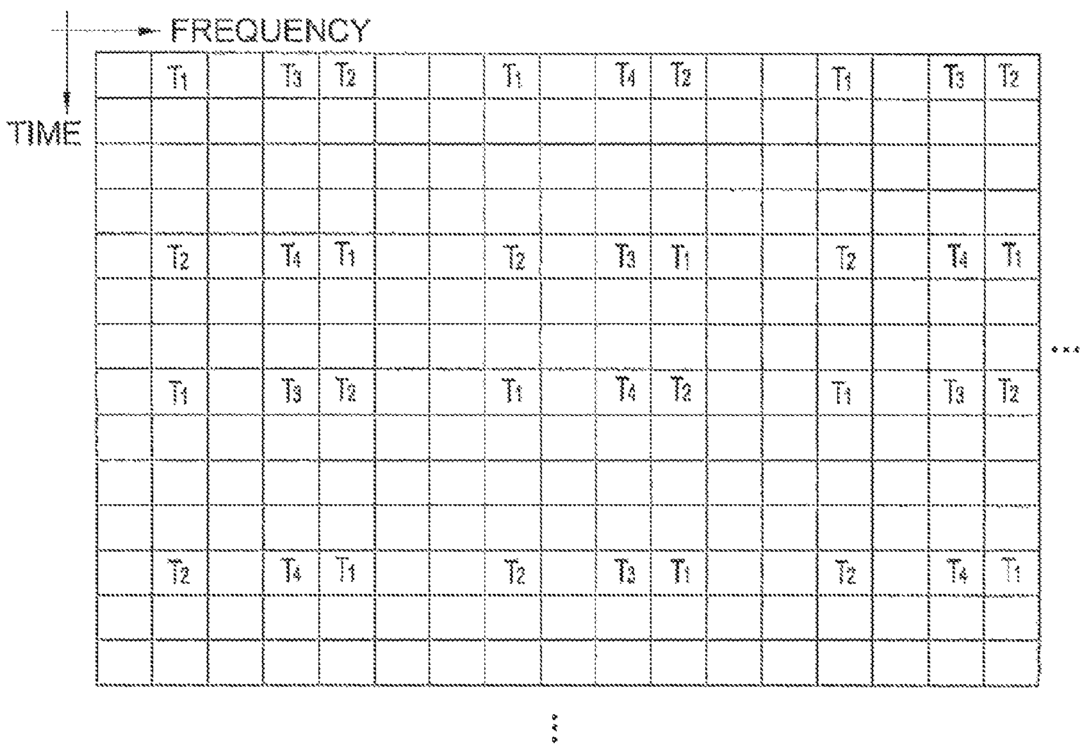

FIG. 35 illustrates an example of a reference signal allocation according to an embodiment of the present invention.

An array of ($T_1$, D, $T_3$, $T_2$, D, D, $T_1$, D, $T_4$, $T_2$, D, D) is repeated in the first and eighth OFDM symbols. An array of ($T_2$, D, $T_4$, $T_1$, D, D, $T_2$, D, $T_3$, $T_1$, D, D) is repeated in the fifth and twelfth OFDM symbols.

Figure 36:
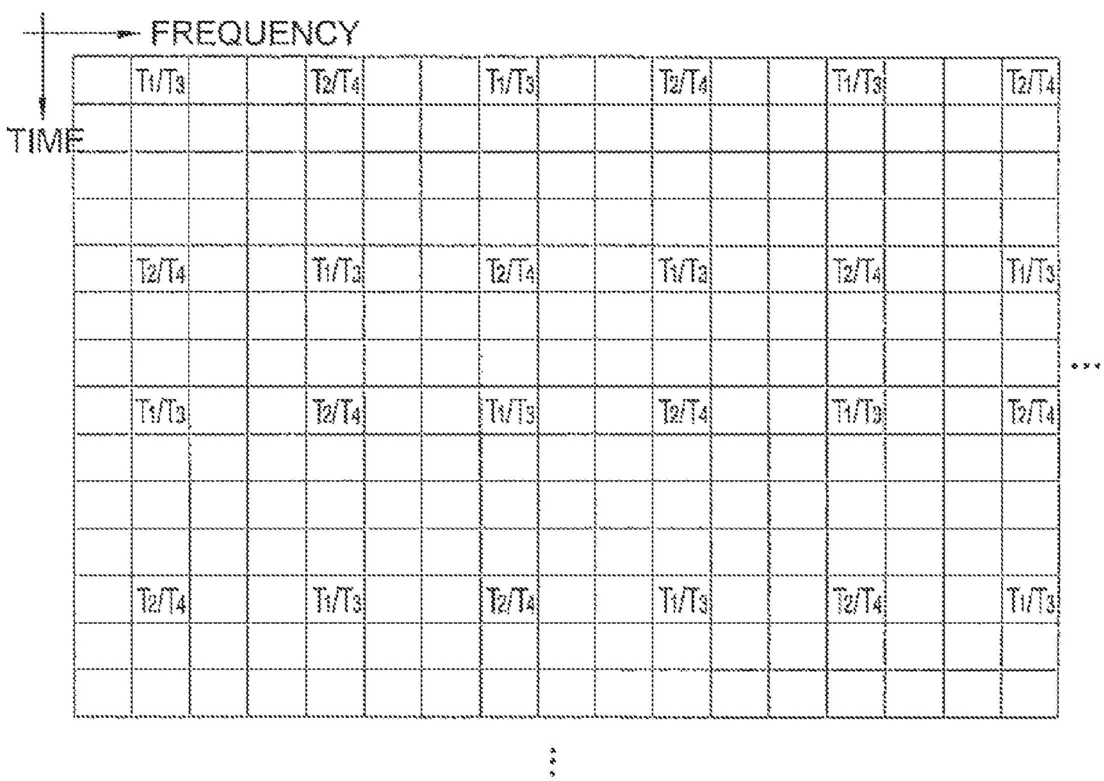

FIG. 36 illustrates an example of a reference signal allocation according to an embodiment of the present invention.

An array of ($T_1$/$T_3$, D, D, $T_2$/$T_4$, D, D) is repeated in the first and eighth OFDM symbols. An array of ($T_2$/$T_4$, D, D, $T_1$/$T_3$, D, D) is repeated in the fifth and twelfth OFDM symbols. Here, the reference signals $T_1$ and $T_3$ are allocated in the same sub-carrier in the same time domain. The reference signals $T_1$ and $T_3$ maintain their orthogonality by using an orthogonal code having the features of auto-correlation and cross-correlation. This may be also applied to reference signals $T_2/T_4$.

Figure 37:
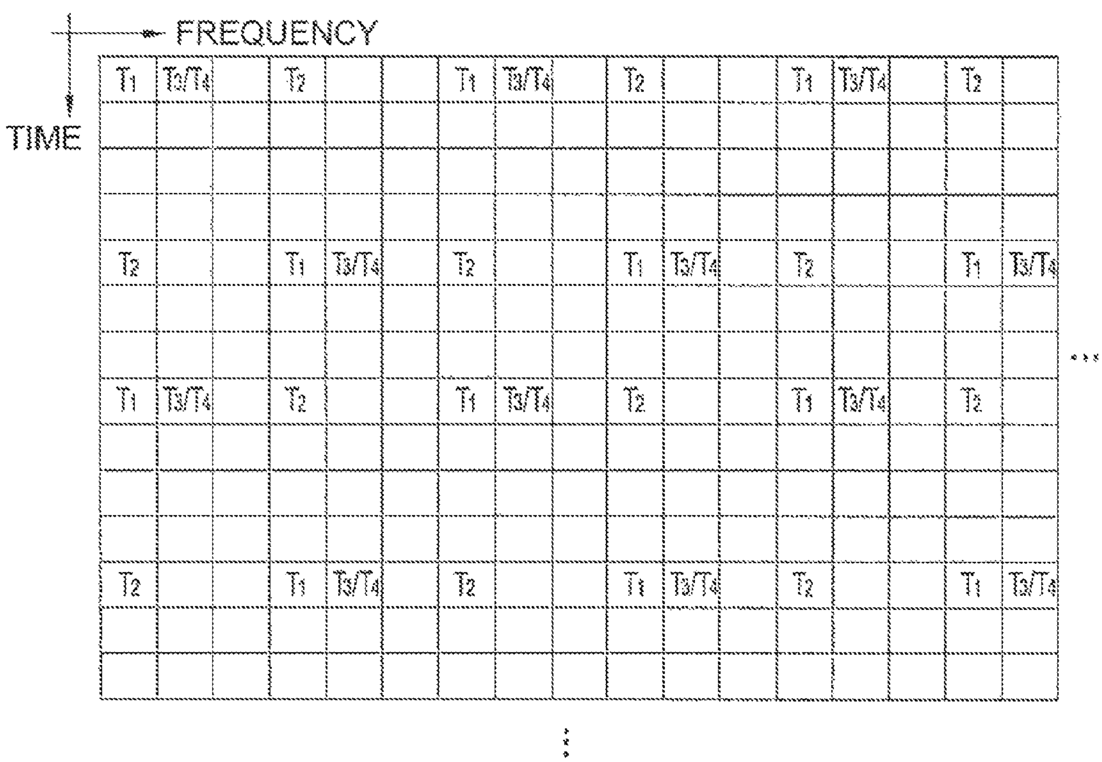

FIG. 37 illustrates an example of a reference signal allocation according to an embodiment of the present invention.

An array of ($T_1$, $T_3/T_4$, D, $T_2$, D, D) is repeated in the first and eighth OFDM symbols. An array of ($T_2$, D, D, $T_1$, $T_3/T_4$, D) is repeated in the fifth and twelfth OFDM symbols. Here, the reference signals $T_3$ and $T_4$ are allocated in the same sub-carrier in the same time domain, and maintain their orthogonality by using an orthogonal code having the features of auto-correlation and cross-correlation.

Figure 38:
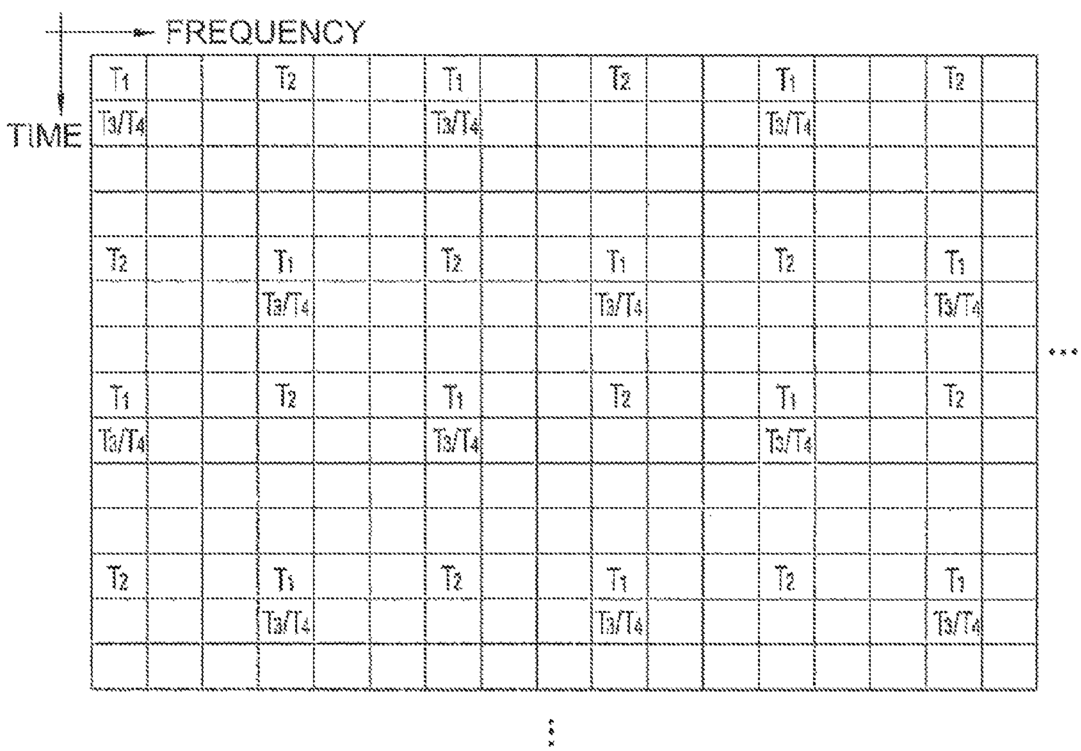

FIG. 38 illustrates an example of a reference signal allocation according to an embodiment of the present invention.

An array of ($T_1$, D, D, $T_2$, D, D) is repeated in the first and eighth OFDM symbols. An array of ($T_3/T_4$, D, D, D, D, D) is repeated in the second and ninth OFDM symbols. An array of ($T_2$, D, D, $T_1$, D, D) is repeated in the fifth and twelfth OFDM symbols. An array of (D, D, D, $T_3/T_4$, D, D) is repeated in the sixth and thirteenth OFDM symbols.

Figure 39:
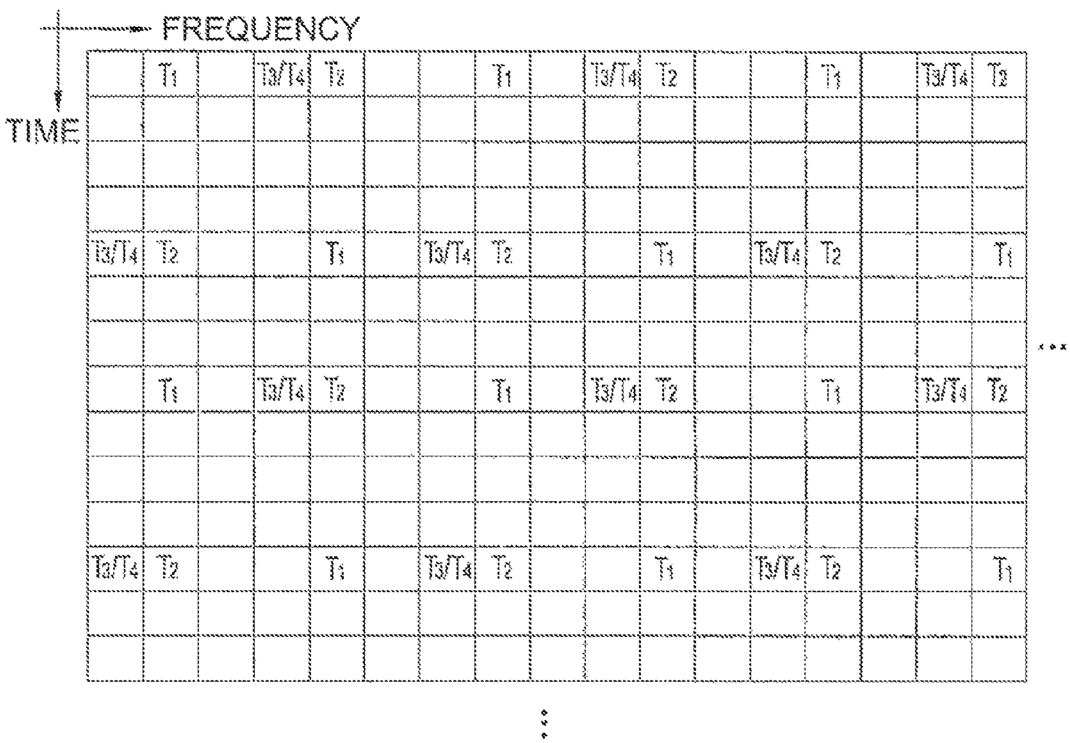

FIG. 39 illustrates an example of a reference signal allocation according to an embodiment of the present invention.

An array of (D, $T_1$, D, $T_3/T_4$, $T_2$, D) is repeated in the first and eighth OFDM symbols. An array of ($T_3/T_4$, $T_2$, D, D, $T_1$, D) is repeated in the fifth and twelfth OFDM symbols.

Figure 40:
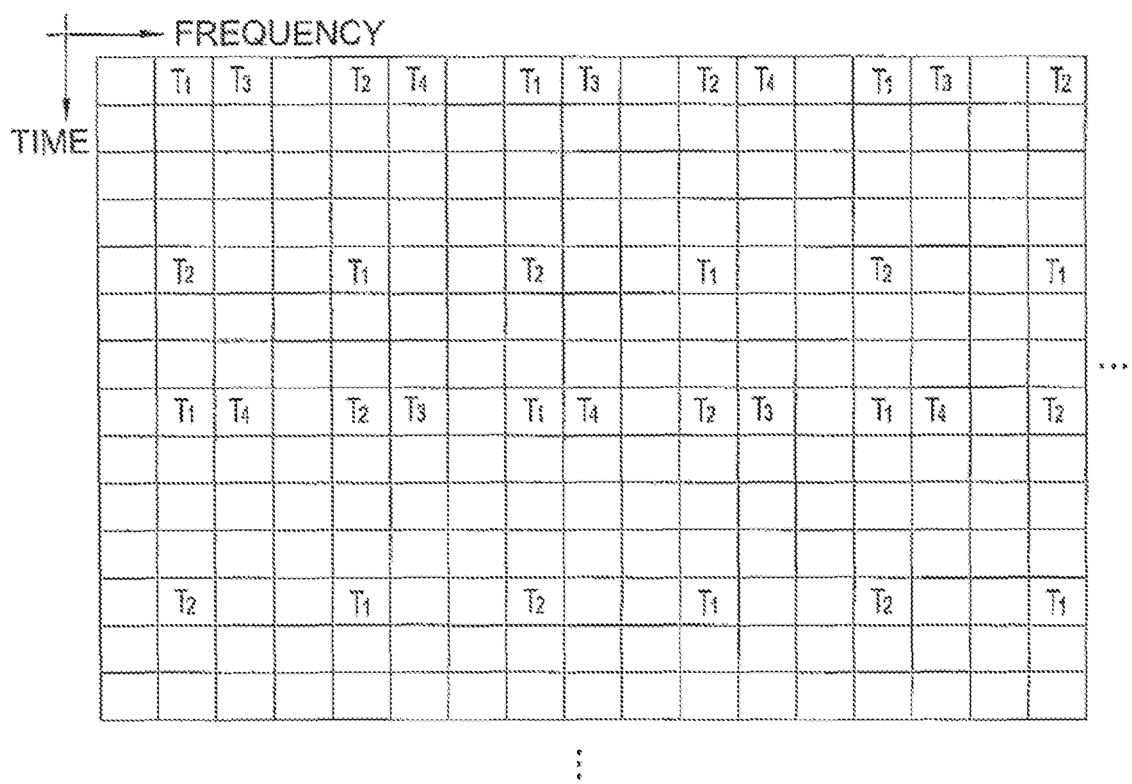

FIG. 40 illustrates an example of a reference signal allocation according to an embodiment of the present invention.

An array of ($T_1$, $T_3$, D, $T_2$, $T_4$, D) is repeated in the first OFDM symbol. An array of ($T_1$, $T_4$, D, $T_2$, $T_3$, D) is repeated in the eighth OFDM symbol. An array of ($T_2$, D, D, $T_1$, D, D) is repeated in the fifth and twelfth OFDM symbols.

Figure 41:
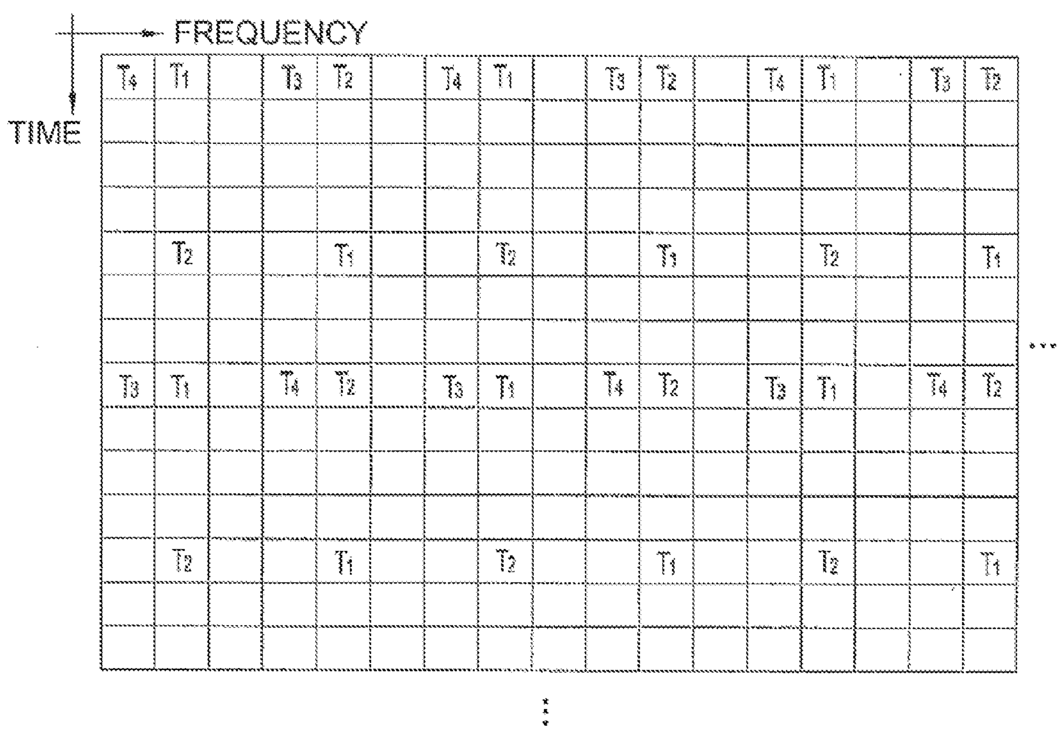

FIG. 41 illustrates an example of a reference signal allocation according to an embodiment of the present invention.

An array of ($T_4$, $T_1$, D, $T_3$, $T_2$, D) is repeated in the first OFDM symbol. An array of ($T_3$, $T_1$, D, $T_4$, $T_2$, D) is repeated in the eighth OFDM symbol. An array of (D, $T_2$, D, D, $T_1$, D) is repeated in the fifth and twelfth OFDM symbols.

Figure 42:
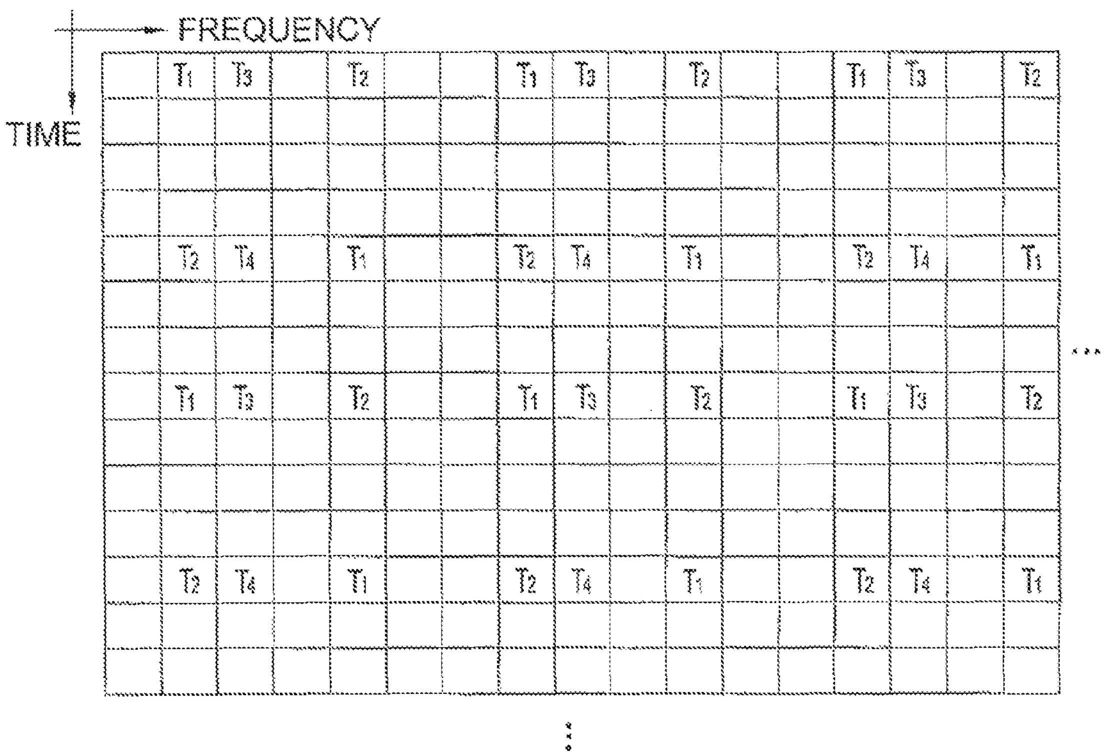

FIG. 42 illustrates an example of a reference signal allocation according to an embodiment of the present invention.

An array of ($T_1$, $T_3$, D, $T_2$, D, D) is repeated in the first and eighth OFDM symbols. An array of ($T_2$, $T_4$, D, $T_1$, D, D) is repeated in the fifth and twelfth OFDM symbols.

Figure 43:
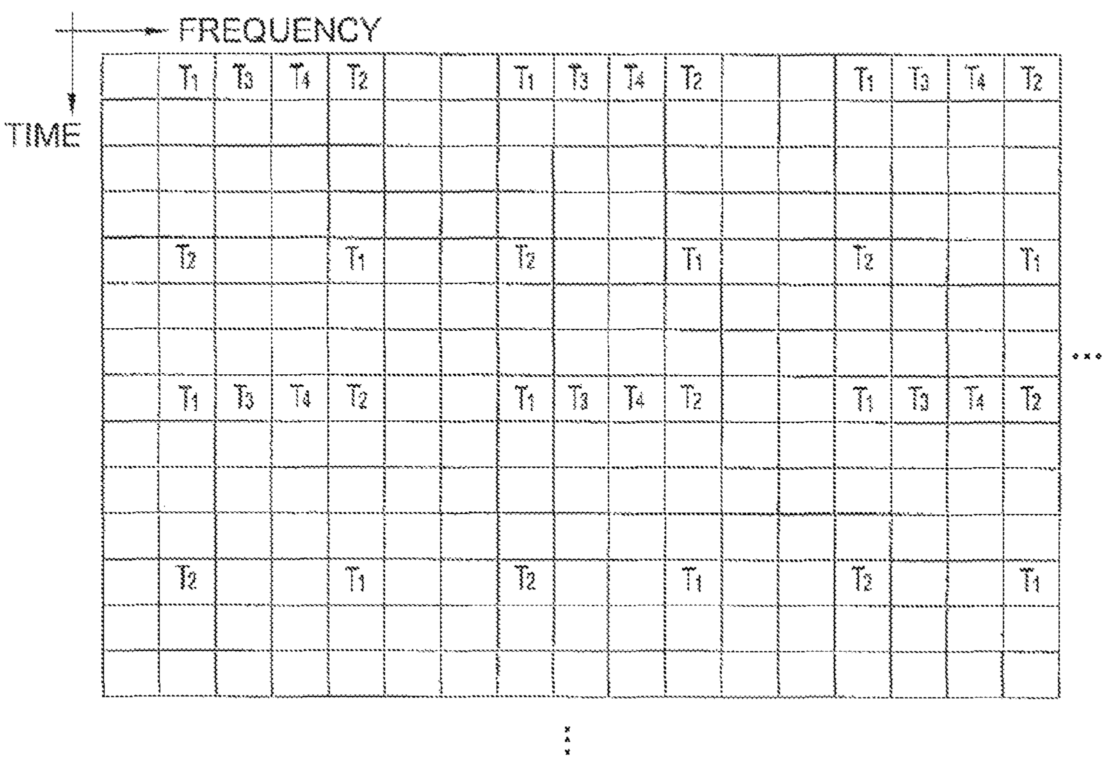

FIG. 43 illustrates an example of a reference signal allocation according to an embodiment of the present invention.

An array of ($T_1$, $T_3$, $T_4$, $T_2$, D, D) is repeated in the first and eighth OFDM symbols. An array of ($T_2$, D, D, $T_1$, D, D) is repeated in the fifth and twelfth OFDM symbols.

Figure 44:
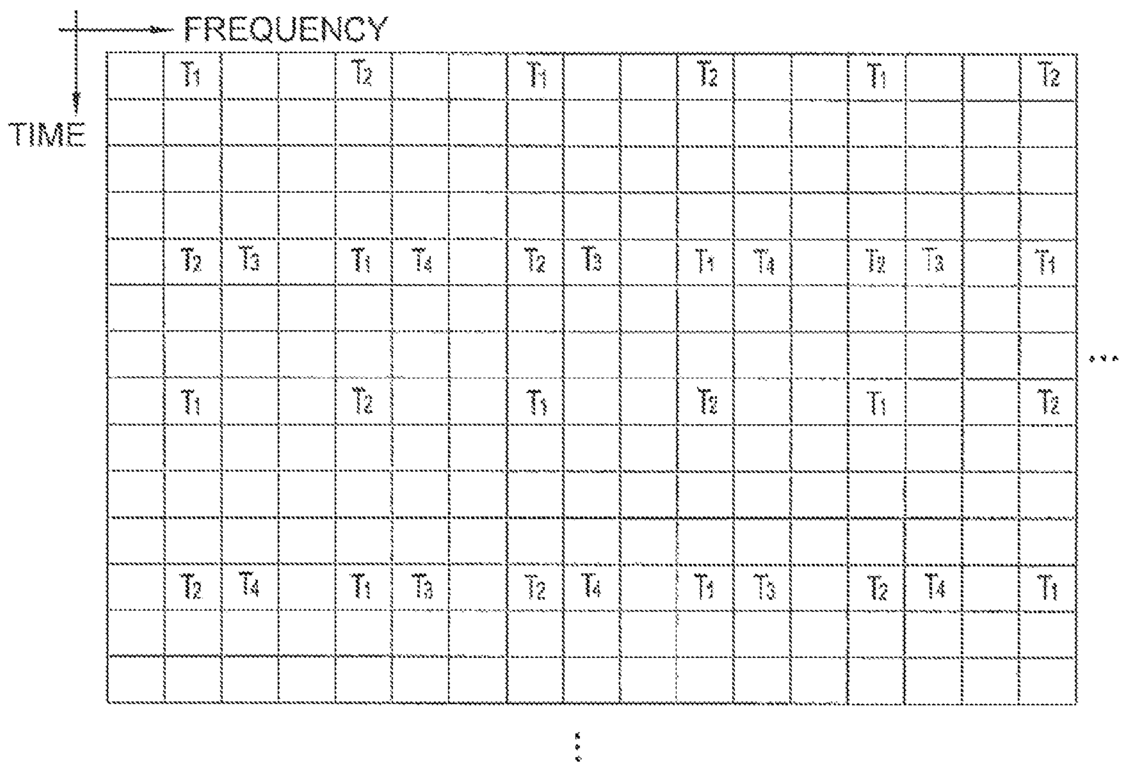

FIG. 44 illustrates an example of a reference signal allocation according to an embodiment of the present invention.

An array of ($T_1$, D, D, $T_2$, D, D) is repeated in the first and eighth OFDM symbols. An array of ($T_2$, $T_3$, D, $T_1$, $T_4$, D) is repeated in the fifth OFDM symbol. An array of ($T_2$, $T_4$, D, $T_1$, $T_3$, D) is repeated in the twelfth OFDM symbol.

Figure 45:
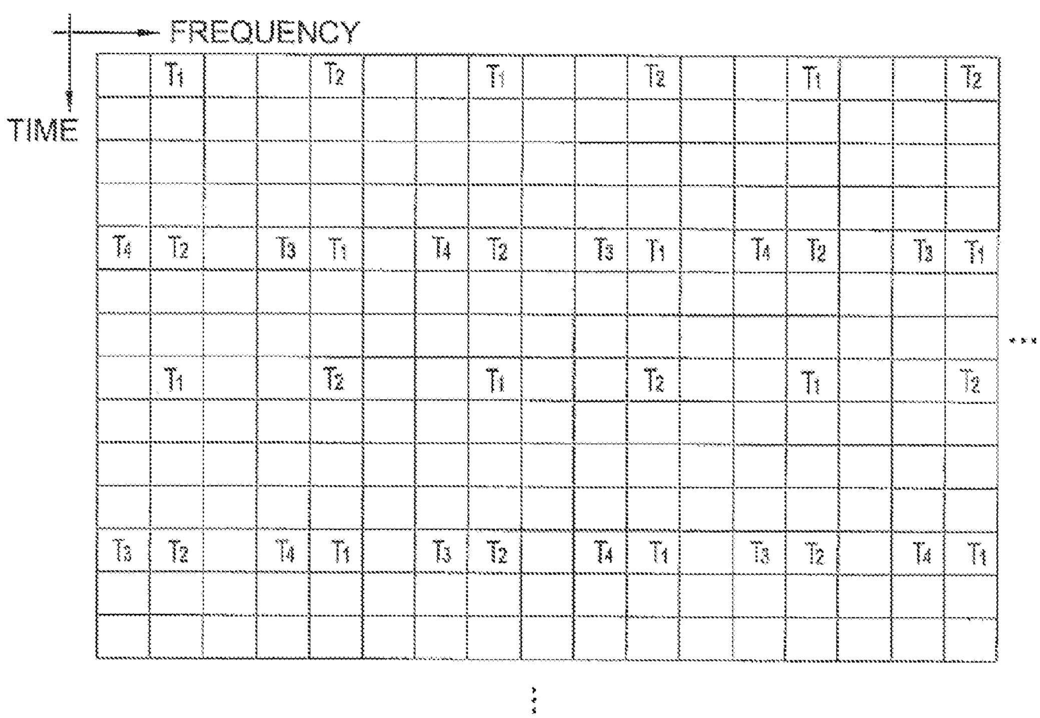

FIG. 45 illustrates an example of a reference signal allocation according to an embodiment of the present invention.

An array of (D, $T_1$, D, D, $T_2$, D) is repeated in the first and eighth OFDM symbols. An array of ($T_4$, $T_2$, D, $T_3$, $T_1$, D) is repeated in the fifth OFDM symbol. An array of ($T_3$, $T_2$, D, $T_4$, $T_1$, D) is repeated in the twelfth OFDM symbol.

Figure 46:
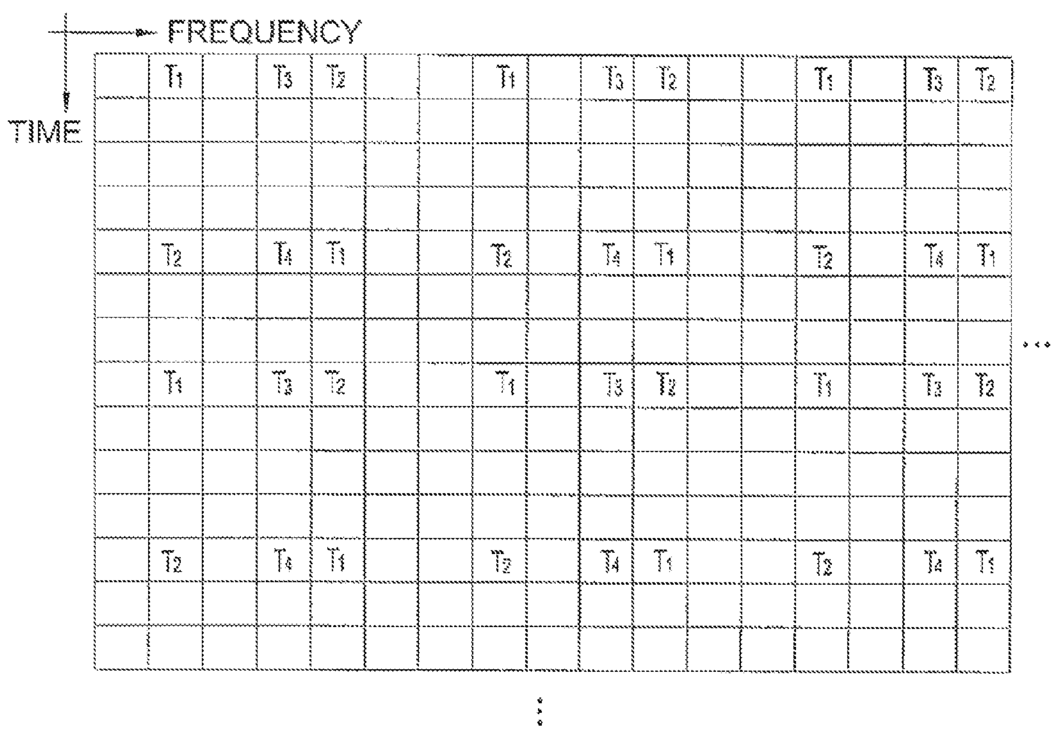

FIG. 46 illustrates an example of a reference signal allocation according to an embodiment of the present invention.

An array of ($T_1$, D, $T_3$, $T_2$, D, D) is repeated in the first and eighth OFDM symbols. An array of ($T_2$, D, $T_4$, $T_1$, D, D) is repeated in the fifth and twelfth OFDM symbols.

Figure 47:
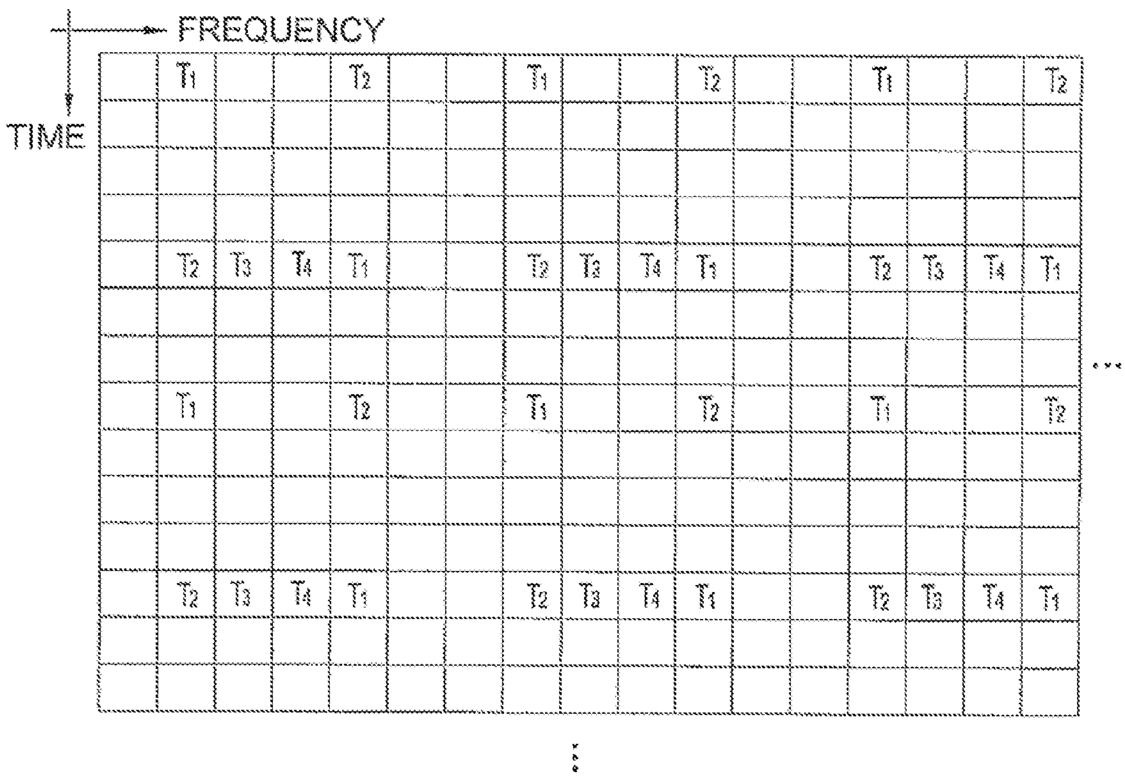

FIG. 47 illustrates an example of a reference signal allocation according to an embodiment of the present invention.

An array of ($T_1$, D, D, $T_2$, D, D) is repeated in the first and eighth OFDM symbols. An array of ($T_2$, $T_3$, $T_4$, $T_1$, D, D) is repeated in the fifth and twelfth OFDM symbols.

Figure 48:
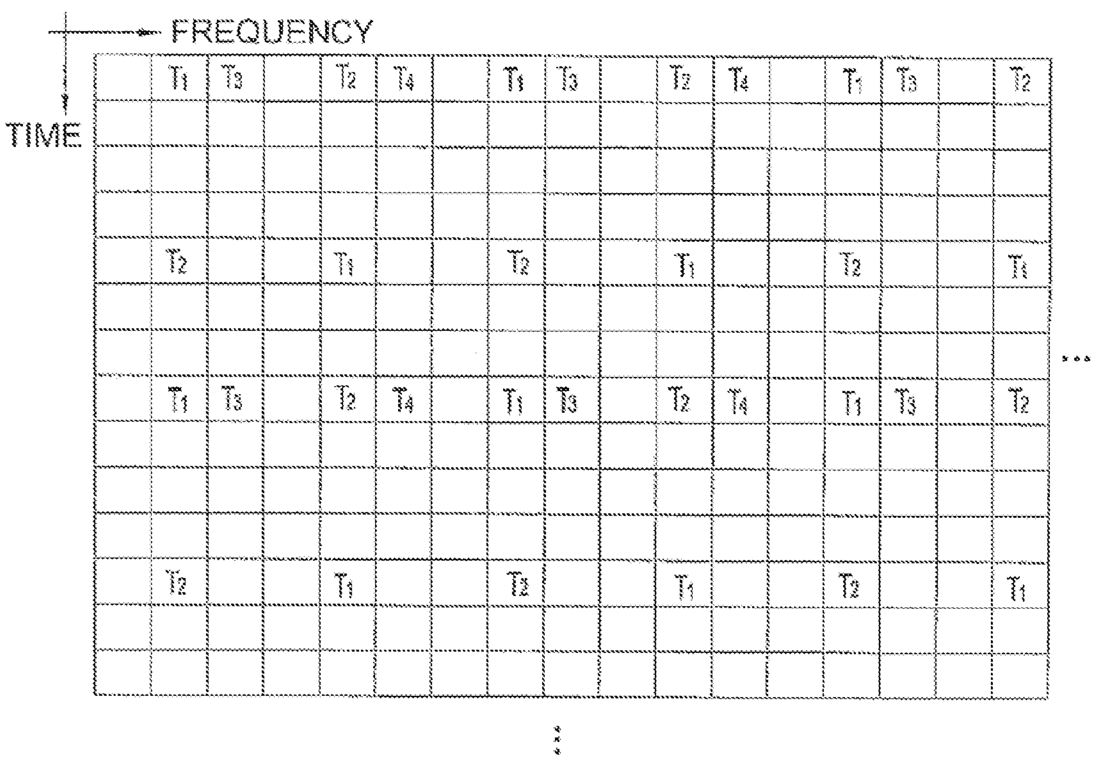

FIG. 48 illustrates an example of a reference signal allocation according to an embodiment of the present invention.

An array of ($T_1$, $T_3$, D, $T_2$, $T_4$, D) is repeated in the first and eighth OFDM symbols. An array of ($T_2$, D, D, $T_1$, D, D) is repeated in the fifth and twelfth OFDM symbols.

Figure 49:
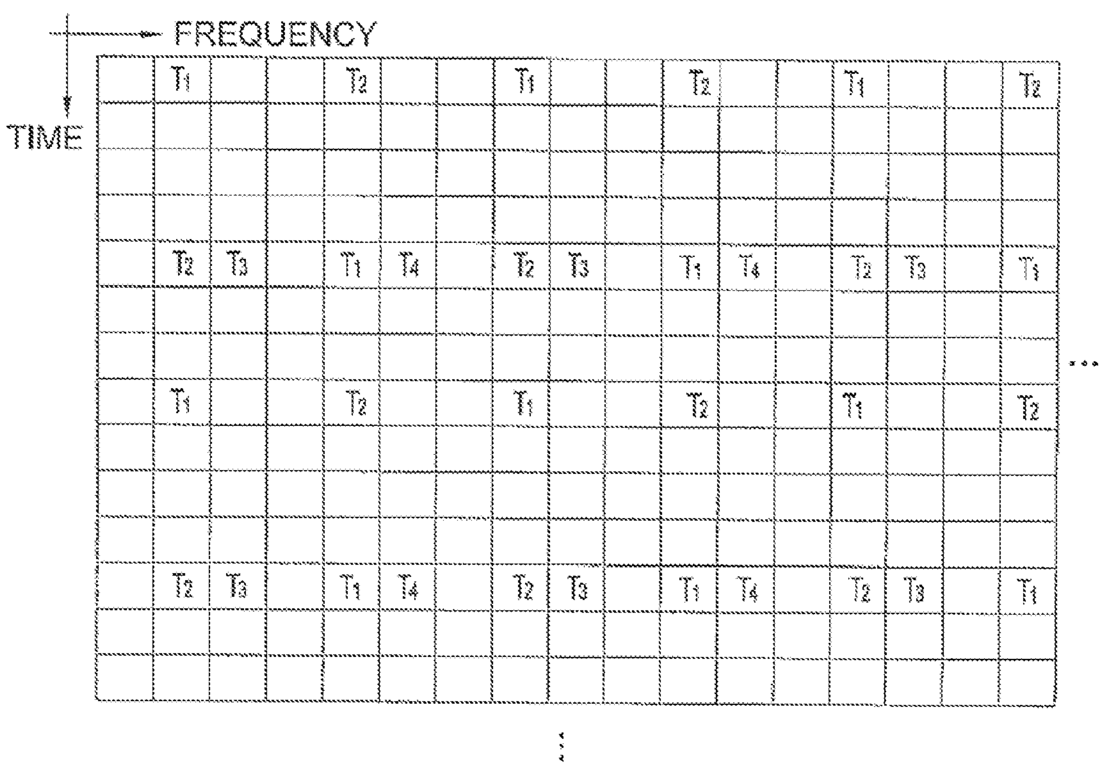

FIG. 49 illustrates an example of a reference signal allocation according to an embodiment of the present invention.

An array of ($T_1$, D, D, $T_2$, D, D) is repeated in the first and eighth OFDM symbols. An array of ($T_2$, $T_3$, D, $T_1$, $T_4$, D) is repeated in the fifth and twelfth OFDM symbols.

Figure 50:
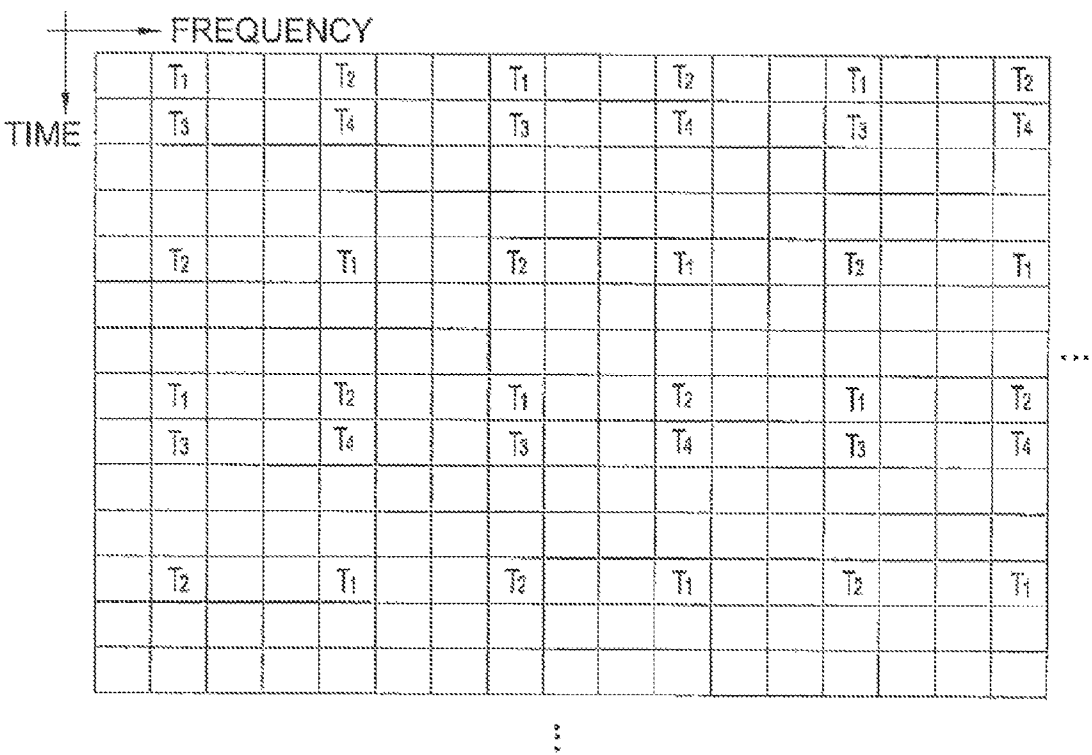

FIG. 50 illustrates an example of a reference signal allocation according to an embodiment of the present invention.

An array of ($T_1$, D, D, $T_2$, D, D) is repeated in the first and eighth OFDM symbols. An array of ($T_3$, D, D, $T_4$, D, D) is repeated in the second and ninth OFDM symbols. An array of ($T_2$, D, D, $T_1$, D, D) is repeated in the fifth and twelfth OFDM symbols.

Figure 51:
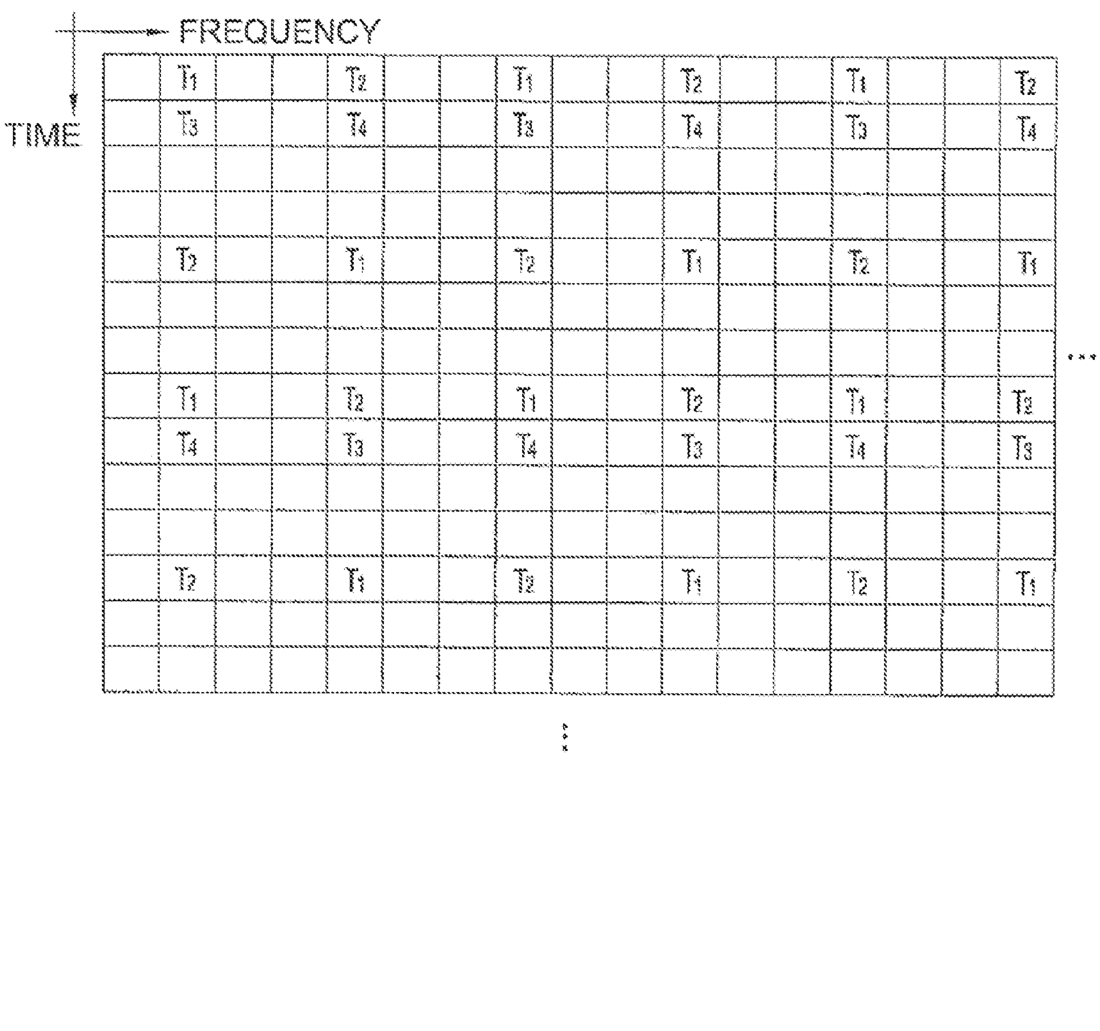

FIG. 51 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is repeated in the fifth and twelfth OFDM symbols. An array of ($T_3$, D, D, $T_4$, D, D) is repeated in the second OFDM symbol. An array of ($T_4$, D, D, $T_3$, D, D) is repeated in the ninth OFDM symbol.

In the first, fifth, and twelfth OFDM symbols, the reference signals $T_1$ and $T_2$ are staggered from each other for each antenna in the frequency domain. In the second and ninth OFDM symbols, the reference signals $T_3$ and $T_4$ are staggered from each other for each antenna in the frequency domain. Accordingly, selectivity can be ensured in the frequency domain.

The reference signals $T_1$ and $T_2$ are allocated in the first OFDM symbol. The reference signals $T_3$ and $T_4$ are allocated in the second OFDM symbol adjacent to the first OFDM symbol. When reference signals for multiple antennas are allocated over two consecutive OFDM symbols, the lower the rank, the higher the effectiveness is. For example, if the rank is one in some MIMO techniques, the same data is transmitted through four antennas. In this case, channel estimation can be further effectively achieved when the reference signals are allocated in the two consecutive OFDM symbols.

Furthermore, reference signals for at least two antennas are transmitted across the same frequency domain in the two consecutive OFDM symbols. Therefore, channel estimation can be achieved less erroneously than the case where reference signals are excessively staggered when the reference signals are concentrated in the frequency domain and the time domain.

Only a part of reference signals for all antennas are allocated in one OFDM symbol. For example, among reference signals for four antennas, only reference signals for two antennas may be allocated. Thus, power can be further boosted for each antenna, where power is allocated to the reference signals. As the power of reference signals increases, channel estimation can be further effectively carried out by the receiver.

In some receivers, the first some OFDM symbols (e.g. three OFDM symbols) are decoded. If the decoding result does not coincide with data stored in the receiver, the OFDM symbols transmitted thereafter are not buffered. This is referred to as a micro-sleep mode. In this case, the first some OFDM symbols have to include reference signals for all antennas. The micro-sleep mode may also be implemented when the reference signals for all antennas are allocated in the first and second OFDM symbols.

Figure 52:
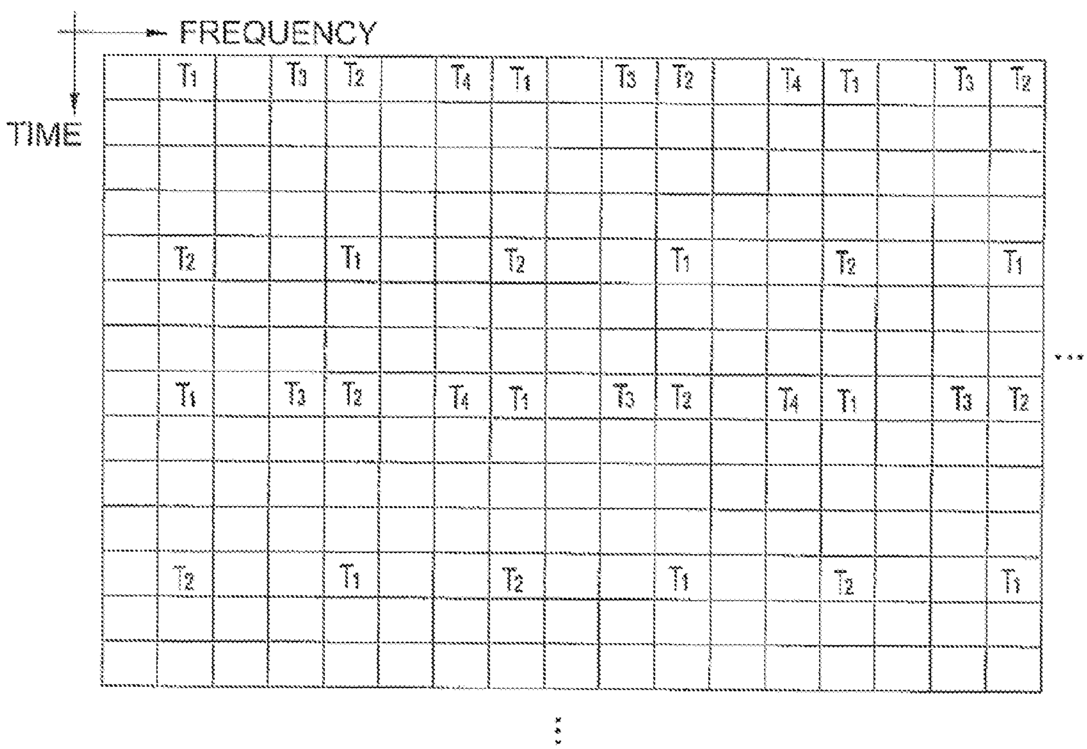

FIG. 52 illustrates an example of a reference signal allocation according to an embodiment of the present invention.

An array of ($T_1$, D, $T_3$, $T_2$, D, $T_4$) is allocated in the first and eighth OFDM symbols. An array of ($T_2$, D, D, $T_1$, D, D) is allocated in the fifth and twelfth OFDM symbols.

Figure 53:
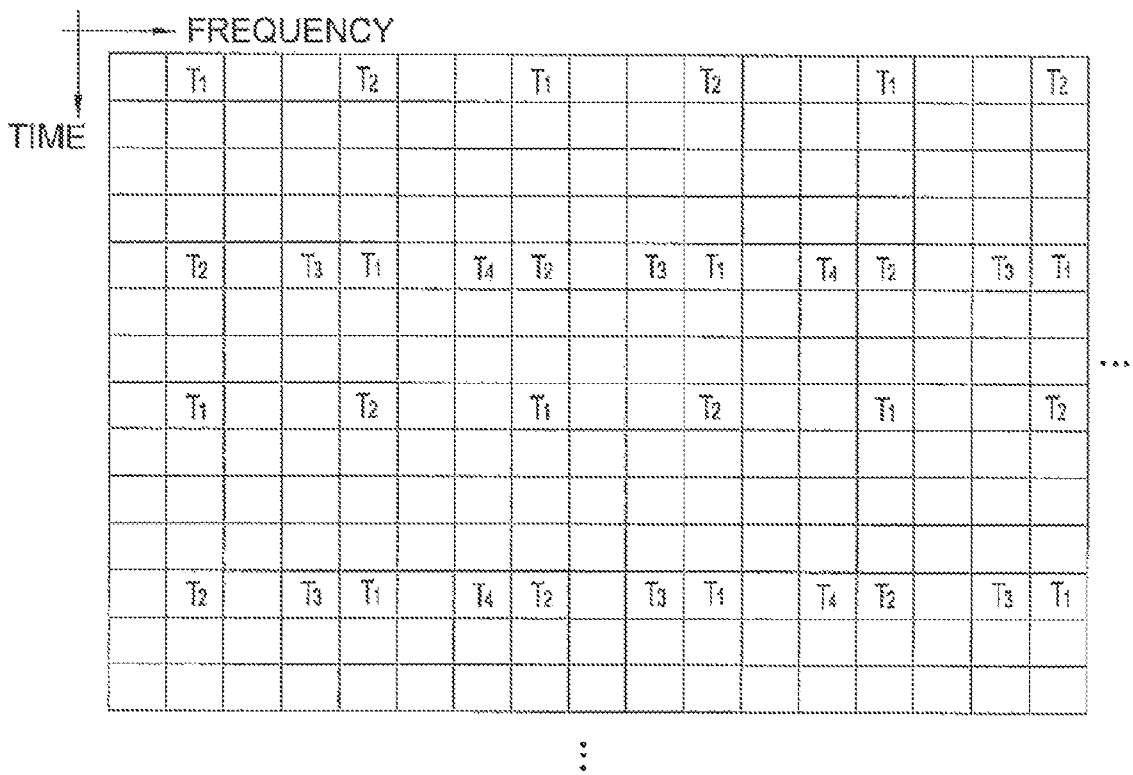

FIG. 53 illustrates an example of a reference signal allocation according to an embodiment of the present invention.

An array of ($T_1$, D, D, $T_2$, D, D) is repeated in the first and eighth OFDM symbols. An array of ($T_2$, D, $T_3$, $T_1$, D, $T_4$) is allocated in the fifth and twelfth OFDM symbols.

Figure 54:
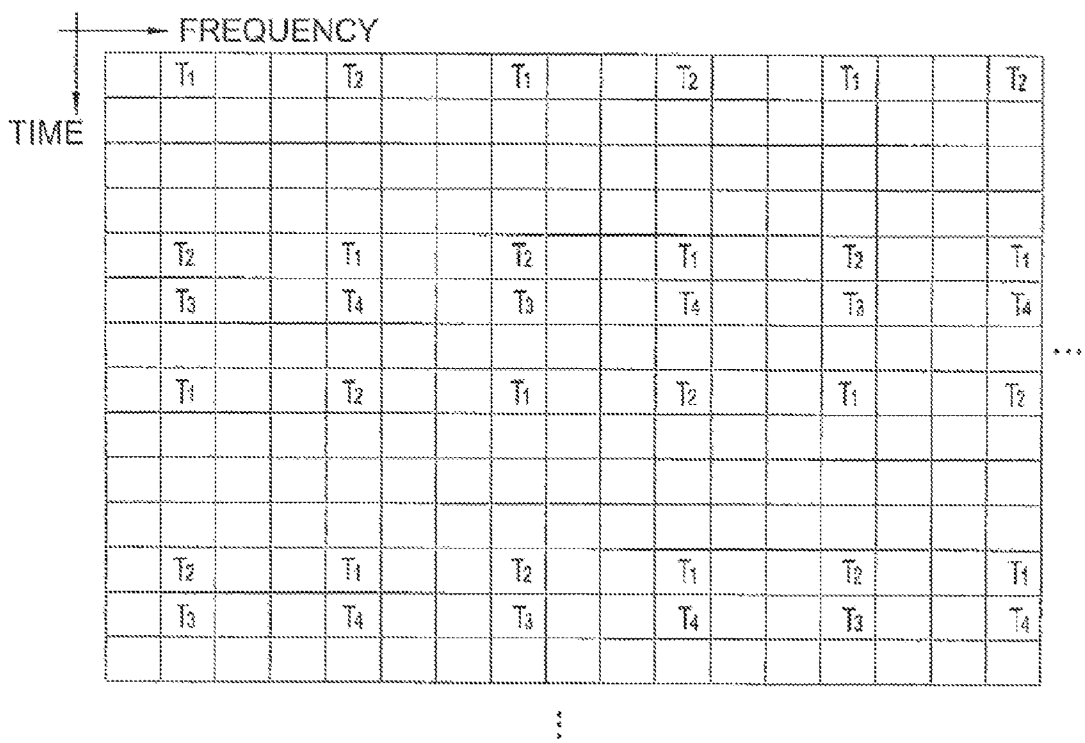

FIG. 54 illustrates an example of a reference signal allocation according to an embodiment of the present invention.

An array of ($T_1$, D, D, $T_2$, D, D) is allocated in the first and eighth OFDM symbols. An array of ($T_2$, D, D, $T_1$, D, D) is allocated in the fifth and twelfth OFDM symbols. An array of ($T_3$, D, D, $T_4$, D, D) is repeated in the sixth and thirteenth OFDM symbols.

Figure 55:
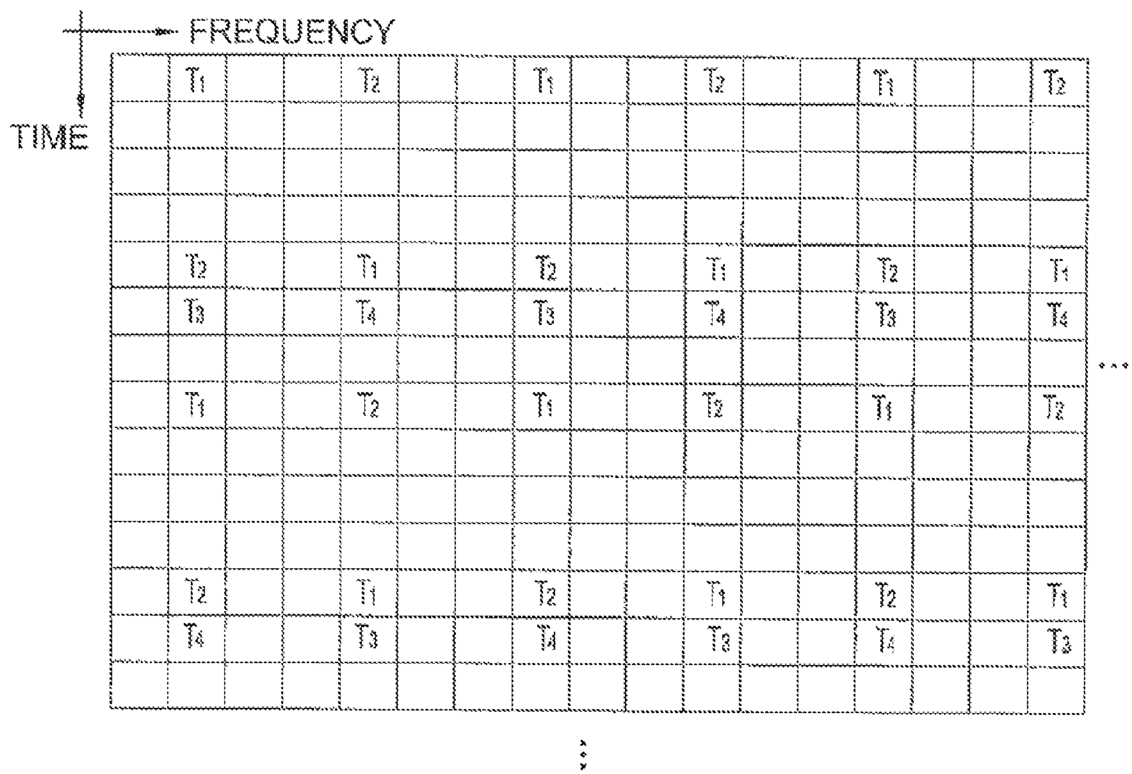

FIG. 55 illustrates an example of a reference signal allocation according to an embodiment of the present invention.

An array of ($T_1$, D, D, $T_2$, D, D) is allocated in the first and eighth OFDM symbols. An array of ($T_2$, D, D, $T_1$, D, D) is allocated in the fifth and twelfth OFDM symbols. An array of ($T_3$, D, D, $T_4$, D, D) is allocated in the sixth OFDM symbol. An array of ($T_4$, D, D, $T_3$, D, D) is allocated in the thirteenth OFDM symbol.

Figure 56:
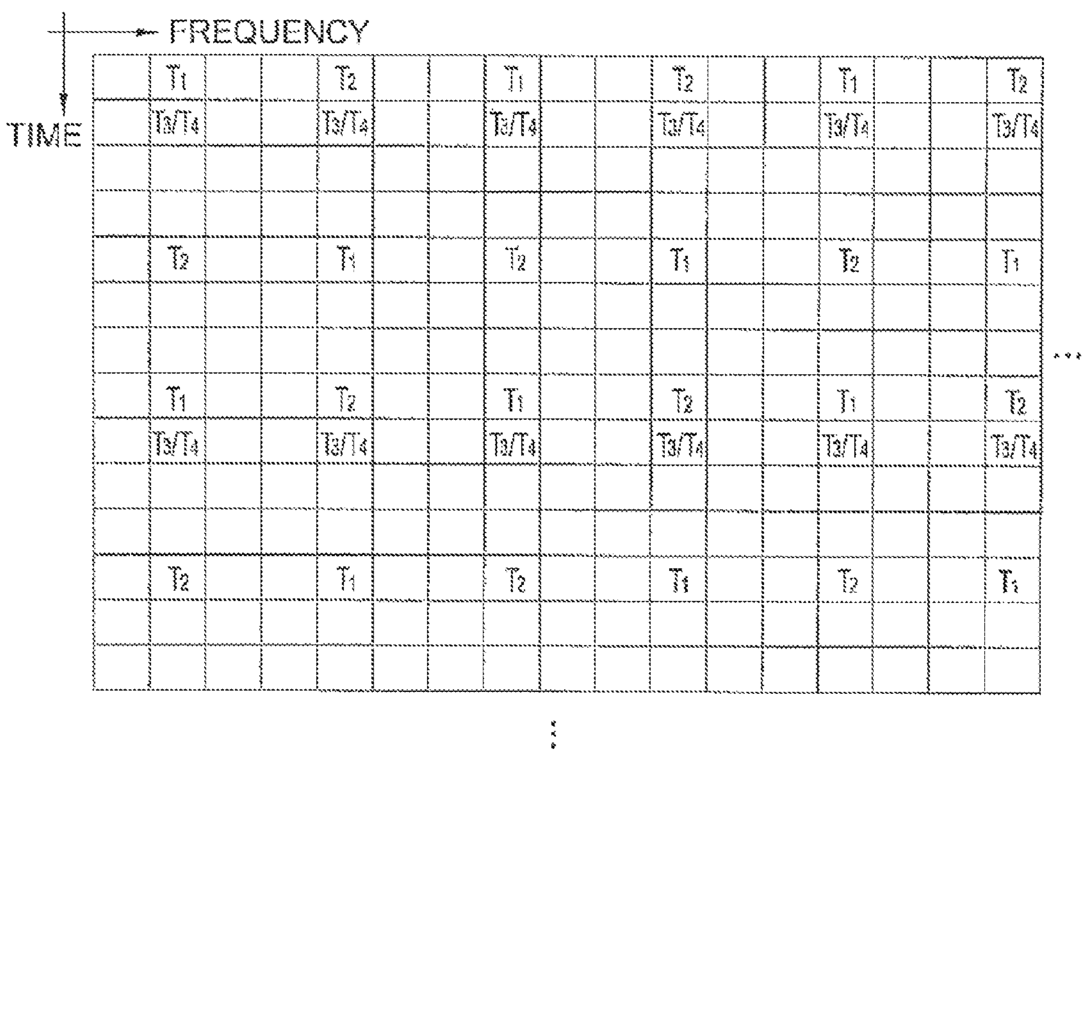

FIG. 56 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is allocated in the fifth and twelfth OFDM symbols. An array of ($T_3$/$T_4$, D, D) is allocated in the second and ninth OFDM symbols.

Figure 57:
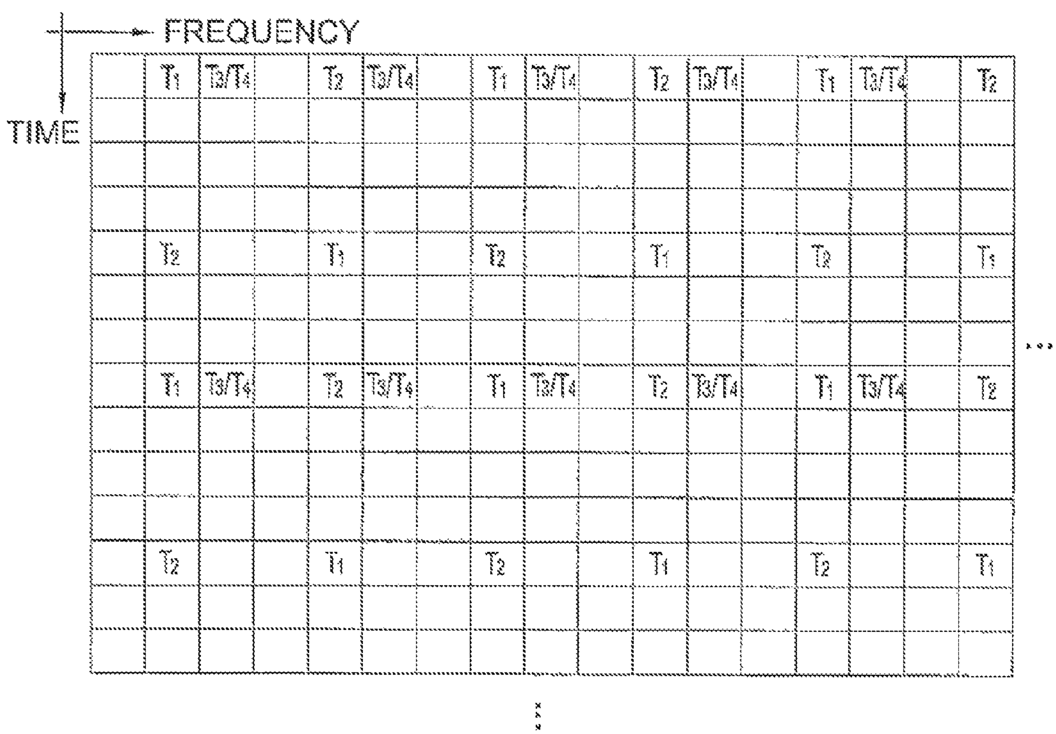

FIG. 57 illustrates an example of a reference signal allocation according to an embodiment of the present invention.

An array of ($T_1$, $T_3$/$T_4$, D, $T_2$, $T_3$/$T_4$, D) is repeated in the first and eighth OFDM symbols. An array of ($T_2$, D, D, $T_1$, D, D) is allocated in the fifth and twelfth OFDM symbols.

Figure 58:
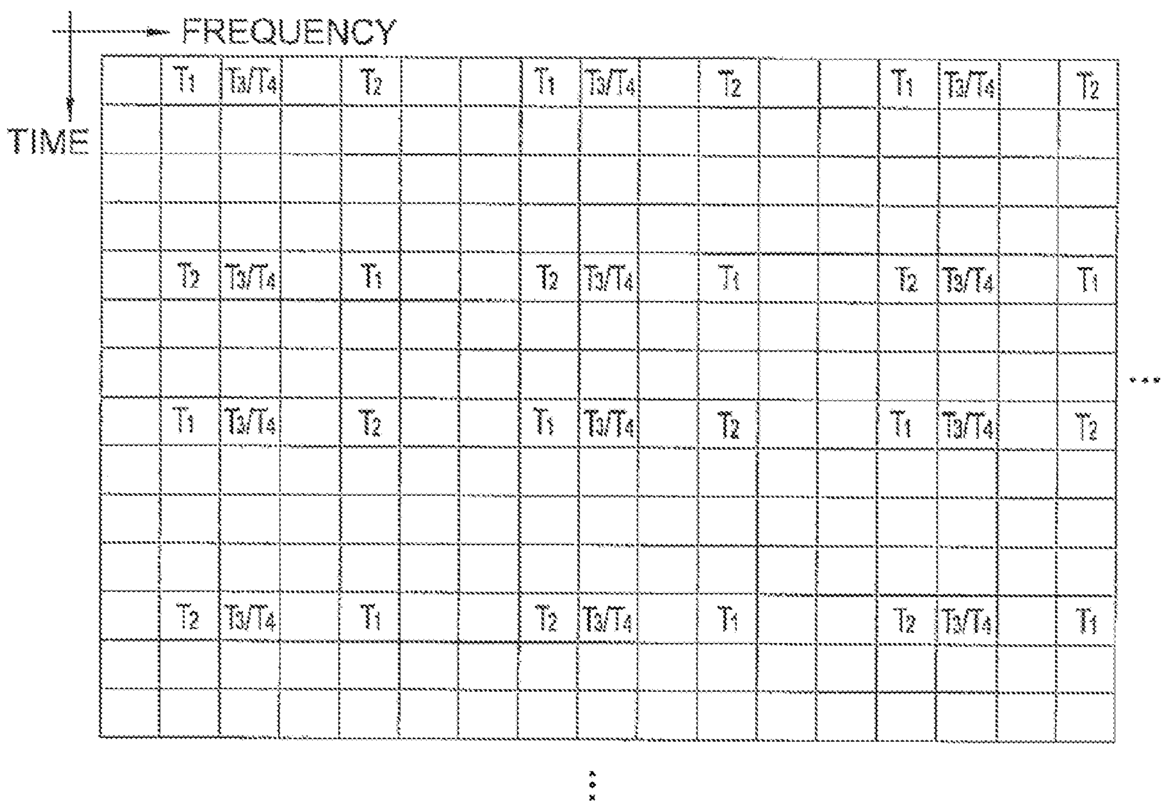

FIG. 58 illustrates an example of a reference signal allocation according to an embodiment of the present invention.

An array of ($T_1$, $T_3$/$T_4$, D, $T_2$, D, D) is allocated in the first and eighth OFDM symbols. An array of ($T_2$, $T_3$/$T_4$, D, $T_1$, D, D) is repeated in the fifth and twelfth OFDM symbols.

Figure 59:
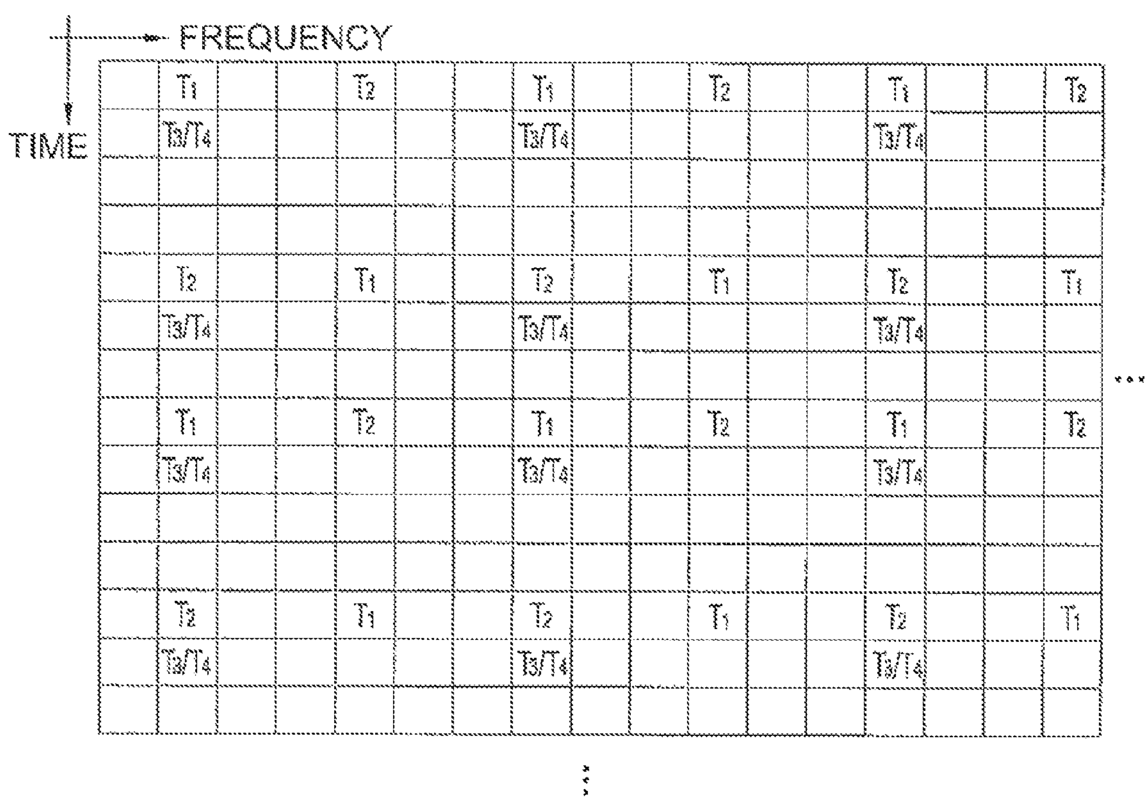

FIG. 59 illustrates an example of a reference signal allocation according to an embodiment of the present invention.

An array of ($T_1$, D, D, $T_2$, D, D) is allocated in the first and eighth OFDM symbols. An array of ($T_2$, D, D, $T_1$, D, D) is allocated in the fifth and twelfth OFDM symbols. An array of ($T_3$/$T_4$, D, D, D, D, D) is allocated in the second, sixth, ninth, and thirteenth OFDM symbols.

Figure 60:
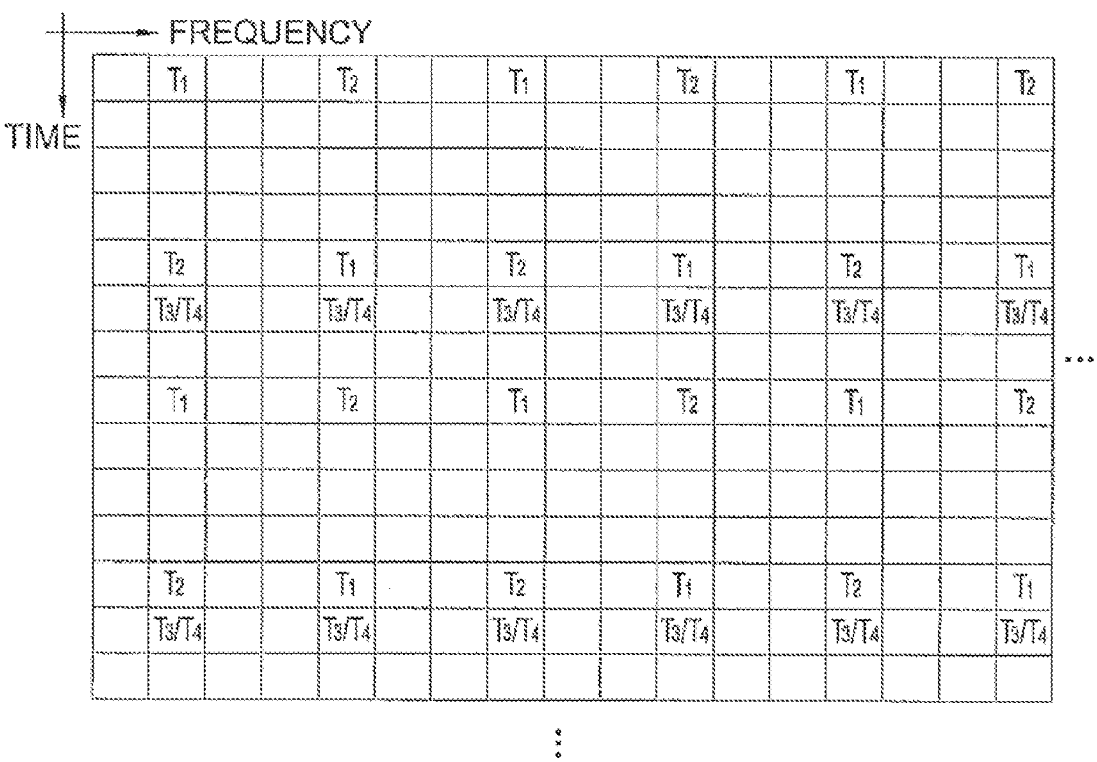

FIG. 60 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is repeated in the fifth and twelfth OFDM symbols. An array of ($T_3$/$T_4$, D, D) is repeated in the sixth and thirteenth OFDM symbols.

Figure 61:
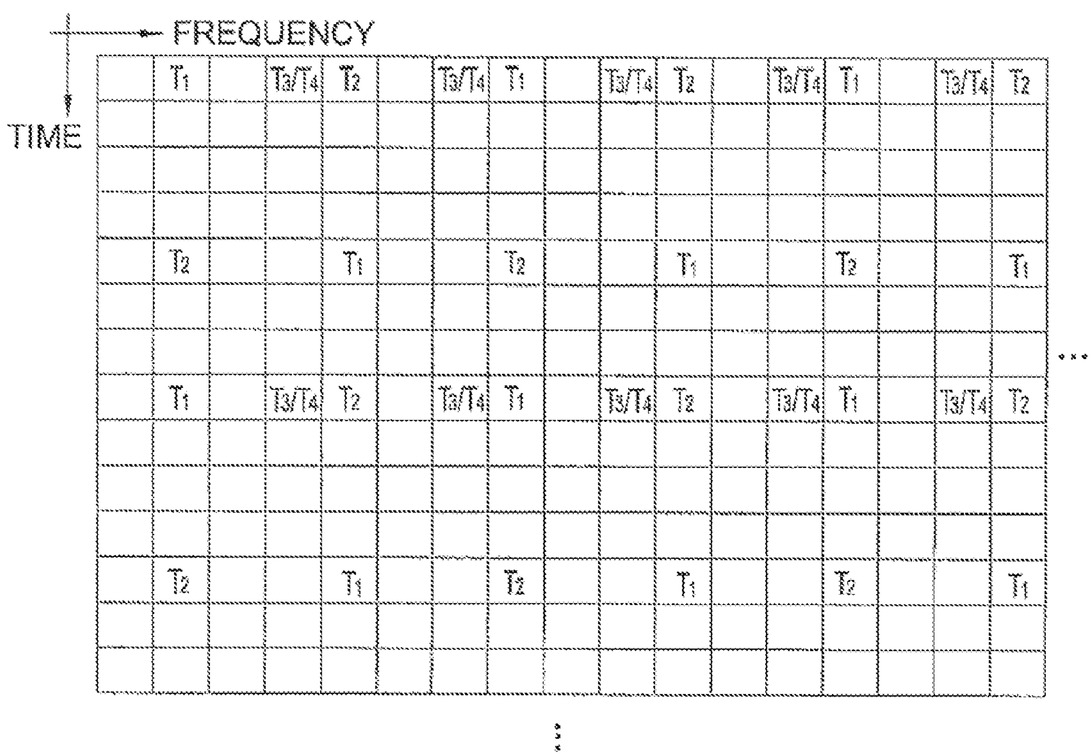

FIG. 61 illustrates an example of a reference signal allocation according to an embodiment of the present invention.

An array of ($T_1$, D, $T_3$/$T_4$, $T_2$, D, $T_3$/$T_4$) is repeated in the first and eighth OFDM symbols. An array of ($T_2$, D, D, $T_1$, D, D) is repeated in the fifth and twelfth OFDM symbols.

Figure 62:
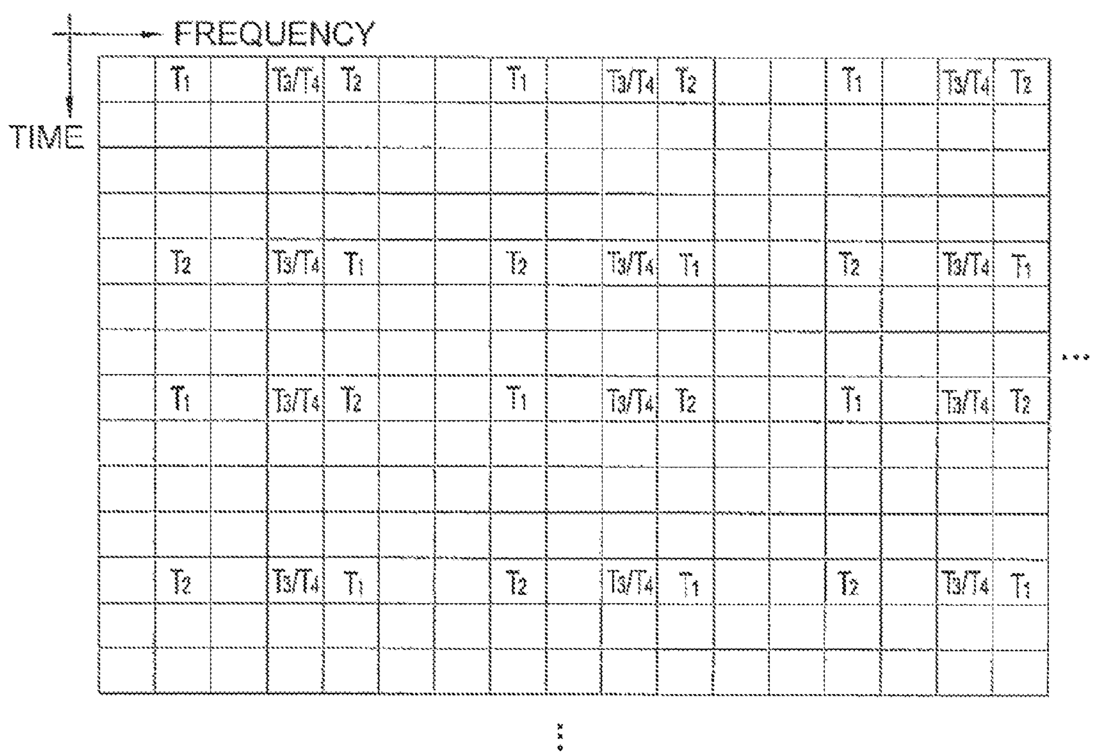

FIG. 62 illustrates an example of a reference signal allocation according to an embodiment of the present invention.

An array of ($T_1$, D, $T_3$/$T_4$, $T_2$, D, D) is repeated in the first and eighth OFDM symbols. An array of ($T_2$, D, $T_3$/$T_4$, $T_1$, D, D) is repeated in the fifth and twelfth OFDM symbols.

Figure 63:
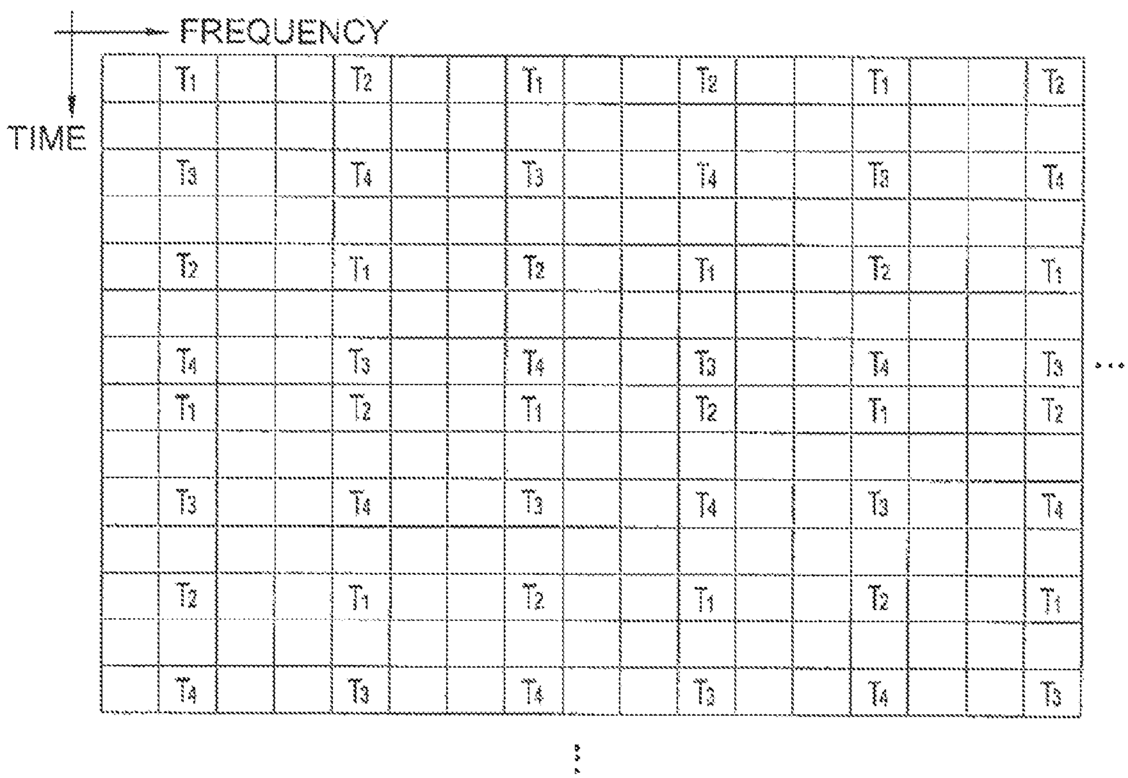

FIG. 63 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is repeated in the fifth and twelfth OFDM symbols. An array of ($T_3$, D, D, $T_4$, D, D) is repeated in the third and tenth OFDM symbols. An array of ($T_4$, D, D, $T_3$, D, D) is repeated in the seventh OFDM and fourteenth OFDM symbols.

Figure 64:
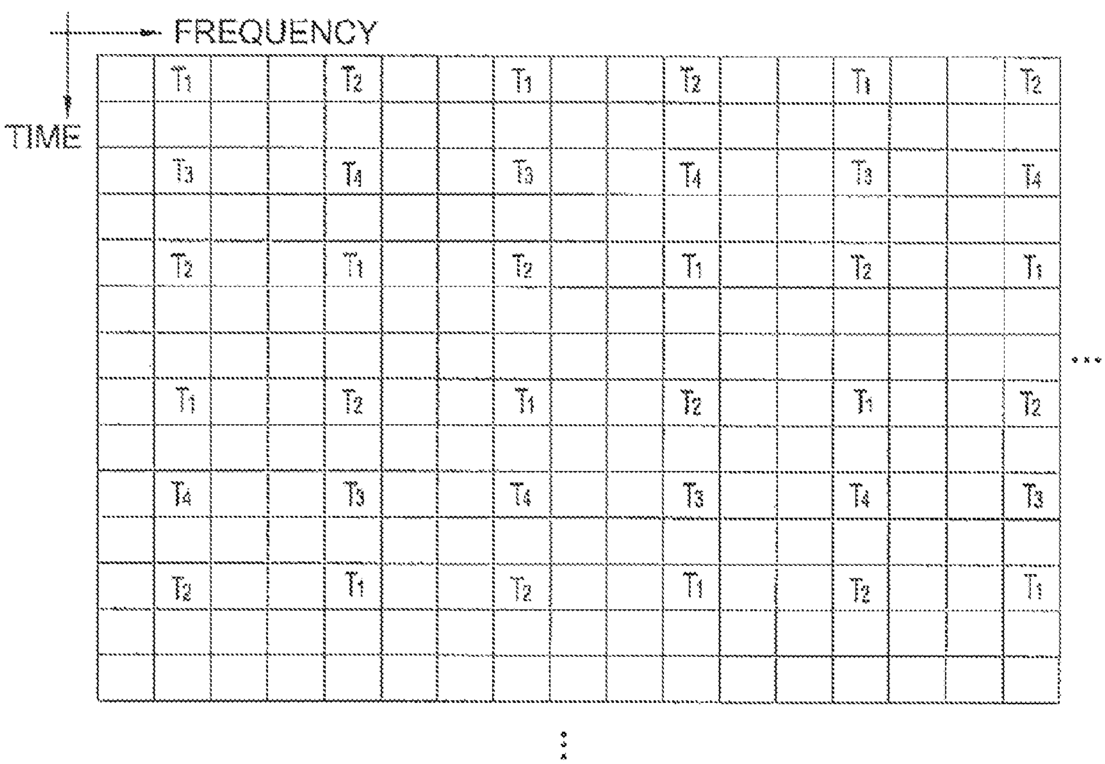

FIG. 64 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is allocated in the fifth and twelfth OFDM symbols. An array of ($T_3$, D, D, $T_4$, D, D) is repeated in the third OFDM symbol. An array of ($T_4$, D, D, $T_3$, D, D) is repeated in the tenth OFDM symbol.

Figure 65:
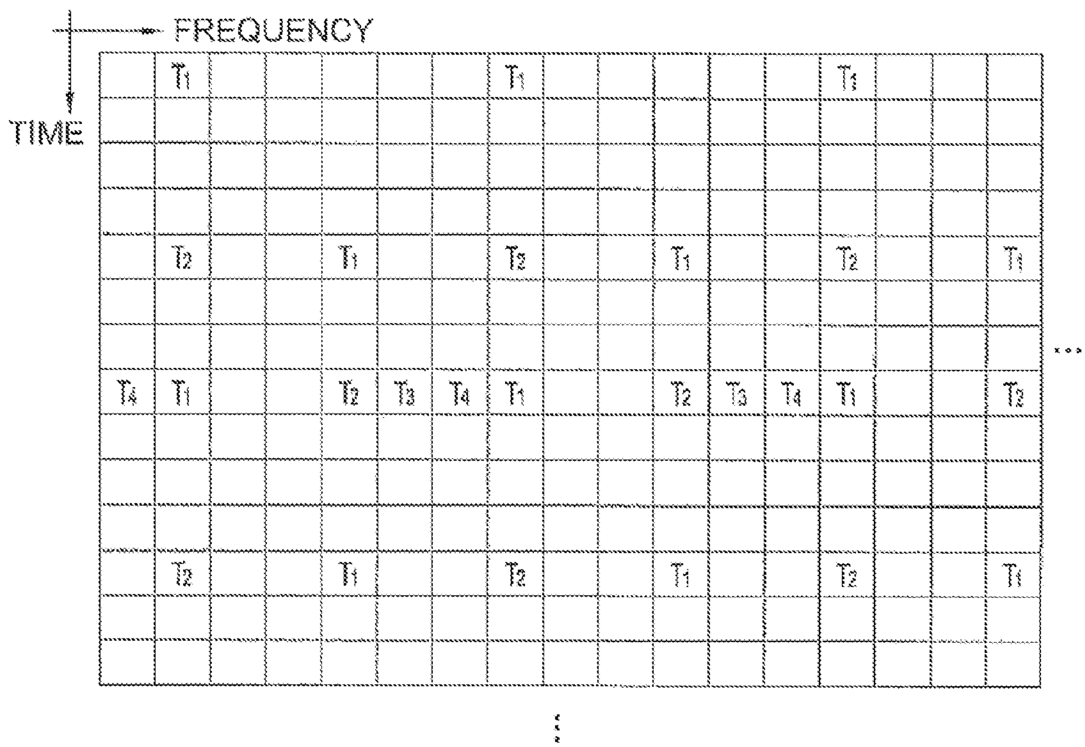

FIG. 65 illustrates an example of a reference signal allocation according to an embodiment of the present invention.

An array of (D, $T_1$, D, D, D, D) is repeated in the first OFDM symbol. An array of ($T_4$, $T_1$, D, D, $T_2$, $T_3$) is repeated in the eighth OFDM symbol. An array of (D, $T_2$, D, D, $T_1$, D) is repeated in the fifth and twelfth OFDM symbols.

When a micro-sleep mode is applied in which a control signal is allocated in an OFDM symbol positioned in an initial time sequence on the time axis, the control signal may be transmitted through one or two antennas. If the control signal is transmitted through the first antenna, reference signals for the first antennas may be allocated in the first OFDM symbol.

Figure 66:
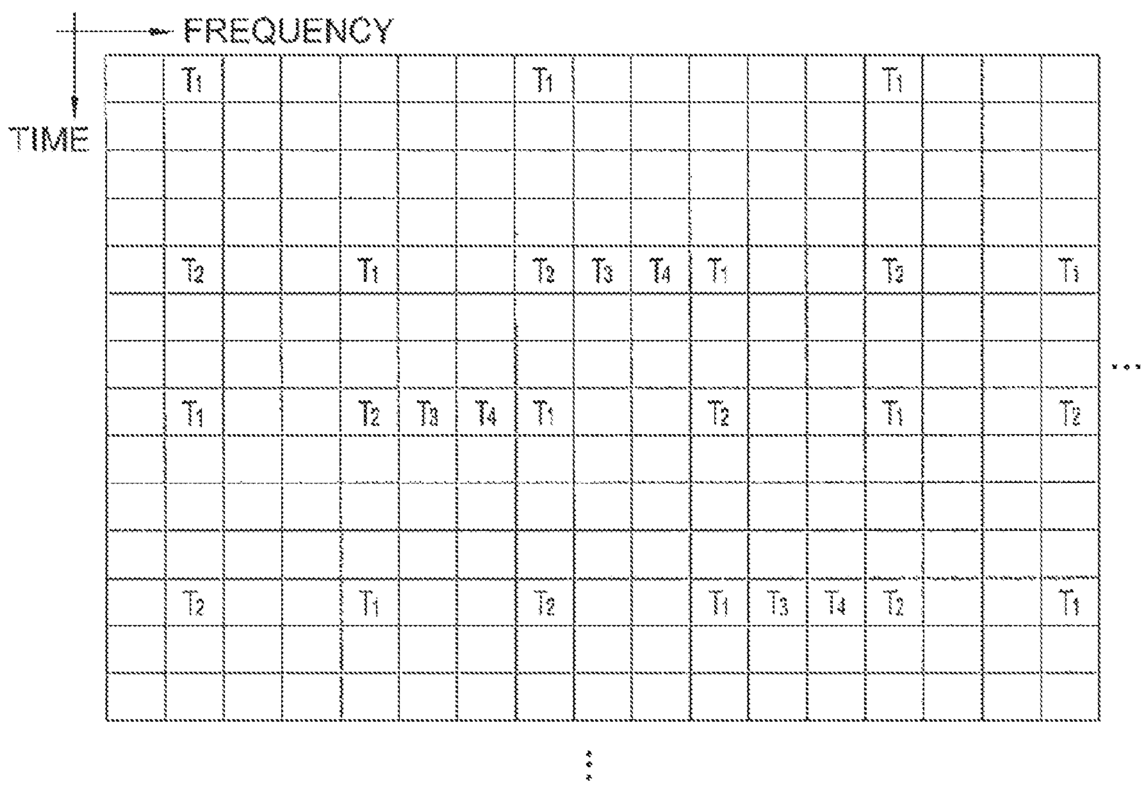

FIG. 66 illustrates an example of a reference signal allocation according to an embodiment of the present invention.

An array of ($T_1$, D, D, D, D, D) is repeated in the first OFDM symbol. An array of ($T_2$, D, D, $T_1$, D, D, $T_2$, $T_3$, $T_4$, $T_1$, D, D) is repeated in the fifth OFDM symbol. An array of ($T_1$, D, D, $T_2$, $T_3$, $T_4$, $T_1$, D, D, $T_2$, D, D) is repeated in the eighth OFDM symbol. An array of ($T_2$, D, D, $T_1$, D, D, $T_2$, D, D, $T_1$, $T_3$, $T_4$) is repeated in the twelfth OFDM symbol.

If the control signal is transmitted through the first antenna in the micro-sleep mode, the reference signals for the first antenna are allocated in OFDM symbols positioned in the initial time sequence on the time axis. For example, if the control signal is transmitted through the first antenna, the reference signals for the first antennas may be allocated in the first OFDM symbol.

Figure 67:
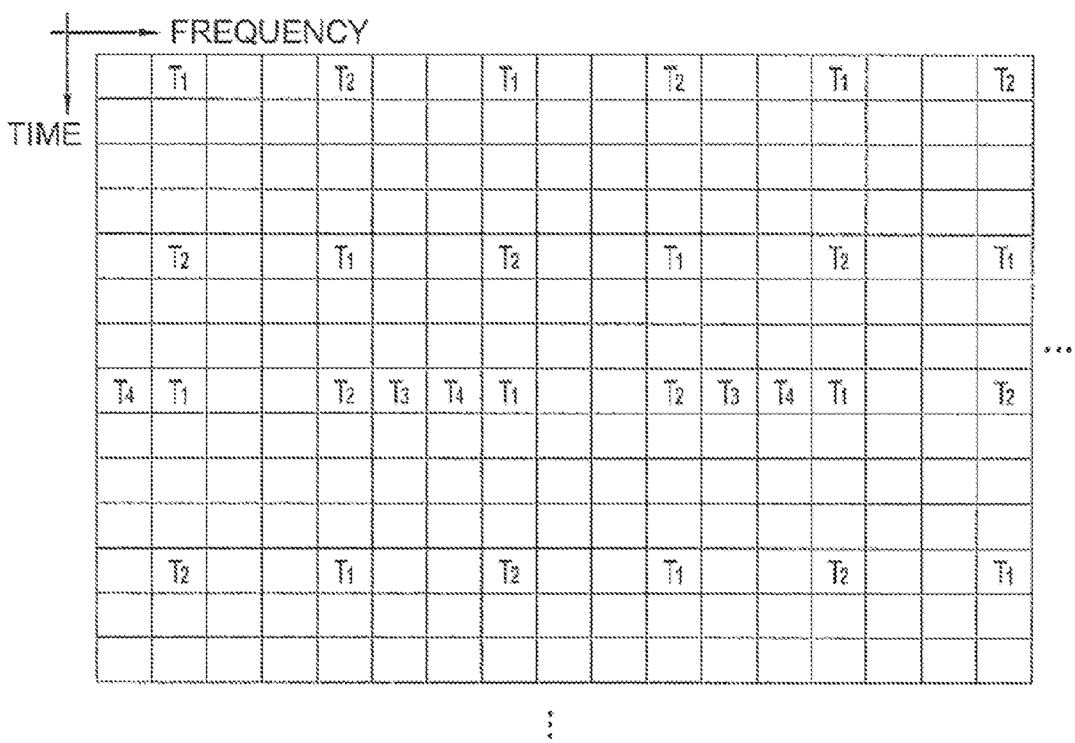

FIG. 67 illustrates an example of a reference signal allocation according to an embodiment of the present invention.

An array of (D, $T_1$, D, D, $T_2$, D) is allocated in the first OFDM symbol. An array of ($T_4$, $T_1$, D, D, $T_2$, $T_3$) is allocated in the eighth OFDM symbol. An array of (D, $T_2$, D, D, $T_1$, D) is allocated in the fifth and twelfth OFDM symbols. If the control signal is transmitted through the first and second antennas in the micro-sleep mode, the reference signals for the first and second antennas are allocated in OFDM symbols positioned in the initial time sequence on the time axis.

Figure 68:
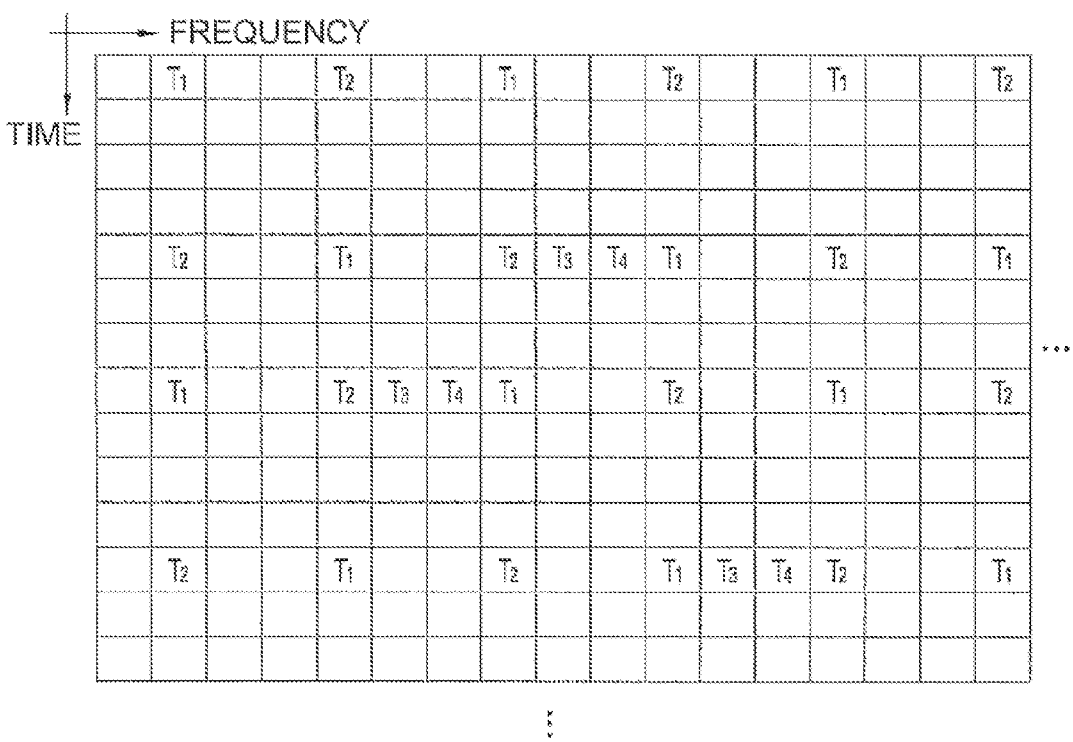

FIG. 68 illustrates an example of a reference signal allocation according to an embodiment of the present invention.

If the control signal is transmitted through two antennas in the micro-sleep mode, reference signals are allocated as follows. An array of ($T_1$, D, D, $T_2$, D, D) is repeated in the first OFDM symbol. An array of ($T_2$, D, D, $T_1$, D, D, $T_2$, $T_3$, $T_4$, $T_1$, D, D) is allocated in the fifth OFDM symbol. An array of ($T_1$, D, D, $T_2$, $T_3$, $T_4$, $T_1$, D, D, $T_2$, D, D) is allocated in the eight OFDM symbol. An array of ($T_2$, D, D, $T_1$, D, D, $T_2$, D, D, $T_1$, $T_3$, $T_4$) is allocated in the twelfth OFDM symbol. If the control signal is transmitted through the first and second antennas in the micro-sleep mode, reference signals for the first and second antennas are allocated in OFDM symbols positioned in the initial time sequence on the time axis.

Figure 69:
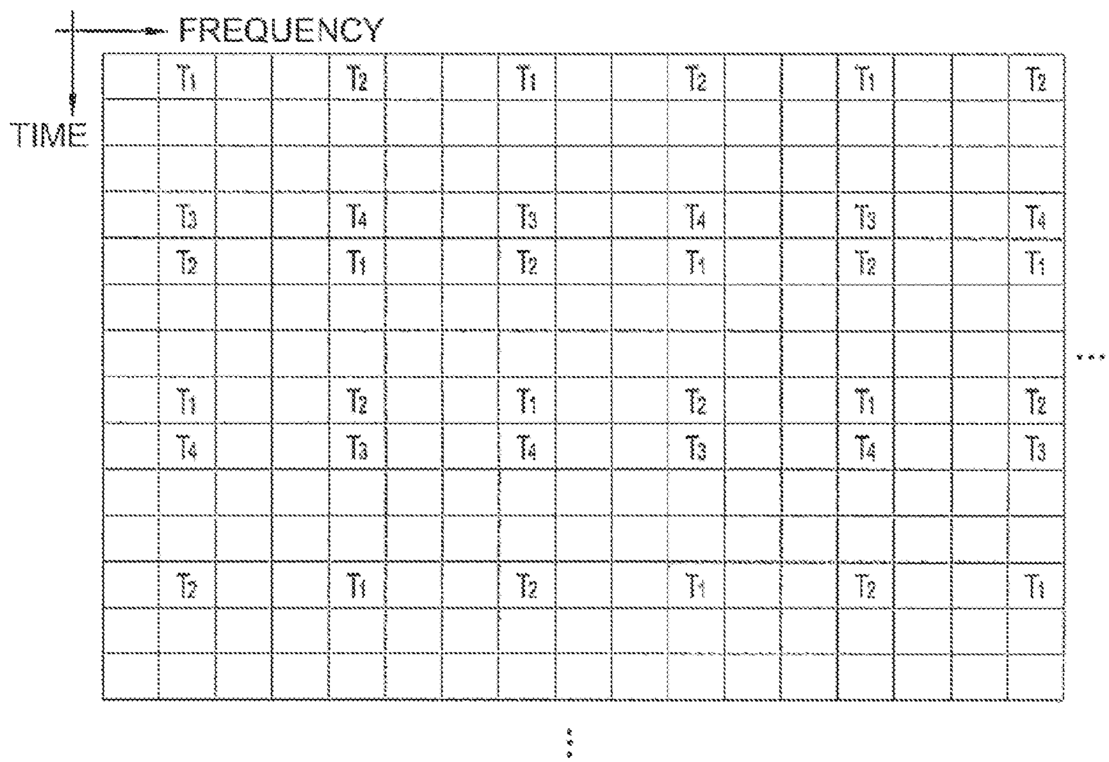

FIG. 69 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is repeated in the fifth and twelfth OFDM symbols. An array of ($T_3$, D, D, $T_4$, D, D) is repeated in the fourth OFDM symbol. An array of ($T_4$, D, D, $T_3$, D, D) is repeated in the ninth OFDM symbol.

A sub-frame can be divided by two regions, a control channel and a data channel. The control channel is the region carrying control data. The data channel is the region carrying user data. For example, a first OFDM symbol, a second OFDM symbol and a third OFDM symbol may be allocated for the control channel and the other OFDM symbols mat be allocated for the data channel. Although the number of OFDM symbols for the control channel is smaller than that of OFDM symbols for the control channel, the reliability for the control channel has to be higher than that of the data channel. Only a part of multiple antennas can be assigned for transmitting the control channel. A first antenna and a second antenna can be used for the control channel. In this case, reference signals for a third antenna and reference signals for a fourth antenna may not be assigned for the OFDM symbols for the control channel because the third antenna and the fourth antenna are not used for the control channel.

Figure 70:
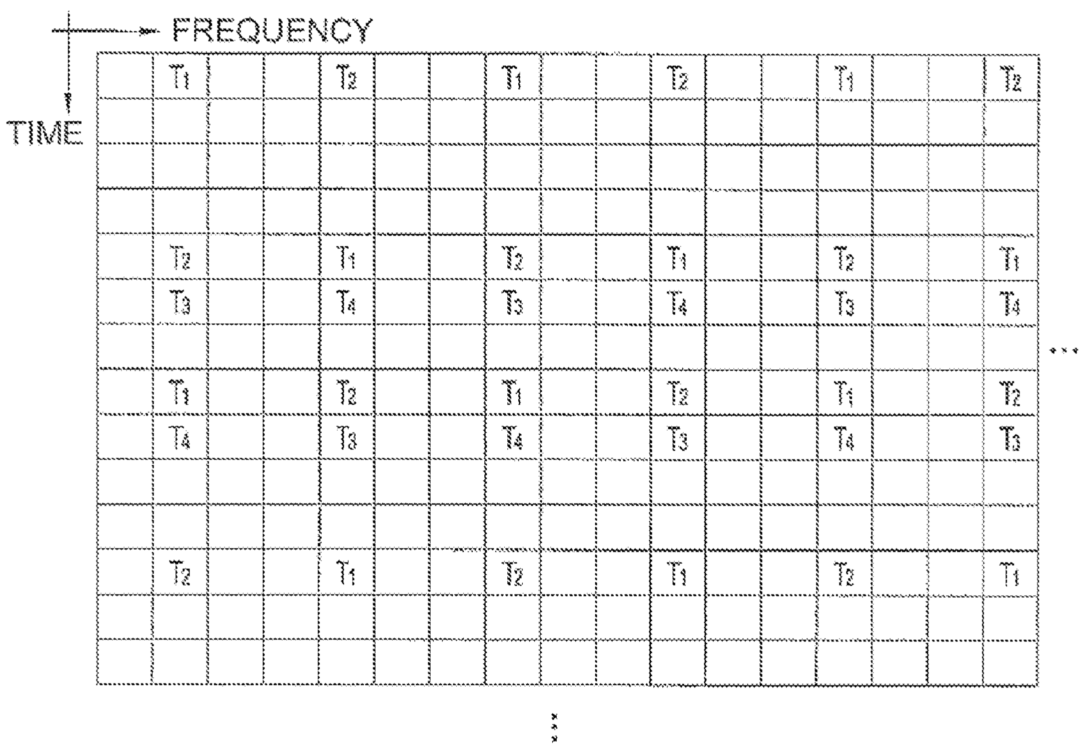

FIG. 70 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is repeated in the fifth and twelfth OFDM symbols. An array of ($T_3$, D, D, $T_4$, D, D) is repeated in the sixth OFDM symbol. An array of ($T_4$, D, D, $T_3$, D, D) is repeated in the ninth OFDM symbol.

At the channel, reference signals for a third antenna and reference signals for a fourth antenna is next to reference signals for a first antenna and reference signals for a second antenna so as to improve accuracy for channel estimation.

Figure 71:
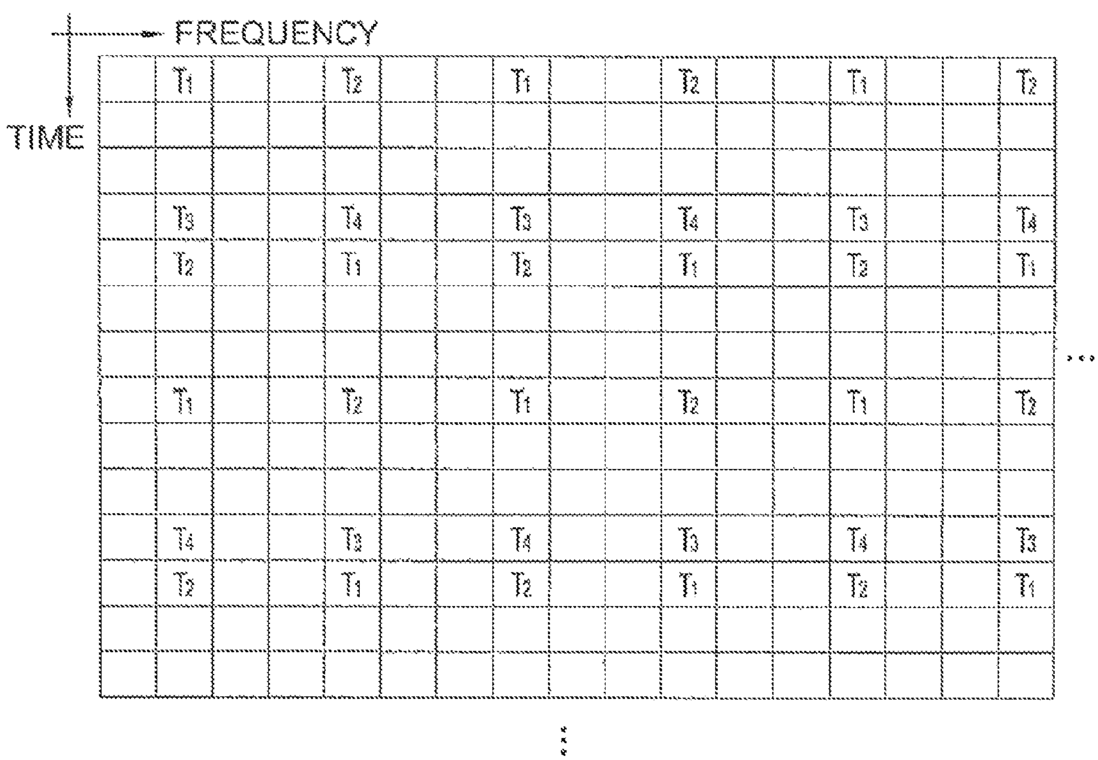

FIG. 71 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is repeated in the fifth and twelfth OFDM symbols. An array of ($T_3$, D, D, $T_4$, D, D) is repeated in the fourth OFDM symbol. An array of ($T_4$, D, D, $T_3$, D, D) is repeated in the eleventh OFDM symbol.

In consecutive sub-frames, the interval for reference signals for a third antenna and a fourth antenna can constantly be maintained.

Figure 72:
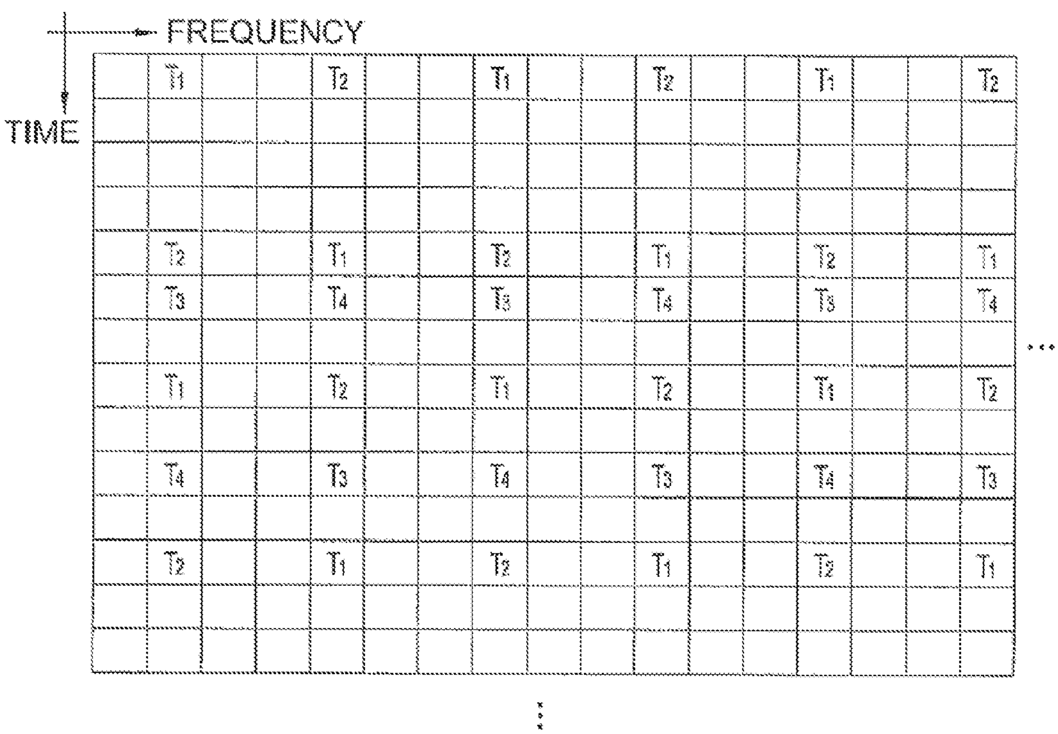

FIG. 72 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is repeated in the fifth and twelfth OFDM symbols. An array of ($T_3$, D, D, $T_4$, D, D) is repeated in the sixth OFDM symbol. An array of ($T_4$, D, D, $T_3$, D, D) is repeated in the tenth OFDM symbol.

Figure 73:
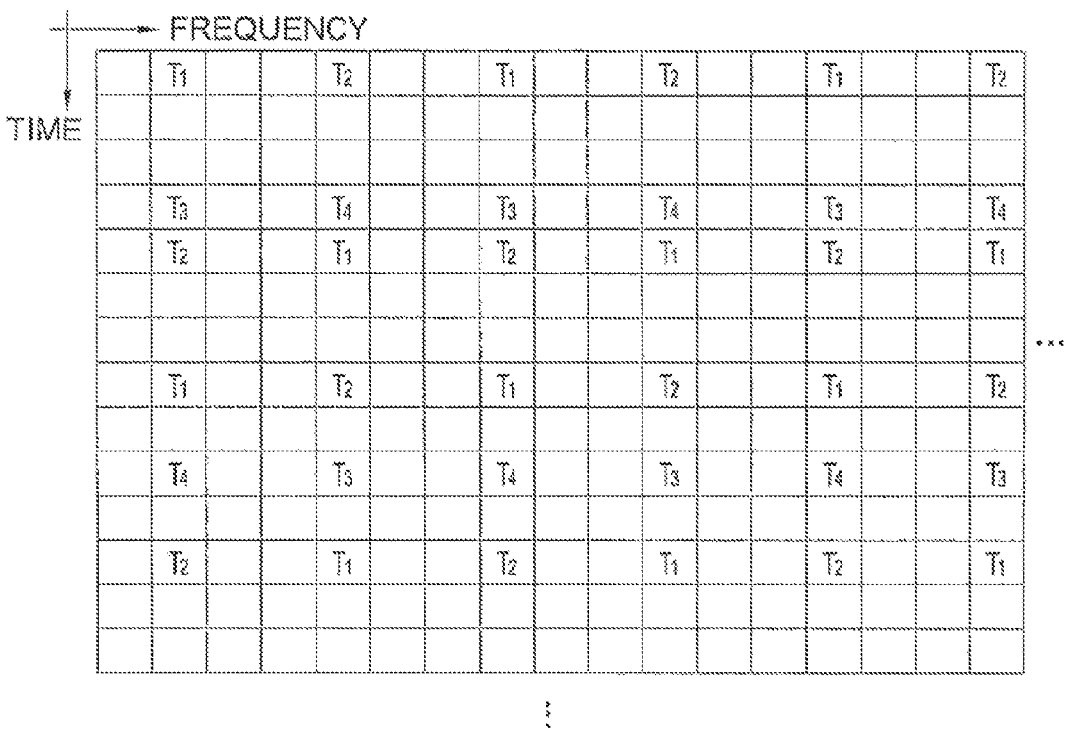

FIG. 73 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is repeated in the fifth and twelfth OFDM symbols. An array of ($T_3$, D, D, $T_4$, D, D) is repeated in the fourth OFDM symbol. An array of ($T_4$, D, D, $T_3$, D, D) is repeated in the tenth OFDM symbol.

Figure 74:
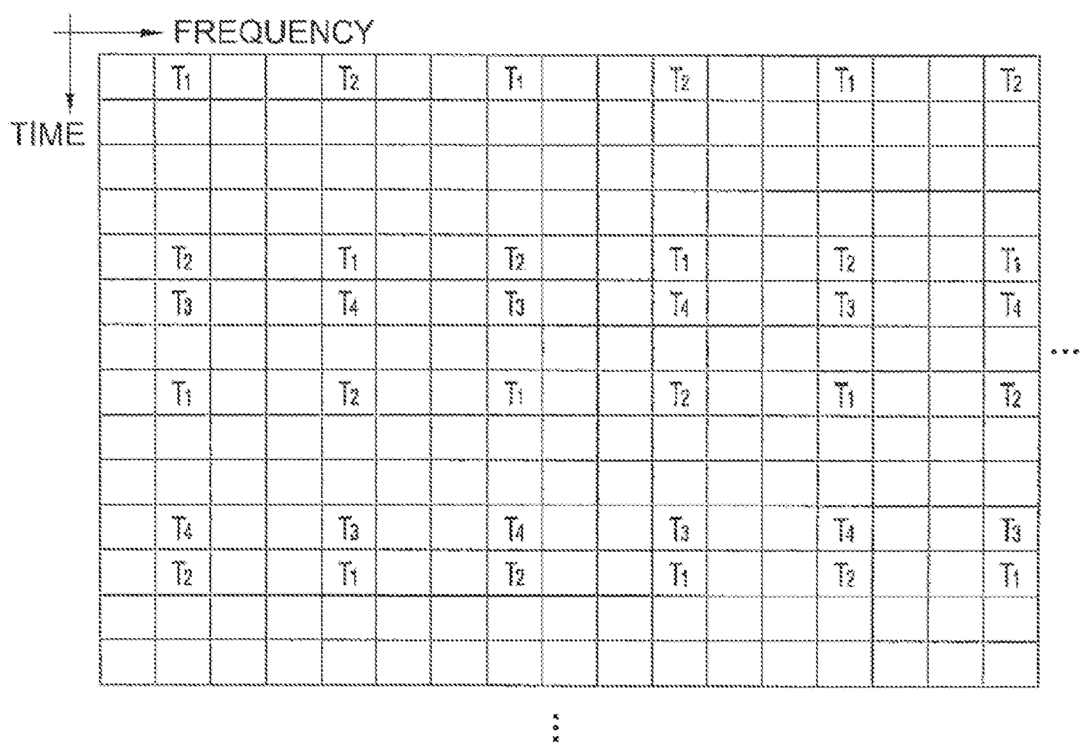

FIG. 74 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is repeated in the fifth and twelfth OFDM symbols. An array of ($T_3$, D, D, $T_4$, D, D) is repeated in the sixth OFDM symbol. An array of ($T_4$, D, D, $T_3$, D, D) is repeated in the eleventh OFDM symbol.

Figure 75:
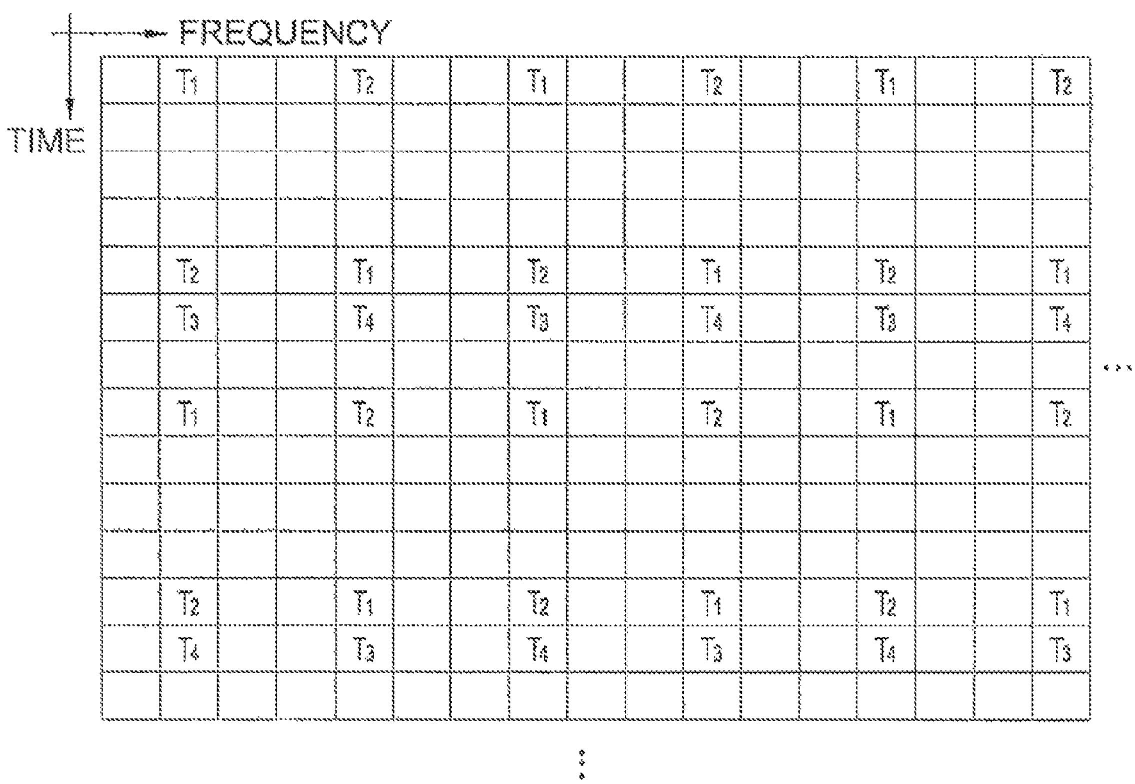

FIG. 75 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is repeated in the fifth and twelfth OFDM symbols. An array of ($T_3$, D, D, $T_4$, D, D) is repeated in the sixth OFDM symbol. An array of ($T_4$, D, D, $T_3$, D, D) is repeated in the thirteenth OFDM symbol.

Figure 76:
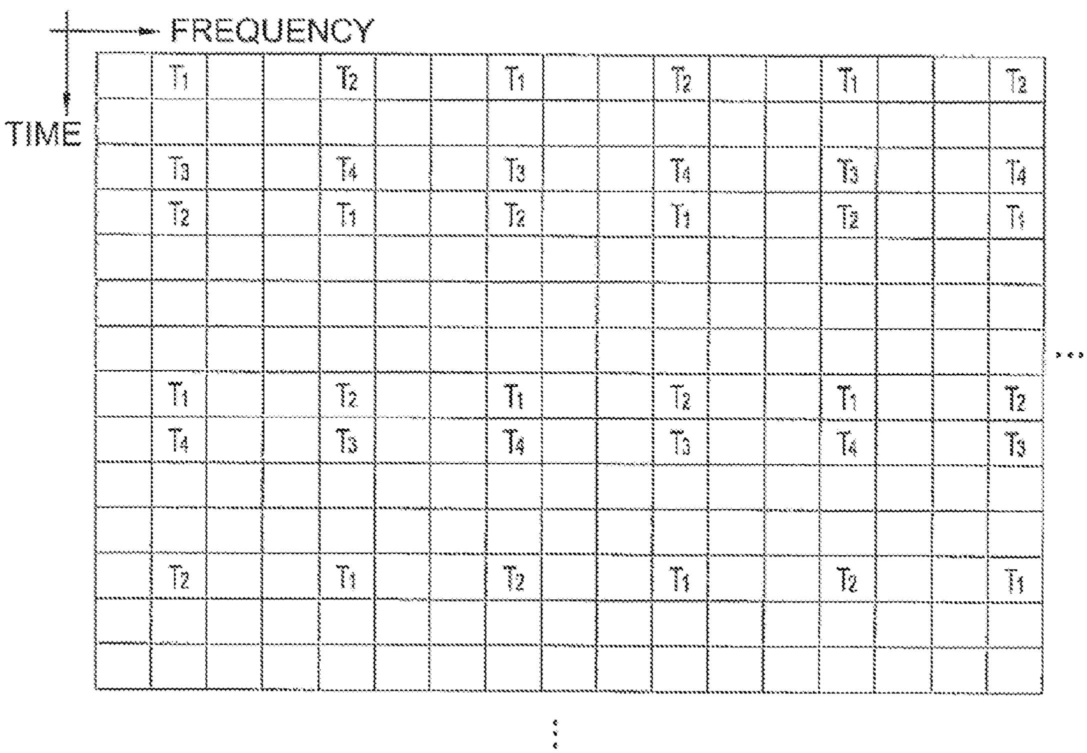

FIG. 76 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is repeated in the fourth and twelfth OFDM symbols. An array of ($T_3$, D, D, $T_4$, D, D) is repeated in the third OFDM symbol. An array of ($T_4$, D, D, $T_3$, D, D) is repeated in the ninth OFDM symbol.

Figure 77:
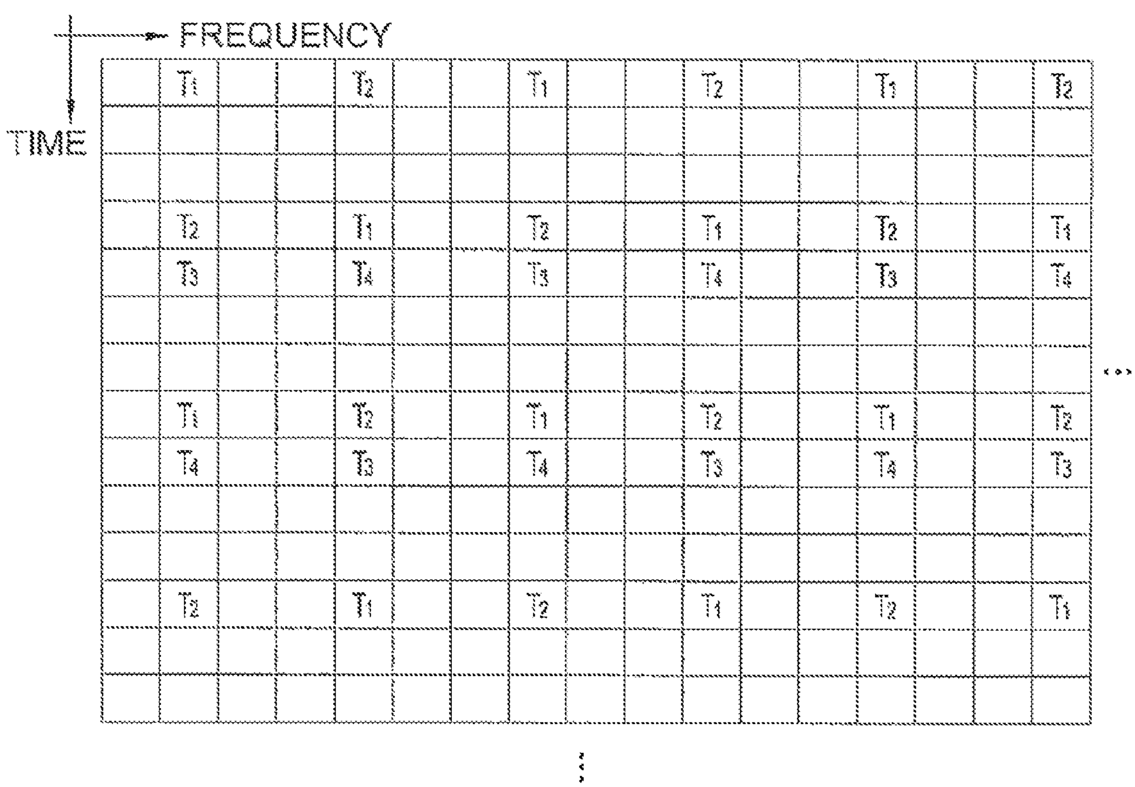

FIG. 77 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is repeated in the fourth and twelfth OFDM symbols. An array of ($T_3$, D, D, $T_4$, D, D) is repeated in the fifth OFDM symbol. An array of ($T_4$, D, D, $T_3$, D, D) is repeated in the ninth OFDM symbol.

Figure 78:
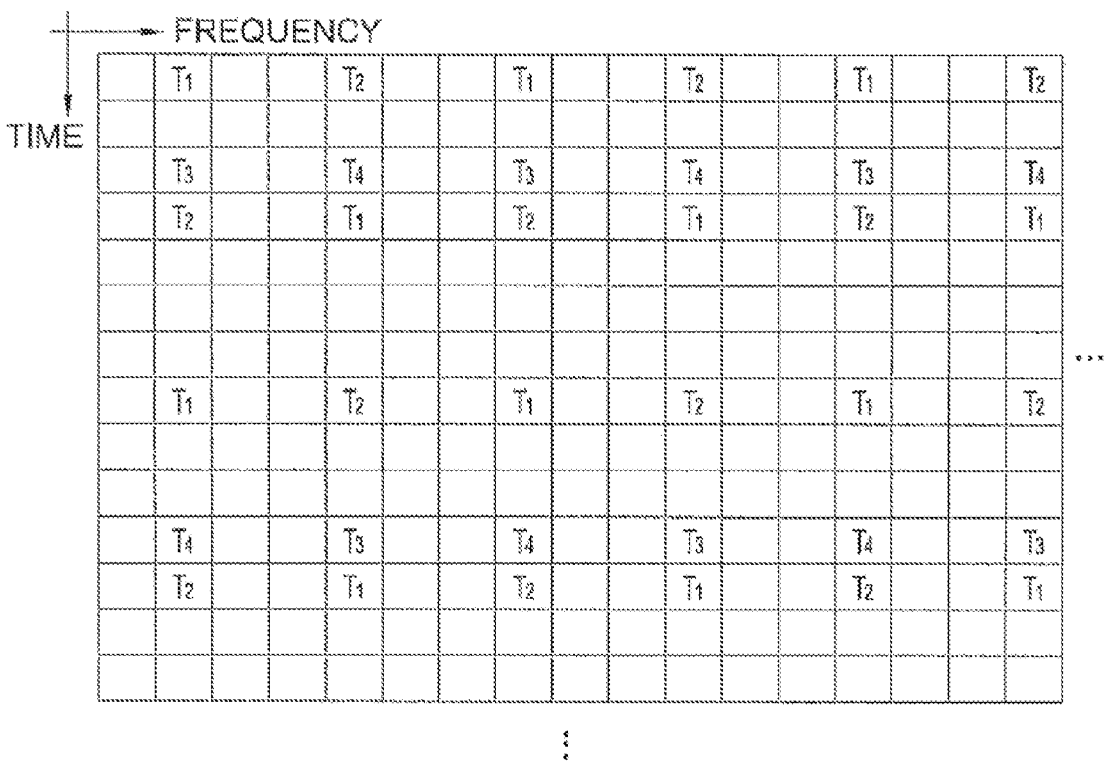

FIG. 78 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is repeated in the fourth and twelfth OFDM symbols. An array of ($T_3$, D, D, $T_4$, D, D) is repeated in the third OFDM symbol. An array of ($T_4$, D, D, $T_3$, D, D) is repeated in the eleventh OFDM symbol.

Figure 79:
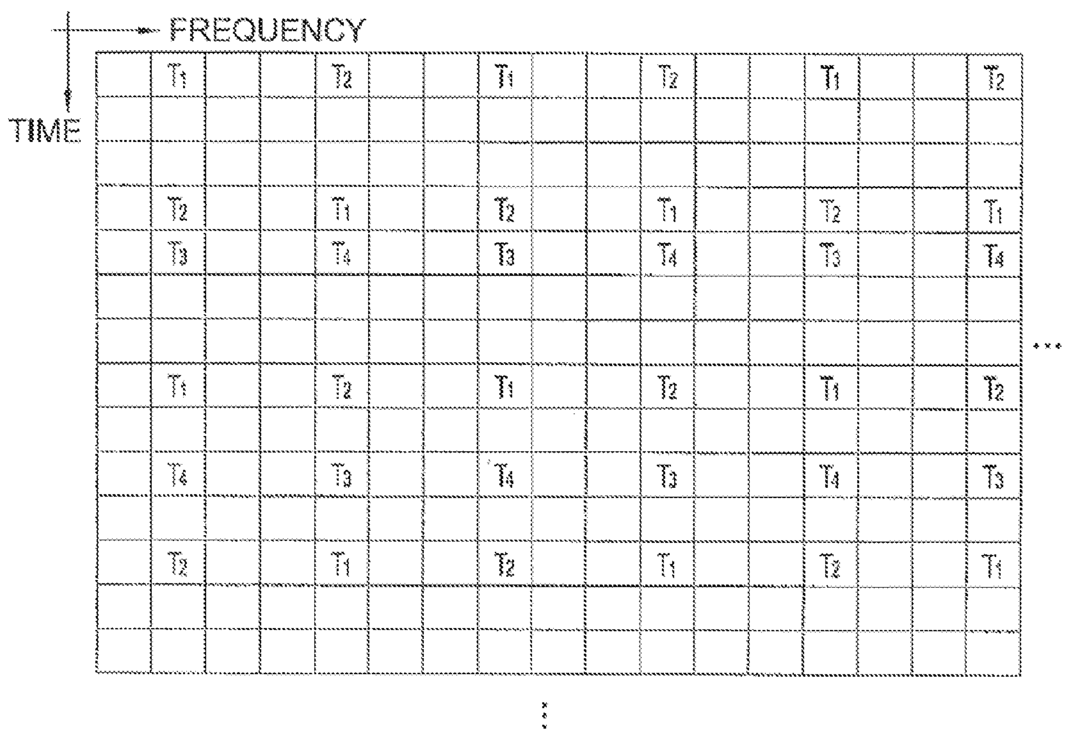

FIG. 79 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is repeated in the fourth and twelfth OFDM symbols. An array of ($T_3$, D, D, $T_4$, D, D) is repeated in the fifth OFDM symbol. An array of ($T_4$, D, D, $T_3$, D, D) is repeated in the tenth OFDM symbol.

Figure 80:
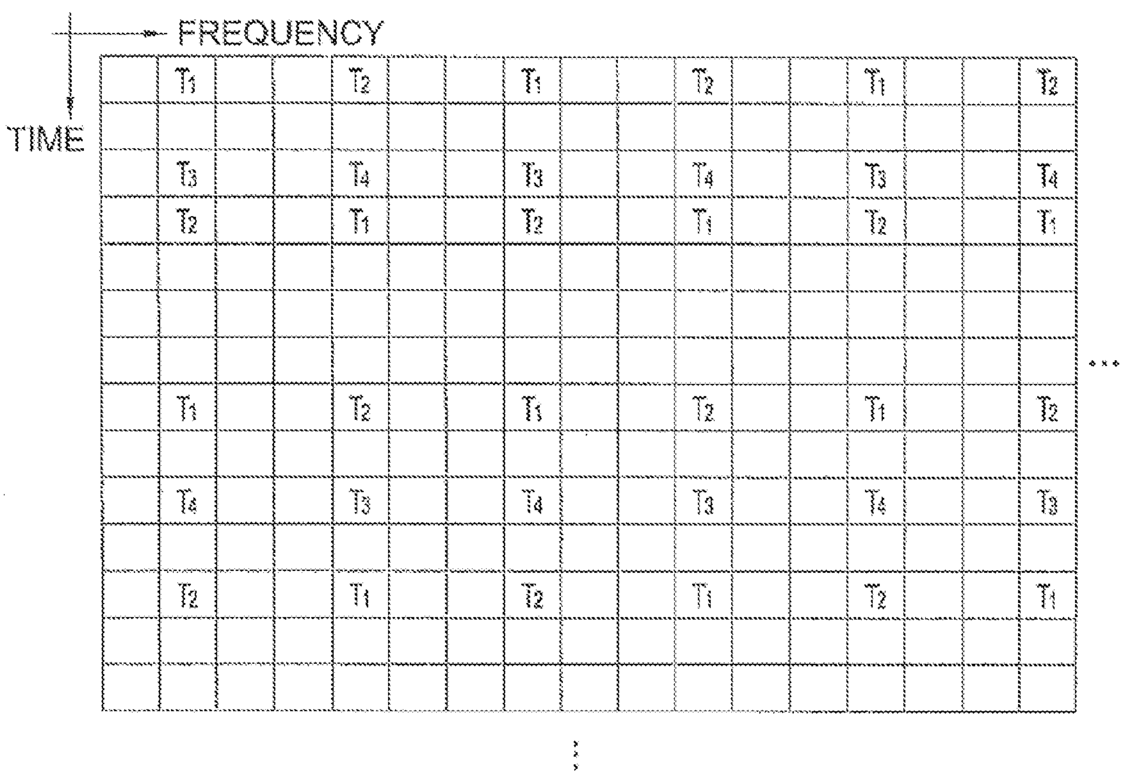

FIG. 80 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is repeated in the fourth and twelfth OFDM symbols. An array of ($T_3$, D, D, $T_4$, D, D) is repeated in the third OFDM symbol. An array of ($T_4$, D, D, $T_3$, D, D) is repeated in the tenth OFDM symbol.

Figure 81:
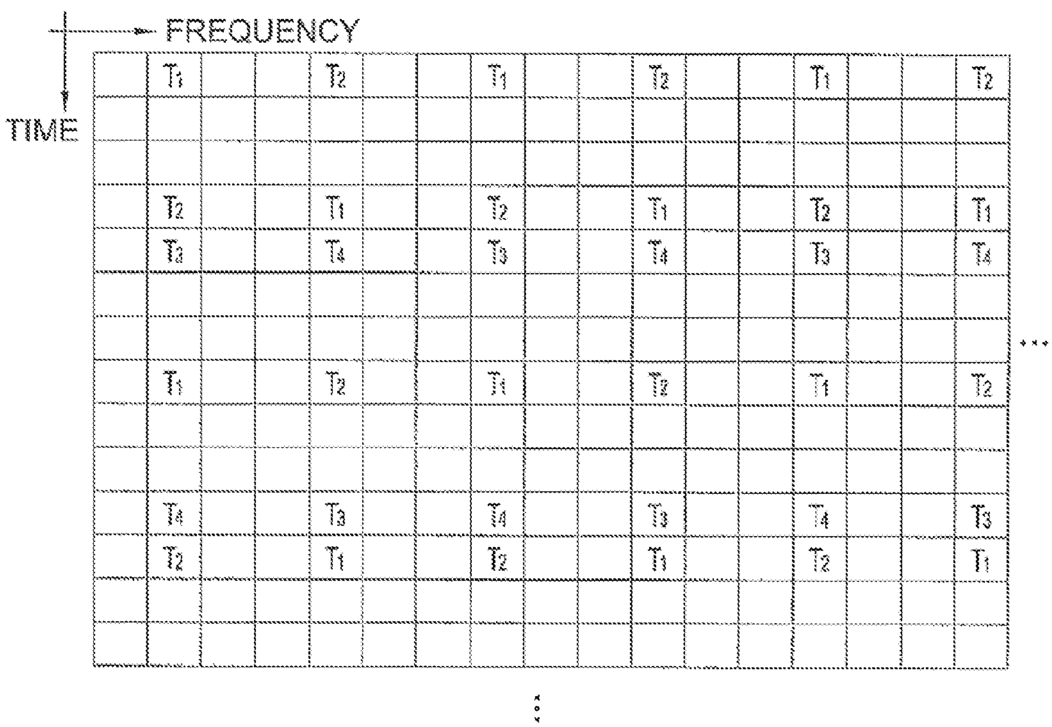

FIG. 81 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is repeated in the fourth and twelfth OFDM symbols. An array of ($T_3$, D, D, $T_4$, D, D) is repeated in the fifth OFDM symbol. An array of ($T_4$, D, D, $T_3$, D, D) is repeated in the eleventh OFDM symbol.

Figure 82:
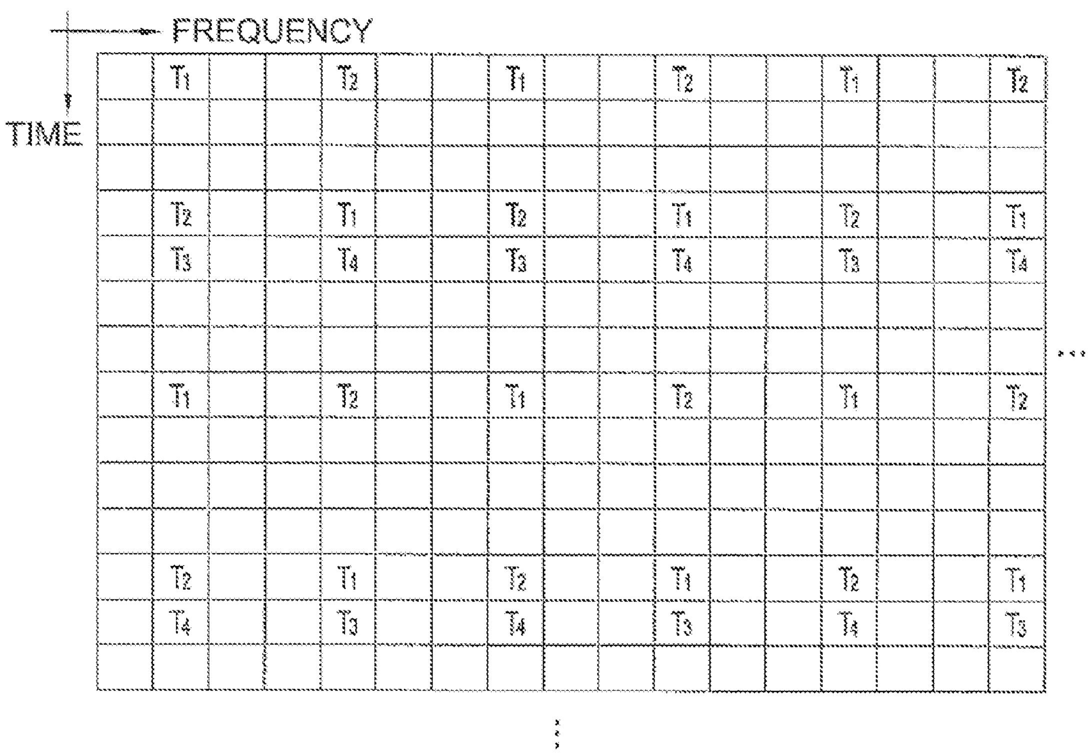

FIG. 82 illustrates an example of a reference signal allocation according to an embodiment of the present invention.

An array of ($T_1$, D, D, $T_2$, D, D) is repeated in the first and eighth OFDM symbols. An array of ($T_2$, D, D, $T_1$, D, D) is repeated in the fourth and twelfth OFDM symbols. An array of ($T_3$, D, D, $T_4$, D, D) is repeated in the fifth OFDM symbol. An array of ($T_4$, D, D, $T_3$, D, D) is repeated in the thirteenth OFDM symbol.

FIGS. 65 to 82 illustrate examples of a reference signal allocation where reference signals are allocated in the first OFDM symbol. If the number of OFDM symbols applied in the micro-sleep mode increases, the reference signals may be allocated in other OFDM symbols such as the second and third OFDM symbols.

Figure 83:
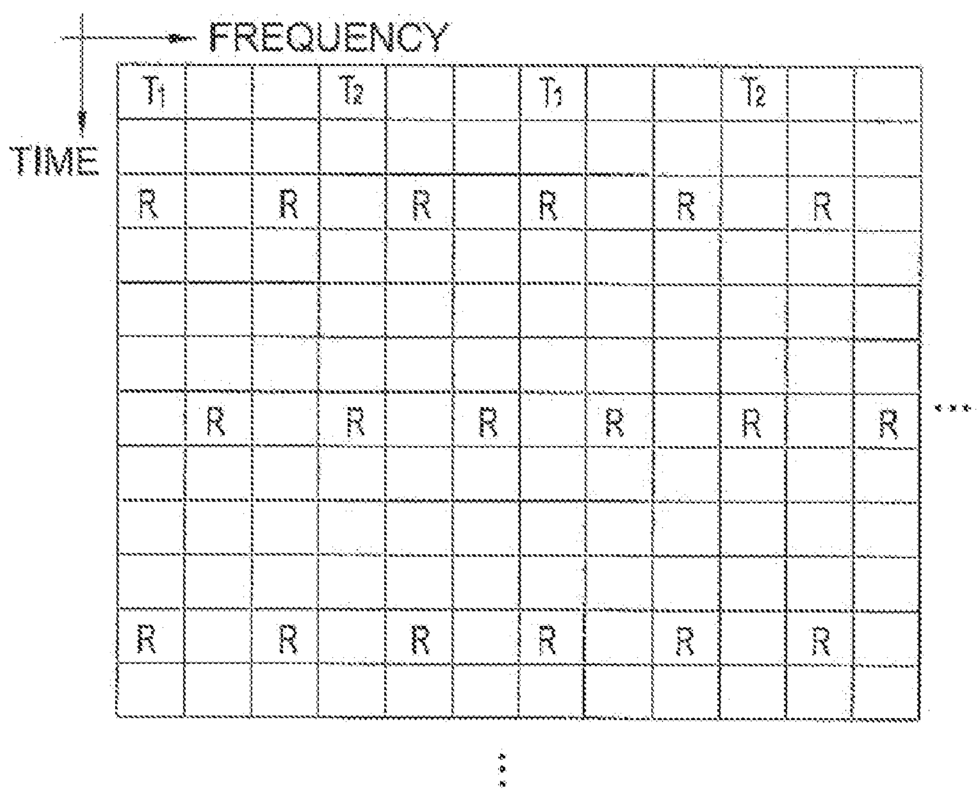
FIGS. 83 to 91 illustrate examples of a reference signal allocation for a multi-user signal.

FIG. 83 illustrates an example of a reference signal allocation for a multi-user signal.

Referring to FIG. 83, R denotes a reference signal for a multi-user signal. The reference signal R may be used for any antenna. In the case of using two antennas, R may denote either a reference signal for the first antenna or a reference signal for the second antenna. A blank resource element may be a data symbol or a null symbol.

In one sub-frame, the reference signals $T_1$ for the first antenna are allocated at the interval of six sub-carriers in the first OFDM symbol. That is, the reference signals $T_1$ are allocated with five sub-carriers therebetween. The reference signals $T_2$ for the second antenna are allocated at the same interval as the first reference signals $T_1$ so as not to overlap the first reference signals $T_1$ in the same OFDM symbols. That is, the reference signals $T_2$ are placed between the two references signals $T_1$ at the same interval as the first reference signals $T_1$.

The reference signals R are allocated staring from positions where dedicated control signals are not allocated, for example, from the third OFDM symbol. That is, the reference signals R are allocated at the interval of two sub-carriers in the third OFDM symbol. The reference signals R are allocated at the interval of two sub-carriers in the seventh OFDM symbol spaced apart by the size of four OFDM symbols from the third OFDM symbol. The reference signals R in the third and seventh OFDM symbols are staggered from each other. The reference signals R are allocated at the interval of two sub-carriers in the eleventh OFDM symbol spaced apart by the size of four OFDM symbols from the seventh OFDM symbol.

Figure 84:
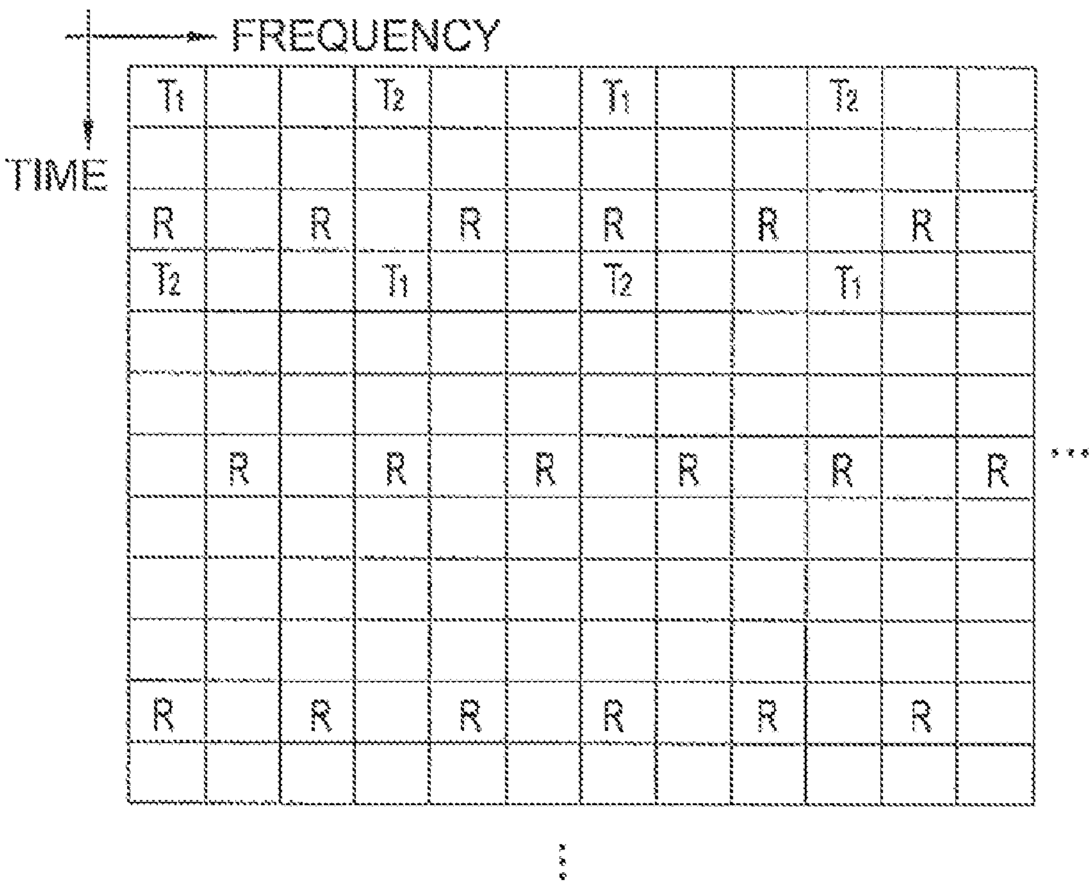

FIG. 84 illustrates another example of a reference signal allocation for a multi-user signal.

In comparison with the example of FIG. 83, referring to FIG. 84, the reference signals $T_1$ and $T_2$ for the first and second antennas are allocated in the fourth OFDM symbol. When a dedicated control signal is allocated in a region where a multi-user signal is transmitted, an error rate of the dedicated control signal can be reduced.

Figure 85:
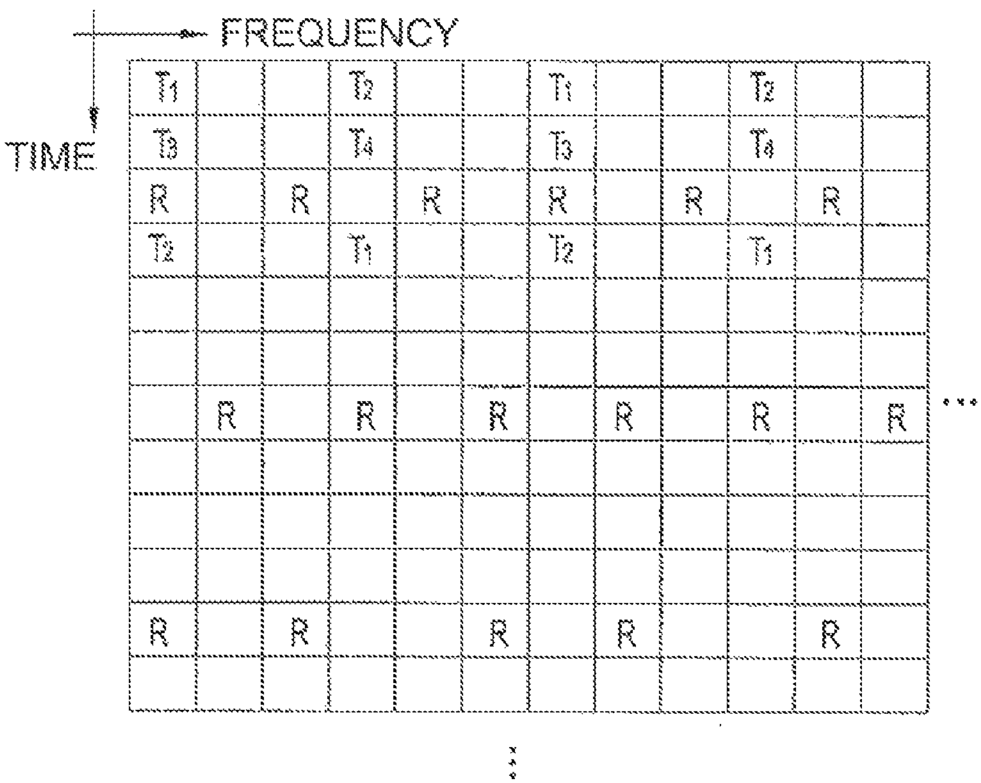

FIG. 85 illustrates another example of a reference signal allocation for a multi-user signal when multiple antennas are used. This is the case where four antennas are used, and at least one antenna among them transmits a multi-user signal.

Referring to FIG. 85, in one sub-frame, the reference signals $T_1$ are allocated at the interval of six sub-carriers in the first OFDM symbol. The reference signals $T_2$ are allocated at the same interval as the first reference signals $T_1$ so as not to overlap the first reference signals $T_1$ in the same OFDM symbols. That is, the reference signals $T_2$ are placed between the two references signals $T_1$ at the same interval as the first reference signals $T_1$. Furthermore, in one sub-frame, the reference signals $T_3$ are allocated at the interval of six sub-carriers in the first OFDM symbol. The reference signals $T_4$ are allocated at the same interval as the third reference signals $T_3$ so as not to overlap the third reference signals $T_3$ in the same OFDM symbols.

The reference signals R are allocated staring from positions where a dedicated control signal is not allocated, for example, from the third OFDM symbol. The reference signals R may be transmitted through at least one of four antennas, the first to fourth antennas. The reference signals R are allocated at the interval of two sub-carriers in the third OFDM symbol. The reference signals R are allocated at the interval of two sub-carriers in the seventh OFDM symbol spaced apart by the size of four OFDM symbols from the third OFDM symbol. The reference signals R in the third and seventh OFDM symbols are staggered from each other.

The reference signals $T_1$ and $T_2$ are allocated in the fourth OFDM symbol. When a dedicated control signal is allocated in a region where a multi-user signal is transmitted, an error rate of the dedicated control signal can be reduced.

Figure 86:
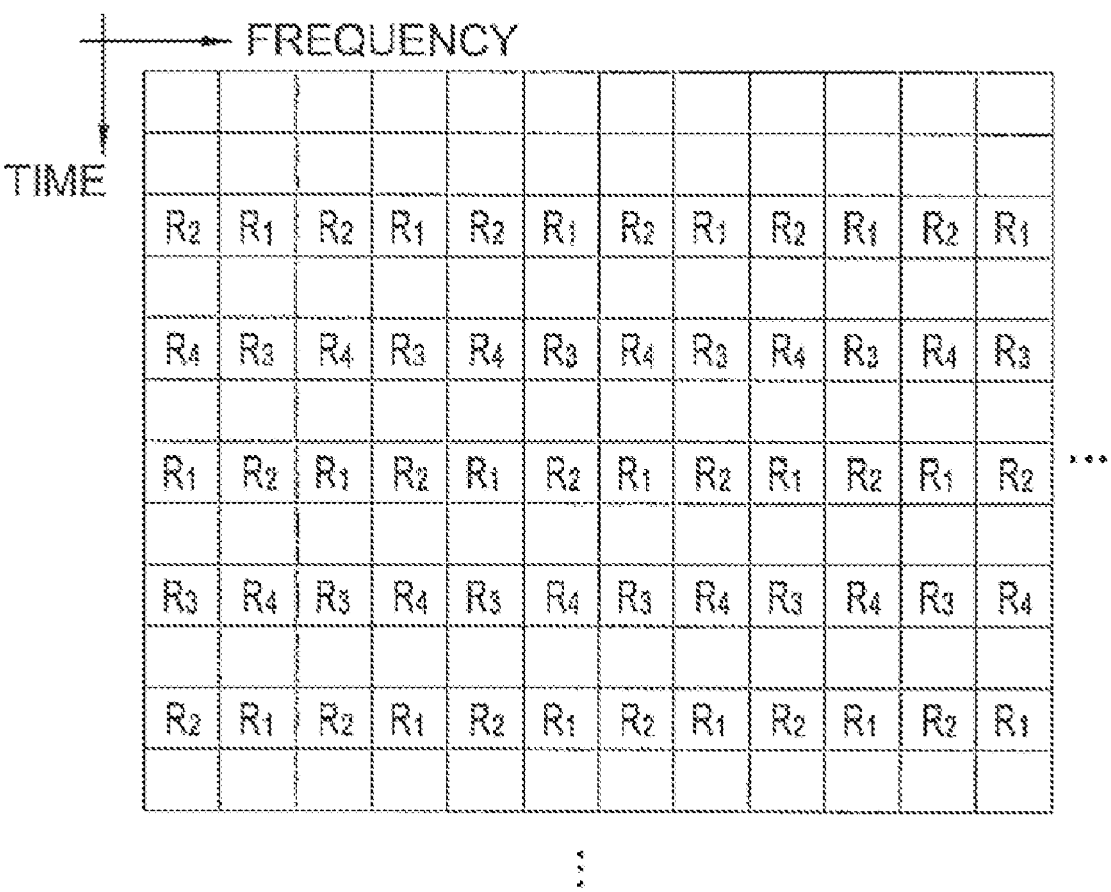

FIG. 86 illustrates another example of a reference signal allocation for a multi-user signal when multiple antennas are used. This is the case where four antennas are used, and at least one antenna among them transmits a multi-user signal.

Referring to FIG. 86, first and second reference signals $R_1$ and $R_2$ are allocated in OFDM symbols starting from the third OFDM symbol at the interval of four OFDM symbols. Third and fourth reference signals $R_3$ and $R_4$ are allocated in OFDM symbols starting from the fifth OFDM symbol at the interval of four OFDM symbols.

Figure 87:
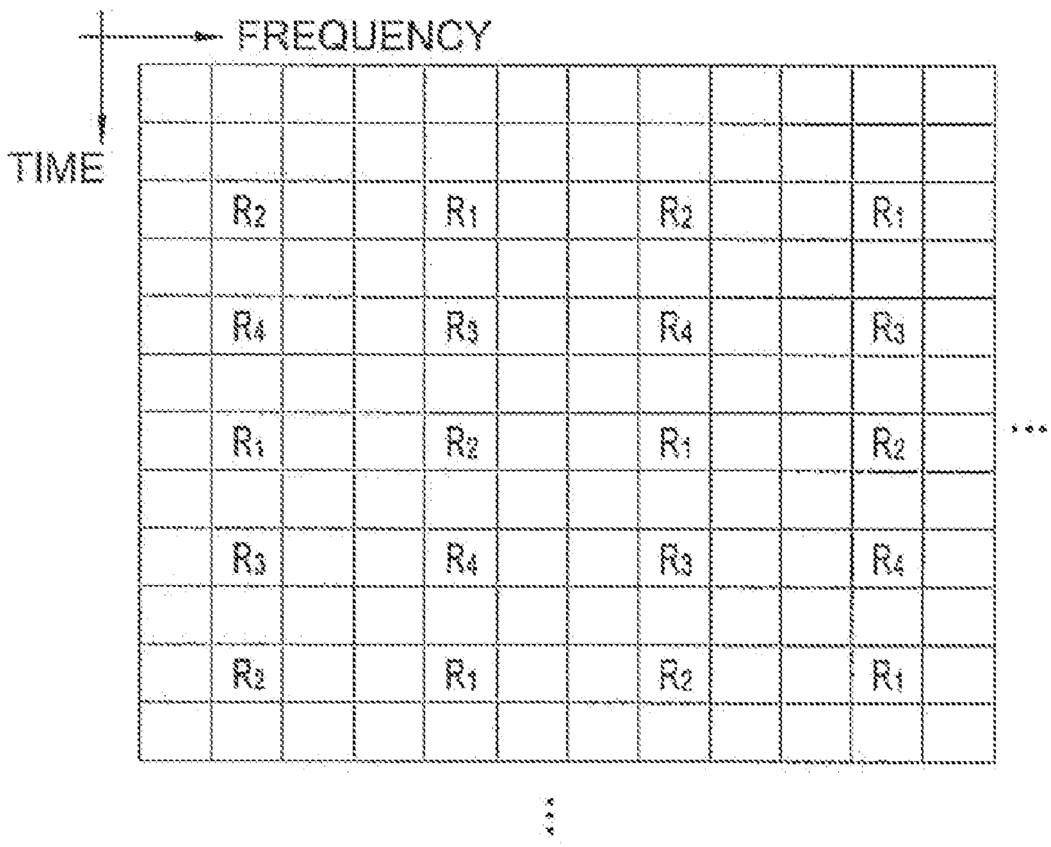

FIG. 87 illustrates another example of a reference signal allocation for a multi-user signal when multiple antennas are used.

Referring to FIG. 87, first and second reference signals $R_1$ and $R_2$ are allocated in OFDM symbols starting from the third OFDM symbol at the interval of four OFDM symbols. Third and fourth reference signals $R_3$ and $R_4$ are allocated in OFDM symbols starting from the fifth OFDM symbol at the interval of four OFDM symbols. The first to fourth reference signals $R_1$ to $R_4$ are each allocated in the frequency domain at the interval of six sub-carriers.

Figure 88:
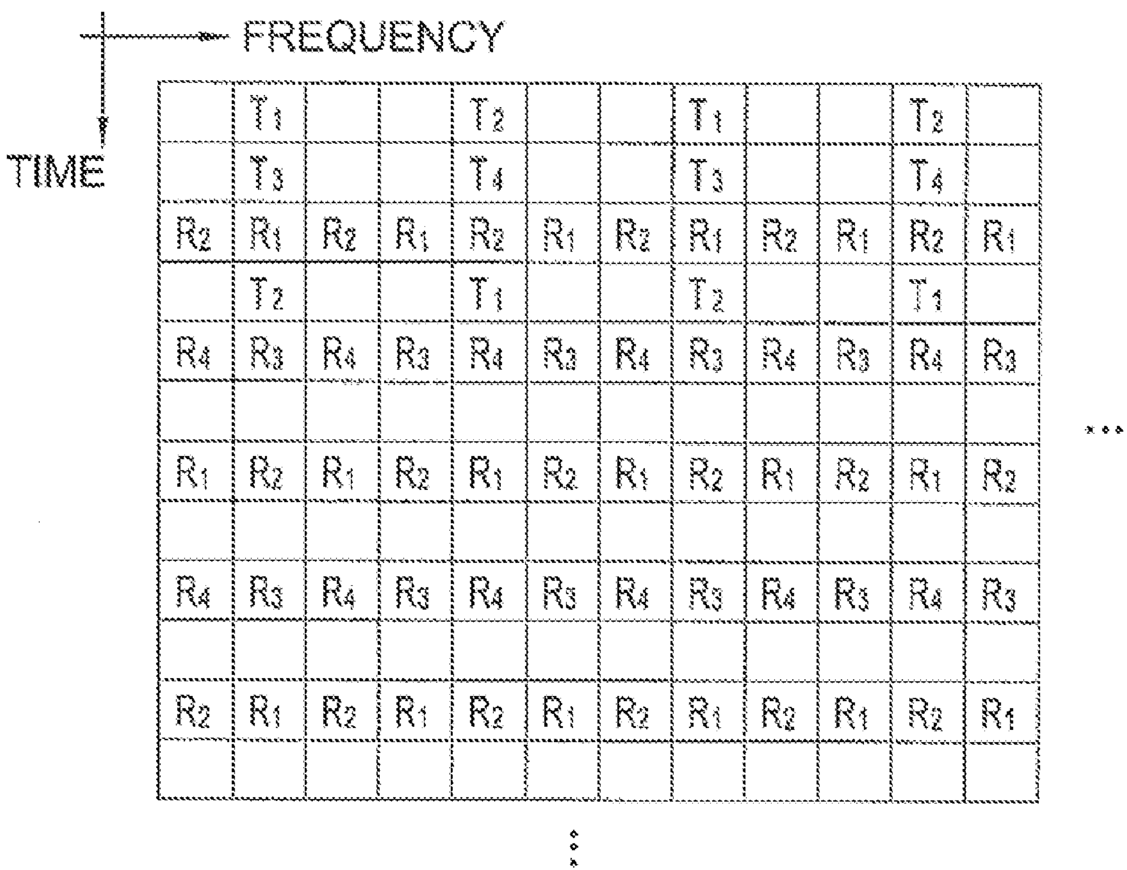

FIG. 88 illustrates another example of a reference signal allocation for a multi-user signal when multiple antennas are used.

Referring to FIG. 88, first and second reference signals $R_1$ and $R_2$ are allocated in OFDM symbols starting from the third OFDM symbol at the interval of four OFDM symbols. Third and fourth reference signals $R_3$ and $R_4$ are allocated in OFDM symbols starting from the fifth OFDM symbol at the interval of four OFDM symbols.

The reference signals $T_1$ to $T_4$ for the first to fourth antennas are allocated in the first and second OFDM symbols. Also, the reference signals $T_1$ and $T_2$ are allocated in the fourth OFDM symbol.

Figure 89:
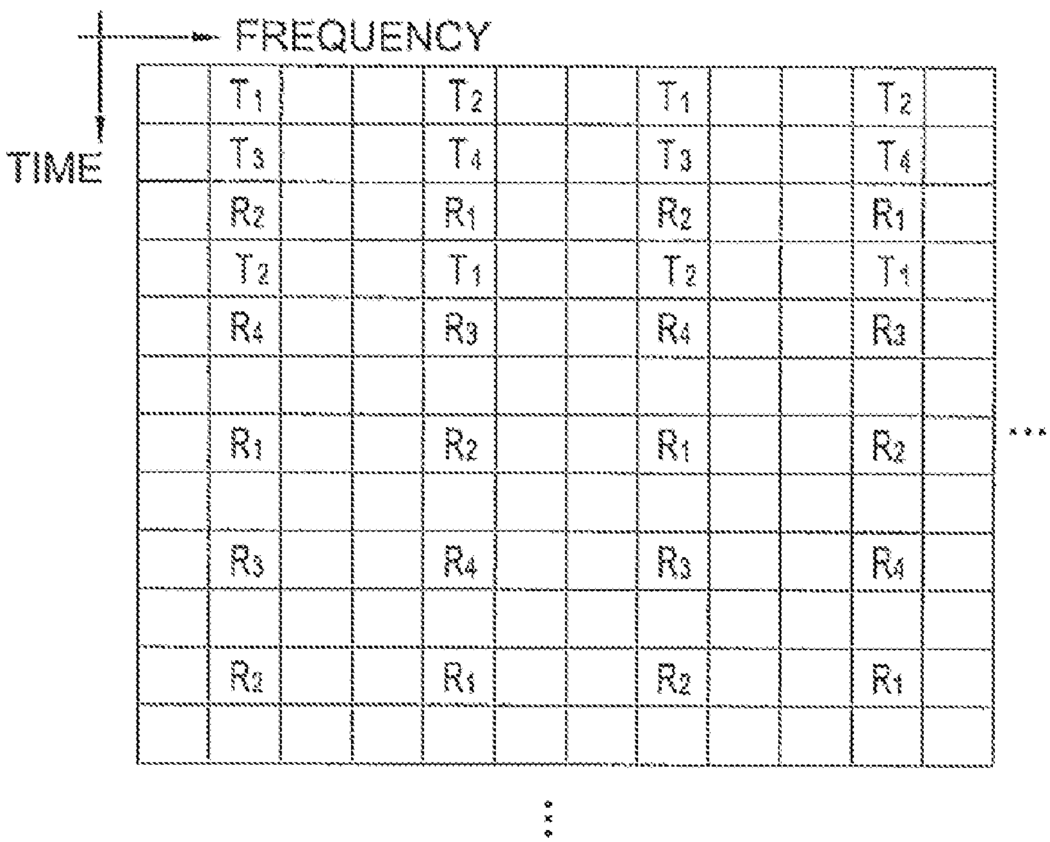

FIG. 89 illustrates another example of a reference signal allocation for a multi-user signal when multiple antennas are used.

Referring to FIG. 89, first and second reference signals $R_1$ and $R_2$ are allocated in OFDM symbols starting from the third OFDM symbol at the interval of four OFDM symbols. Third and fourth reference signals $R_3$ and $R_4$ are allocated in OFDM symbols starting from the fifth OFDM symbol at the interval of four OFDM symbols. The first to fourth reference signals $R_1$ to $R_4$ are allocated in the frequency domain at the interval of six sub-carriers.

The reference signals $T_1$ to $T_4$ for the first to fourth antennas are allocated in the first and second OFDM symbols. Also, the reference signals $T_1$ and $T_2$ are allocated in the fourth OFDM symbol.

Figure 90:
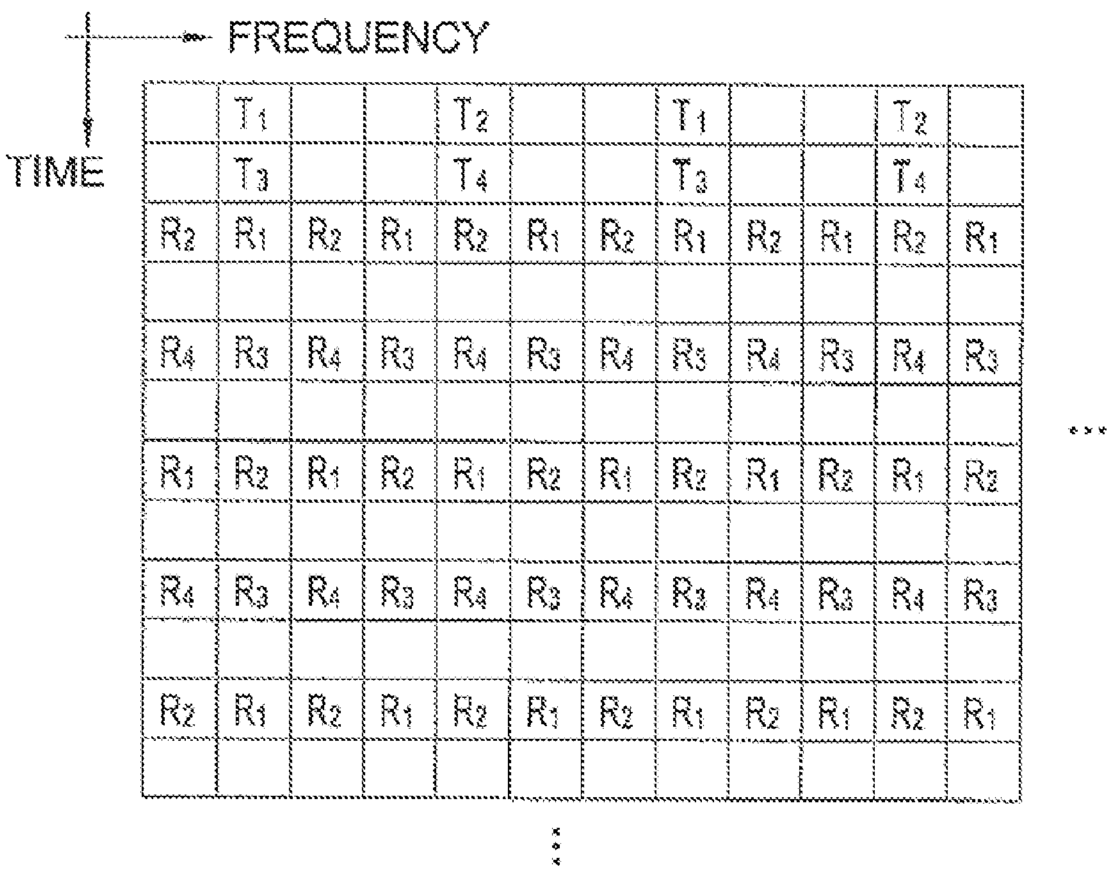

FIG. 90 illustrates another example of a reference signal allocation for a multi-user signal when multiple antennas are used.

Referring to FIG. 90, first and second reference signals $R_1$ and $R_2$ are allocated in OFDM symbols starting from the third OFDM symbol at the interval of four OFDM symbols. Third and fourth reference signals $R_3$ and $R_4$ are allocated in OFDM symbols starting from the fifth OFDM symbol at the interval of four OFDM symbols.

The reference signals $T_1$ to $T_4$ for the first to fourth antennas are allocated only in the first and second OFDM symbols.

Figure 91:
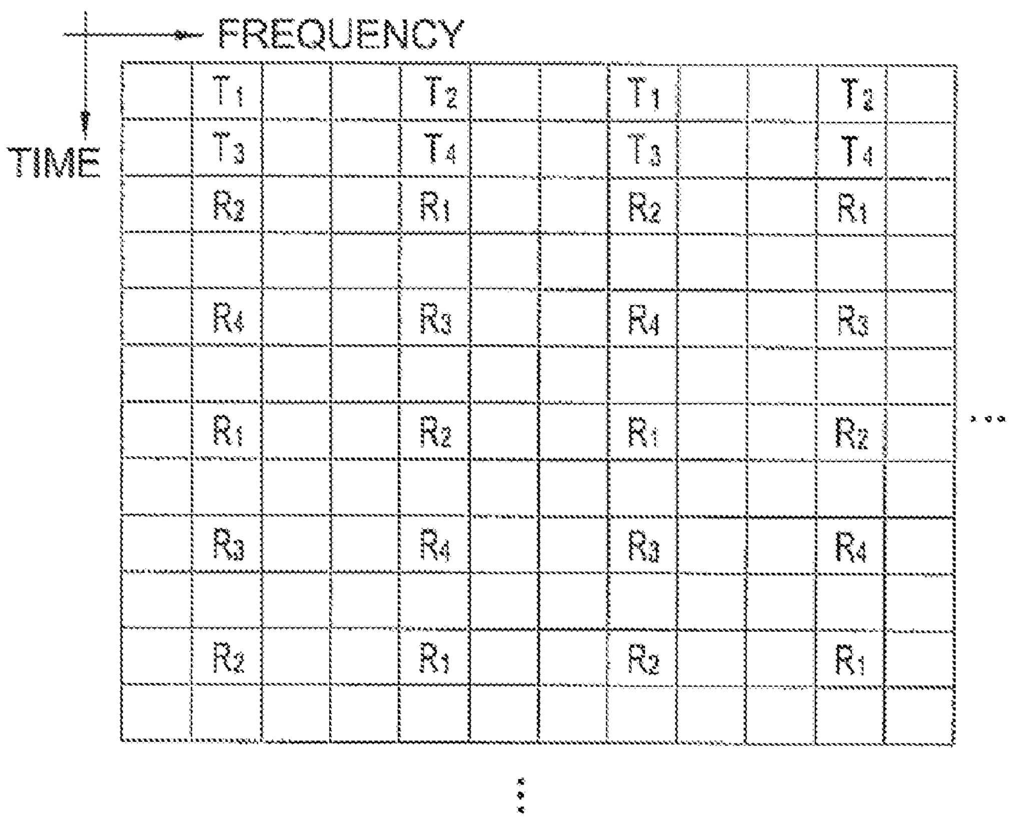

FIG. 91 illustrates another example of a reference signal allocation for a multi-user signal when multiple antennas are used.

Referring to FIG. 91, first and second reference signals $R_1$ and $R_2$ are allocated in OFDM symbols starting from the third OFDM symbol at the interval of four OFDM symbols. Third and fourth reference signals $R_3$ and $R_4$ are allocated in OFDM symbols starting from the fifth OFDM symbol at the interval of four OFDM symbols. The first to fourth reference signals $R_1$ to $R_4$ are allocated in the frequency domain at the interval of six sub-carriers.

The reference signals $T_1$ to $T_4$ for the first to fourth antennas are allocated only in the first and second OFDM symbols.

Reference signals for multiple antennas are effectively allocated. Channel estimation or data demodulation can be prevented from performance degradation.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

What is claimed is:

1. A user equipment (UE) receiving a plurality of reference signals in a wireless multiple-input multiple-output (MIMO) communication system, the UE comprising:

a transceiver configured for receiving the plurality of reference signals for multiple antennas in a sub-frame, the sub-frame comprising a plurality of Orthogonal Frequency Division Multiplexing (OFDM) symbols in a time domain over a plurality of sub-carriers in a frequency domain, wherein:

a first array is repeated in the frequency domain on a first OFDM symbol of the sub-frame, a second array is repeated in the frequency domain on a second OFDM symbol of the sub-frame and a third array is repeated in the frequency domain on a third OFDM symbol of the sub-frame, each of the first, second and third arrays consists of six contiguous subcarrier in the frequency domain, a first subcarrier and a fourth subcarrier of the six contiguous subcarriers of each of the first, second and third arrays are allocated with reference signals of the plurality of reference signals, the first and fourth subcarriers of the six contiguous subcarriers of each of the first, second and third arrays are directly followed by two contiguous data subcarriers, a first reference signal "T1" for a first antenna is allocated on the first subcarrier in the first array and the fourth subcarrier in the third array, a second reference signal "T2" for a second antenna is allocated on the fourth subcarrier in the first array and the first subcarrier in the third array, a third reference signal "T3" for a third antenna is allocated on the first subcarrier in the second array, and a fourth reference signal "T4" for a fourth antenna is allocated on the fourth subcarrier in the second array, fourth and fifth OFDM symbols which do not include the plurality of reference signals are allocated between the second OFDM symbol and the third OFDM symbol, and sixth and seventh OFDM symbols which do not include the plurality of reference signals are allocated, such that the sixth OFDM symbol is contiguous with the third OFDM symbol, and the seventh OFDM symbol is contiguous with the sixth OFDM symbol.

2. The user equipment of claim 1, wherein a set of OFDM symbols including the first, second, third, fourth, fifth, sixth, and seventh OFDM symbols is repeated in the frequency domain.

3. The user equipment of claim 2, wherein a density of the first and second reference signals in the sub-frame is two times greater than a density of the third and fourth reference signals in the sub-frame.

4. The user equipment of claim 1, wherein an eighth OFDM symbol is allocated, such that the eighth OFDM symbol is contiguous with the seventh OFDM symbol, and the first array is repeated in the frequency domain on the eighth OFDM symbol.

5. A user equipment (UE) receiving a plurality of reference signals allocated in a sub-frame in a wireless multiple-input multiple-output (MIMO) communication system, the sub-frame comprising a plurality of Orthogonal Frequency Division Multiplexing (OFDM) symbols in a time domain transmitted over a plurality of sub-carriers in a frequency domain, the UE comprising:

a transceiver configured for receiving the plurality of reference signals, wherein:

a plurality of first reference signals for a first antenna are allocated on a first OFDM symbol and a third OFDM symbol, a plurality of second reference signals for a second antenna are allocated on the first OFDM symbol and the third OFDM symbol, a plurality of third reference signals for a third antenna are allocated on a second OFDM symbol contiguous with the first OFDM symbol, and a plurality of fourth reference signals for a fourth antenna are allocated on the second OFDM symbol, the plurality of first reference signals and the plurality of second reference signals are not contiguous and are not overlapping, the plurality of third reference signals and the plurality of fourth reference signals are not contiguous and are not overlapping, each of the plurality of first, second, third and fourth reference signals is allocated at regular intervals in the frequency domain, fourth and fifth OFDM symbols, which do not include the reference signals, are allocated such that the fourth OFDM symbol is contiguous with the second OFDM symbol, the fifth OFDM symbol is contiguous with the fourth OFDM symbol, and the third OFDM symbol is contiguous with the fifth OFDM symbol, locations in the frequency domain of the plurality of first reference signals allocated in the first OFDM symbol are the same as locations in the frequency domain of the plurality of second reference signals in the third OFDM symbol, and locations in the frequency domain of the plurality of second reference signals allocated in the first OFDM symbol are the same as locations in the frequency domain of the plurality of first reference signals in the third OFDM symbol, and sixth and seventh OFDM symbols, which do not include the reference signals, are allocated such that the sixth OFDM symbol is contiguous with the third OFDM symbol, and the seventh OFDM symbol is contiguous with the sixth OFDM symbol.

6. The user equipment of claim 5, wherein at least two of the plurality of first, second, third and fourth reference signals have different densities in the sub-frame.

7. The user equipment of claim 5, wherein the locations in the frequency domain of the plurality of third reference signals in the second OFDM symbol are the same as the locations of the plurality of first reference signals in the first OFDM symbol, and the locations in the frequency domain of the plurality of fourth reference signals in the second OFDM symbol are the same as the locations of the plurality of second reference signals in the first OFDM symbol.

8. The user equipment of claim 5, wherein the locations in the frequency domain of the plurality of fourth reference signals in the second OFDM symbol are the same as the locations of the plurality of first reference signals in the third OFDM symbol, and the locations in the frequency domain of the plurality of third reference signals in the second OFDM symbol are the same as the locations of the plurality of second reference signals in the third OFDM symbol.

9. The user equipment of claim 5, wherein the first OFDM symbol is near a beginning of a transmission time interval (TTI) that comprises at least two OFDM symbols.

10. The user equipment of claim 9, wherein the transceiver is further configured for placing a null symbol for one antenna to overlap with a reference signal for another antenna.

11. The user equipment of claim 5, wherein an array including the first, second, third, fourth, fifth, sixth, and seventh OFDM symbols is repeated in the frequency domain.

12. The user equipment of claim 11, wherein a density of the first and second reference signals in the sub-frame is greater than a density of the third and fourth reference signals in the sub-frame.

13. The user equipment of claim 11, wherein a density of the first and second reference signals in the sub-frame is two times greater than a density of the third and fourth reference signals in the sub-frame.

* * * * *